US012809576B2

(12) United States Patent
Vega-Zayas et al.

(10) Patent No.: US 12,809,576 B2
(45) **Date of Patent: *Nov. 24, 2026**

(54) DYNAMIC COMPUTATION OF SYSTEM RESPONSE VOLUME

(71) Applicant: Sonos, Inc., Goleta, CA (US)

(72) Inventors: Luis Vega-Zayas, Arlington, MA (US); Lucas Pylypczak, Boston, MA (US); Rich Lean, Boston, MA (US)

(73) Assignee: Sonos, Inc., Goleta, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 18/943,255

(22) Filed: Nov. 11, 2024

(65) Prior Publication Data

US 2025/0147718 A1 May 8, 2025

Related U.S. Application Data

(63) Continuation of application No. 18/507,713, filed on Nov. 13, 2023, now Pat. No. 12,141,502, which is a (Continued)

(51) Int. Cl.

*G06F 3/16* (2006.01)
*H04R 27/00* (2006.01)

(Continued)

(52) U.S. Cl.

CPC .............. *G06F 3/165* (2013.01); *G06F 3/167* (2013.01); *H04R 27/00* (2013.01); *H04R 29/001* (2013.01);

(Continued)

(58) Field of Classification Search

CPC ....... G06F 3/165; G06F 3/167; H04R 29/001; H04R 27/00; H04R 2227/003; H04R 2227/005; H04R 2430/01; H04S 7/301

(Continued)

(56) References Cited

U.S. PATENT DOCUMENTS 2,171,598 A 9/1939 Parker
4,306,113 A 12/1981 Morton (Continued)

FOREIGN PATENT DOCUMENTS

CN 1369188 A 9/2002
CN 1447624 A 10/2003

(Continued)

OTHER PUBLICATIONS

Notice of Allowance mailed on Oct. 7, 2025, issued in connection with U.S. Appl. No. 18/338,996, filed Jun. 21, 2023, 05 pages.

(Continued)

*Primary Examiner* — Paul Kim

(57) ABSTRACT

Systems and methods disclosed herein include: (i) forming a synchrony playback group including a first and second playback device, (ii) causing the first and second playback devices to play back audio content in synchrony, (iii) while the first and second playback devices are playing back the audio content in synchrony, determining that the first playback device has received a voice input via a microphone, (iv) based on the voice input, determining that a requirement exists to output a system response to the voice input, (v) determining a sound pressure level (SPL) measurement associated with the voice input, (vi) based on the SPL measurement, determining a system response volume, (vii) causing the first and second playback devices to reduce an audio playback volume of the audio content, and (viii) causing the first and/or the second playback device to output the system response at the system response volume.

20 Claims, 7 Drawing Sheets

Related U.S. Application Data continuation of application No. 17/986,241, filed on Nov. 14, 2022, now Pat. No. 11,816,393, which is a continuation of application No. 17/391,404, filed on Aug. 2, 2021, now Pat. No. 11,500,611, which is a continuation of application No. 16/600,949, filed on Oct. 14, 2019, now Pat. No. 11,080,005, which is a continuation of application No. 16/102,153, filed on Aug. 13, 2018, now Pat. No. 10,445,057, which is a continuation of application No. 15/699,982, filed on Sep. 8, 2017, now Pat. No. 10,048,930.

(51) Int. Cl.
*H04R 29/00* (2006.01)
*H04S 7/00* (2006.01)

(52) U.S. Cl.
CPC ........ *H04S 7/301* (2013.01); *H04R 2227/003* (2013.01); *H04R 2227/005* (2013.01); *H04R 2430/01* (2013.01)

(58) Field of Classification Search
USPC ........................................................ 381/57
See application file for complete search history.

(56) References Cited

U.S. PATENT DOCUMENTS 4,342,104 A 7/1982 Jack
4,504,704 A 3/1985 Ohyaba et al.
4,592,088 A 5/1986 Shimada
4,628,530 A 12/1986 Op De Beek et al.
4,631,749 A 12/1986 Rapaich
4,694,484 A 9/1987 Atkinson et al.
4,773,094 A 9/1988 Dolby
4,995,778 A 2/1991 Brussel
5,218,710 A 6/1993 Yamaki et al.
5,255,326 A 10/1993 Stevenson
5,323,257 A 6/1994 Abe et al.
5,386,478 A 1/1995 Plunkett
5,452,274 A 9/1995 Thompson
5,553,147 A 9/1996 Pineau
5,581,621 A 12/1996 Koyama et al.
5,692,104 A 11/1997 Chow et al.
5,754,774 A 5/1998 Bittinger et al.
5,757,927 A 5/1998 Gerzon et al.
5,910,991 A 6/1999 Farrar
5,939,656 A 8/1999 Suda
6,018,376 A 1/2000 Nakatani
6,055,497 A 4/2000 Hallkvist et al.
6,061,455 A 5/2000 Hadley et al.
6,072,879 A 6/2000 Ouchi et al.
6,111,957 A 8/2000 Thomasson
6,122,531 A 9/2000 Nicholls et al.
6,363,155 B1 3/2002 Horbach
6,548,967 B1 4/2003 Dowling et al.
6,573,067 B1 6/2003 Dib-Hajj et al.
6,631,179 B1 10/2003 Sifuentes
6,639,989 B1 10/2003 Zacharov et al.
6,643,744 B1 11/2003 Cheng
6,704,421 B1 3/2004 Kitamura
6,704,671 B1 3/2004 Umminger, III
6,721,428 B1 4/2004 Allred et al.
6,731,760 B2 5/2004 Pedersen
6,760,451 B1 7/2004 Craven et al.
6,766,025 B1 7/2004 Levy et al.
6,798,889 B1 9/2004 Dicker et al.
6,862,440 B2 3/2005 Sampath
6,916,980 B2 7/2005 Ishida et al.
6,931,134 B1 8/2005 Waller, Jr. et al.
6,985,694 B1 1/2006 De Bonet et al.
6,990,211 B2 1/2006 Parker
7,031,476 B1 4/2006 Chrisop et al.
7,039,212 B2 5/2006 Poling et al.
7,058,186 B2 6/2006 Tanaka
7,072,477 B1 7/2006 Kincaid
7,092,535 B1 8/2006 Pedersen et al.
7,092,537 B1 8/2006 Allred et al.
7,103,187 B1 9/2006 Neuman
7,187,947 B1 3/2007 White et al.
7,289,637 B2 10/2007 Montag et al.
7,312,785 B2 12/2007 Tsuk et al.
7,477,751 B2 1/2009 Lyon et al.
7,483,540 B2 1/2009 Rabinowitz et al.
7,489,784 B2 2/2009 Yoshino
7,490,044 B2 2/2009 Kulkarni
7,492,909 B2 2/2009 Carter, Jr.
7,519,188 B2 4/2009 Berardi et al.
7,519,579 B2 4/2009 Yalovsky et al.
7,529,377 B2 5/2009 Nackvi et al.
7,567,907 B2 7/2009 Greene et al.
7,590,772 B2 9/2009 Marriott et al.
7,630,500 B1 12/2009 Beckman et al.
7,664,276 B2 2/2010 McKee Cooper
7,676,044 B2 3/2010 Sasaki et al.
7,689,305 B2 3/2010 Kreifeldt et al.
7,697,701 B2 4/2010 Pedersen et al.
7,720,237 B2 5/2010 Bharitkar et al.
7,742,740 B2 6/2010 Goldberg et al.
7,769,183 B2 8/2010 Bharitkar et al.
7,796,068 B2 9/2010 Raz et al.
7,835,689 B2 11/2010 Goldberg et al.
7,876,903 B2 1/2011 Sauk
7,925,203 B2 4/2011 Lane et al.
7,949,140 B2 5/2011 Kino
7,949,707 B2 5/2011 Mcdowall et al.
7,961,893 B2 6/2011 Kino
7,970,922 B2 6/2011 Svendsen
8,005,228 B2 8/2011 Bharitkar et al.
8,042,961 B2 10/2011 Massara et al.
8,045,721 B2 10/2011 Burgan et al.
8,046,219 B2 10/2011 Zurek et al.
8,050,652 B2 11/2011 Qureshey et al.
8,063,698 B2 11/2011 Howard
8,074,253 B1 12/2011 Nathan
8,116,476 B2 2/2012 Inohara
8,126,156 B2 2/2012 Corbett et al.
8,126,172 B2 2/2012 Horbach et al.
8,131,390 B2 3/2012 Braithwaite et al.
8,139,774 B2 3/2012 Berardi et al.
8,144,883 B2 3/2012 Pedersen
8,160,276 B2 4/2012 Liao et al.
8,160,281 B2 4/2012 Kim et al.
8,170,260 B2 5/2012 Reining et al.
8,175,292 B2 5/2012 Aylward et al.
8,175,297 B1 5/2012 Ho et al.
8,194,874 B2 6/2012 Starobin et al.
8,229,125 B2 7/2012 Short
8,238,547 B2 8/2012 Ohki et al.
8,238,578 B2 8/2012 Aylward
8,243,961 B1 8/2012 Morrill
8,264,408 B2 9/2012 Kainulainen et al.
8,265,310 B2 9/2012 Berardi et al.
8,270,620 B2 9/2012 Christensen
8,279,709 B2 10/2012 Choisel et al.
8,281,001 B2 10/2012 Busam et al.
8,290,185 B2 10/2012 Kim
8,291,349 B1 10/2012 Park et al.
8,300,845 B2 10/2012 Zurek et al.
8,306,235 B2 11/2012 Mahowald
8,325,931 B2 12/2012 Howard et al.
8,325,935 B2 12/2012 Rutschman
8,325,944 B1 12/2012 Duwenhorst et al.
8,331,585 B2 12/2012 Hagen et al.
8,332,414 B2 12/2012 Nguyen et al.
8,359,621 B2 1/2013 Medina et al.
8,379,876 B2 2/2013 Zhang
8,391,501 B2 3/2013 Khawand et al.
8,392,505 B2 3/2013 Haughay, Jr. et al.
8,401,202 B2 3/2013 Brooking
8,433,076 B2 4/2013 Zurek et al.
8,437,481 B2 5/2013 Johnson
8,447,048 B2 5/2013 Chen et al.

(56) References Cited

U.S. PATENT DOCUMENTS

| | | | |
|---|---|---|---|
| 8,452,020 | B2 | 5/2013 | Gregg et al. |
| 8,463,184 | B2 | 6/2013 | Dua |
| 8,488,799 | B2 | 7/2013 | Goldstein et al. |
| 8,503,669 | B2 | 8/2013 | Mao |
| 8,527,876 | B2 | 9/2013 | Wood et al. |
| 8,566,722 | B2 | 10/2013 | Gordon et al. |
| 8,577,045 | B2 | 11/2013 | Gibbs |
| 8,577,048 | B2 | 11/2013 | Chaikin et al. |
| 8,600,075 | B2 | 12/2013 | Lim |
| 8,606,571 | B1 | 12/2013 | Every et al. |
| 8,620,006 | B2 | 12/2013 | Berardi et al. |
| 8,638,394 | B2 | 1/2014 | Onodera |
| 8,666,812 | B1 | 3/2014 | Gandhi |
| 8,670,574 | B2 | 3/2014 | Ito et al. |
| 8,682,002 | B2 | 3/2014 | Wihardja et al. |
| 8,731,206 | B1 | 5/2014 | Park |
| 8,755,538 | B2 | 6/2014 | Kwon |
| 8,798,280 | B2 | 8/2014 | Goldberg et al. |
| 8,819,554 | B2 | 8/2014 | Basso et al. |
| 8,831,244 | B2 | 9/2014 | Apfel |
| 8,855,319 | B2 | 10/2014 | Liu et al. |
| 8,862,273 | B2 | 10/2014 | Karr |
| 8,879,761 | B2 | 11/2014 | Johnson et al. |
| 8,903,526 | B2 | 12/2014 | Beckhardt et al. |
| 8,914,559 | B2 | 12/2014 | Kalayjian et al. |
| 8,930,005 | B2 | 1/2015 | Reimann |
| 8,934,647 | B2 | 1/2015 | Joyce et al. |
| 8,934,655 | B2 | 1/2015 | Breen et al. |
| 8,948,426 | B2 | 2/2015 | Thomasson et al. |
| 8,965,033 | B2 | 2/2015 | Wiggins |
| 8,965,546 | B2 | 2/2015 | Visser et al. |
| 8,977,974 | B2 | 3/2015 | Kraut |
| 8,984,442 | B2 | 3/2015 | Pirnack et al. |
| 8,989,406 | B2 | 3/2015 | Wong et al. |
| 8,995,687 | B2 | 3/2015 | Marino, Jr. et al. |
| 8,995,688 | B1 | 3/2015 | Chemtob et al. |
| 8,996,370 | B2 | 3/2015 | Ansell |
| 9,014,380 | B2 | 4/2015 | Gautama et al. |
| 9,020,153 | B2 | 4/2015 | Britt, Jr. |
| 9,021,153 | B2 | 4/2015 | Lu |
| 9,065,929 | B2 | 6/2015 | Chen et al. |
| 9,084,058 | B2 | 7/2015 | Reilly et al. |
| 9,100,766 | B2 | 8/2015 | Soulodre |
| 9,106,192 | B2 | 8/2015 | Sheen et al. |
| 9,147,397 | B2 | 9/2015 | Thomsen et al. |
| 9,179,233 | B2 | 11/2015 | Kang |
| 9,218,806 | B1 | 12/2015 | Salvador et al. |
| 9,219,460 | B2 | 12/2015 | Bush |
| 9,226,088 | B2 | 12/2015 | Pandey et al. |
| 9,231,545 | B2 | 1/2016 | Agustin et al. |
| 9,247,365 | B1 | 1/2016 | Ellis et al. |
| 9,264,839 | B2 | 2/2016 | Oishi et al. |
| 9,270,242 | B2 | 2/2016 | Ito et al. |
| 9,275,625 | B2 | 3/2016 | Kim et al. |
| 9,286,384 | B2 | 3/2016 | Kuper et al. |
| 9,288,596 | B2 | 3/2016 | Gossain et al. |
| 9,307,340 | B2 | 4/2016 | Seefeldt |
| 9,332,371 | B2 | 5/2016 | De Bruijn |
| 9,348,824 | B2 | 5/2016 | Coburn, IV |
| 9,355,555 | B2 | 5/2016 | Reichert et al. |
| 9,373,321 | B2 | 6/2016 | Bapat et al. |
| 9,398,392 | B2 | 7/2016 | Ridihalgh et al. |
| 9,418,651 | B2 | 8/2016 | Clark et al. |
| 9,424,840 | B1 | 8/2016 | Hart et al. |
| 9,431,029 | B2 | 8/2016 | Yook et al. |
| 9,443,519 | B1 | 9/2016 | Bakshi et al. |
| 9,451,377 | B2 | 9/2016 | Massey et al. |
| 9,462,399 | B2 | 10/2016 | Bharitkar et al. |
| 9,467,779 | B2 | 10/2016 | Iyengar et al. |
| 9,473,207 | B2 | 10/2016 | McCormack et al. |
| 9,491,499 | B2 | 11/2016 | Wagenaar et al. |
| 9,524,098 | B2 | 12/2016 | Griffiths et al. |
| 9,529,565 | B2 | 12/2016 | Bae et al. |
| 9,538,305 | B2 | 1/2017 | Lehnert et al. |
| 9,538,308 | B2 | 1/2017 | Isaac |
| 9,544,701 | B1 | 1/2017 | Rappoport |
| 9,560,449 | B2 | 1/2017 | Carlsson et al. |
| 9,560,460 | B2 | 1/2017 | Chaikin et al. |
| 9,569,073 | B2 | 2/2017 | Tan |
| 9,575,615 | B1 | 2/2017 | Nicholls et al. |
| 9,584,915 | B2 | 2/2017 | Fullam et al. |
| 9,596,531 | B1 | 3/2017 | Zhang |
| 9,609,383 | B1 | 3/2017 | Hirst |
| 9,628,911 | B2 | 4/2017 | Rabinowitz et al. |
| 9,648,422 | B2 | 5/2017 | Sheen et al. |
| 9,654,073 | B2 | 5/2017 | Apodaca |
| 9,654,545 | B2 | 5/2017 | Gossain |
| 9,674,625 | B2 | 6/2017 | Armstrong-Muntner |
| 9,678,708 | B2 | 6/2017 | Bierbower et al. |
| 9,686,625 | B2 | 6/2017 | Patel |
| 9,689,960 | B1 | 6/2017 | Barton et al. |
| 9,690,271 | B2 | 6/2017 | Sheen et al. |
| 9,690,539 | B2 | 6/2017 | Sheen et al. |
| 9,693,165 | B2 | 6/2017 | Downing et al. |
| 9,697,831 | B2 | 7/2017 | Lesso et al. |
| 9,699,582 | B2 | 7/2017 | Sheerin et al. |
| 9,706,319 | B2 | 7/2017 | Peters et al. |
| 9,706,323 | B2 | 7/2017 | Sheen |
| 9,715,365 | B2 | 7/2017 | Kusano |
| 9,723,420 | B2 | 8/2017 | Family et al. |
| 9,729,984 | B2 | 8/2017 | Tan et al. |
| 9,736,584 | B2 | 8/2017 | Sheen |
| 9,743,208 | B2 | 8/2017 | Oishi et al. |
| 9,749,763 | B2 | 8/2017 | Sheen |
| 9,763,018 | B1 | 9/2017 | McPherson et al. |
| 9,788,113 | B2 | 10/2017 | Wilberding et al. |
| 9,794,722 | B2 | 10/2017 | Petrov |
| 9,807,536 | B2 | 10/2017 | Liu et al. |
| 9,810,784 | B2 | 11/2017 | Altman et al. |
| 9,817,549 | B2 | 11/2017 | Chandrasekaran |
| 9,842,584 | B1 | 12/2017 | Hart et al. |
| 9,860,662 | B2 | 1/2018 | Jarvis et al. |
| 9,864,574 | B2 | 1/2018 | Hartung et al. |
| 9,881,011 | B2 | 1/2018 | Krishna et al. |
| 9,910,634 | B2 | 3/2018 | Sheen |
| 9,913,056 | B2 | 3/2018 | Master et al. |
| 9,916,126 | B2 | 3/2018 | Lang |
| 9,936,290 | B2 | 4/2018 | Mohammad et al. |
| 9,940,930 | B1 | 4/2018 | Campbell et al. |
| 9,952,825 | B2 | 4/2018 | Sheen |
| 9,965,247 | B2 | 5/2018 | Jarvis et al. |
| 9,984,703 | B2 | 5/2018 | Ur et al. |
| 9,997,151 | B1 | 6/2018 | Ayrapetian et al. |
| 10,002,259 | B1 | 6/2018 | Mai |
| 10,007,481 | B2 | 6/2018 | Daly et al. |
| 10,027,662 | B1 | 7/2018 | Mutagi et al. |
| 10,045,142 | B2 | 8/2018 | McPherson et al. |
| 10,079,026 | B1 | 9/2018 | Ebenezer |
| 10,097,919 | B2 | 10/2018 | Jarvis et al. |
| 10,102,848 | B2 | 10/2018 | Koulomzin |
| 10,102,855 | B1 | 10/2018 | Sindhwani |
| 10,111,002 | B1 | 10/2018 | Poulad |
| 10,114,605 | B2 | 10/2018 | Gossain et al. |
| 10,125,006 | B2 | 11/2018 | Jacobsen et al. |
| 10,127,006 | B2 | 11/2018 | Sheen |
| 10,127,908 | B1 | 11/2018 | Deller et al. |
| 10,152,966 | B1 | 12/2018 | O'Malley et al. |
| 10,154,359 | B2 | 12/2018 | Sheen |
| 10,187,025 | B1 | 1/2019 | May et al. |
| 10,206,052 | B2 | 2/2019 | Perianu |
| 10,216,475 | B2 | 2/2019 | Park et al. |
| 10,264,358 | B2 | 4/2019 | Torok et al. |
| 10,275,213 | B2 | 4/2019 | Daly |
| 10,299,054 | B2 | 5/2019 | McPherson et al. |
| 10,299,061 | B1 | 5/2019 | Sheen |
| 10,360,915 | B2 | 7/2019 | Taple et al. |
| 10,402,154 | B2 | 9/2019 | Hartung et al. |
| 10,403,279 | B2 | 9/2019 | Zhao et al. |
| 10,440,492 | B2 | 10/2019 | Crockett |
| 10,446,165 | B2 | 10/2019 | Giacobello |
| 10,482,899 | B2 | 11/2019 | Ramprashad et al. |
| 10,510,362 | B2 | 12/2019 | Hicks et al. |
| 10,555,077 | B2 | 2/2020 | Jarvis et al. |
| 10,567,900 | B2 | 2/2020 | Tanaka et al. |

(56) References Cited

U.S. PATENT DOCUMENTS

| | | | |
|---|---|---|---|
| 10,567,901 | B2 | 2/2020 | Po et al. |
| 10,587,430 | B1 | 3/2020 | Smith et al. |
| 10,791,407 | B2 | 9/2020 | Oishi et al. |
| 10,811,015 | B2 | 10/2020 | Smith et al. |
| 10,817,249 | B2 | 10/2020 | Tanaka et al. |
| 10,847,178 | B2 | 11/2020 | Sereshki et al. |
| 10,853,022 | B2 | 12/2020 | Wilberding et al. |
| 10,863,295 | B2 | 12/2020 | Bush |
| 10,877,637 | B1 | 12/2020 | Antos et al. |
| 10,904,691 | B2 | 1/2021 | Tu et al. |
| 10,959,029 | B2 | 3/2021 | Soto et al. |
| 11,017,789 | B2 | 5/2021 | Giacobello |
| 11,095,978 | B2 | 8/2021 | Gigandet et al. |
| 11,100,922 | B1 | 8/2021 | Mutagi et al. |
| 11,138,975 | B2 | 10/2021 | D'Amato et al. |
| 11,140,494 | B2 | 10/2021 | Pedersen et al. |
| 11,178,716 | B2 | 11/2021 | Baik et al. |
| 11,189,286 | B2 | 11/2021 | Schillmoeller et al. |
| 11,200,894 | B2 | 12/2021 | Smith et al. |
| 11,200,900 | B2 | 12/2021 | Smith |
| 11,206,002 | B2 | 12/2021 | Charlton et al. |
| 11,258,671 | B1 | 2/2022 | Vora et al. |
| 11,295,754 | B2 | 4/2022 | Eubank et al. |
| 11,302,326 | B2 | 4/2022 | Sereshki |
| 11,308,958 | B2 | 4/2022 | Smith |
| 11,308,962 | B2 | 4/2022 | Smith et al. |
| 11,361,756 | B2 | 6/2022 | Smith et al. |
| 11,363,236 | B1 | 6/2022 | Zhang |
| 11,388,532 | B2 | 7/2022 | Lambourne |
| 11,432,030 | B2 | 8/2022 | Smith et al. |
| 11,437,036 | B2 | 9/2022 | Zhang et al. |
| 11,443,741 | B2 | 9/2022 | Huang et al. |
| 11,482,224 | B2 | 10/2022 | Smith et al. |
| 11,501,773 | B2 | 11/2022 | Smith et al. |
| 11,513,216 | B1 | 11/2022 | Kamath Koteshwara et al. |
| 11,532,306 | B2 | 12/2022 | Kim et al. |
| 11,538,460 | B2 | 12/2022 | Tolomei et al. |
| 11,540,047 | B2 | 12/2022 | Soto |
| 11,551,700 | B2 | 1/2023 | Jones et al. |
| 11,556,306 | B2 | 1/2023 | Jarvis et al. |
| 11,646,045 | B2 | 5/2023 | Giacobello |
| 11,688,419 | B2 | 6/2023 | Sereshki et al. |
| 11,696,074 | B2 | 7/2023 | Woo et al. |
| 11,700,139 | B2 | 7/2023 | Drake |
| 11,711,662 | B2 | 7/2023 | Stachura |
| 11,714,600 | B2 | 8/2023 | D'Amato et al. |
| 11,715,489 | B2 | 8/2023 | Sereshki et al. |
| 11,721,341 | B2 | 8/2023 | Kim et al. |
| 11,722,571 | B1 | 8/2023 | Chenier et al. |
| 11,727,930 | B2 | 8/2023 | Topcu et al. |
| 11,741,948 | B2 | 8/2023 | Coucke et al. |
| 11,750,969 | B2 | 9/2023 | Lang |
| 11,769,505 | B2 | 9/2023 | Sereshki |
| 11,771,866 | B2 | 10/2023 | D'Amato et al. |
| 11,778,361 | B1 | 10/2023 | Lovitt |
| 11,790,911 | B2 | 10/2023 | Fainberg et al. |
| 11,790,937 | B2 | 10/2023 | Smith et al. |
| 11,797,263 | B2 | 10/2023 | Liu et al. |
| 11,817,076 | B2 | 11/2023 | Sereshki et al. |
| 11,832,068 | B2 | 11/2023 | Jarvis et al. |
| 11,881,223 | B2 | 1/2024 | Myers et al. |
| 11,934,742 | B2 | 3/2024 | Wilberding |
| 11,961,519 | B2 | 4/2024 | Smith |
| 12,142,266 | B2 | 11/2024 | Elkhatib et al. |
| 2001/0038702 | A1 | 11/2001 | Lavoie et al. |
| 2001/0043592 | A1 | 11/2001 | Jimenez et al. |
| 2001/0053228 | A1 | 12/2001 | Jones |
| 2002/0077830 | A1 | 6/2002 | Suomela et al. |
| 2002/0078161 | A1 | 6/2002 | Cheng |
| 2002/0089529 | A1 | 7/2002 | Robbin |
| 2002/0126852 | A1 | 9/2002 | Kashani |
| 2002/0136414 | A1 | 9/2002 | Jordan et al. |
| 2002/0146136 | A1 | 10/2002 | Carter, Jr. |
| 2002/0169583 | A1 | 11/2002 | Gutta et al. |
| 2002/0184015 | A1 | 12/2002 | Li et al. |
| 2003/0002689 | A1 | 1/2003 | Folio |
| 2003/0031334 | A1 | 2/2003 | Layton et al. |
| 2003/0081115 | A1 | 5/2003 | Curry et al. |
| 2003/0108212 | A1 | 6/2003 | Yun |
| 2003/0159569 | A1 | 8/2003 | Ohta |
| 2003/0161479 | A1 | 8/2003 | Yang et al. |
| 2003/0161492 | A1 | 8/2003 | Miller et al. |
| 2003/0179891 | A1 | 9/2003 | Rabinowitz et al. |
| 2003/0235311 | A1 | 12/2003 | Grancea et al. |
| 2004/0071294 | A1 | 4/2004 | Halgas, Jr. et al. |
| 2004/0114771 | A1 | 6/2004 | Vaughan et al. |
| 2004/0131338 | A1 | 7/2004 | Asada et al. |
| 2004/0236570 | A1 | 11/2004 | Tato et al. |
| 2004/0237750 | A1 | 12/2004 | Smith et al. |
| 2005/0021470 | A1 | 1/2005 | Martin et al. |
| 2005/0031143 | A1 | 2/2005 | Devantier et al. |
| 2005/0063554 | A1 | 3/2005 | Devantier et al. |
| 2005/0131558 | A1 | 6/2005 | Braithwaite et al. |
| 2005/0147261 | A1 | 7/2005 | Yeh |
| 2005/0157885 | A1 | 7/2005 | Olney et al. |
| 2005/0276425 | A1 | 12/2005 | Forrester et al. |
| 2006/0008256 | A1 | 1/2006 | Khedouri et al. |
| 2006/0026521 | A1 | 2/2006 | Hotelling et al. |
| 2006/0032357 | A1 | 2/2006 | Roovers et al. |
| 2006/0147057 | A1 | 7/2006 | Aggarwal et al. |
| 2006/0153391 | A1 | 7/2006 | Hooley et al. |
| 2006/0161964 | A1 | 7/2006 | Chung |
| 2006/0195480 | A1 | 8/2006 | Spiegelman et al. |
| 2006/0206340 | A1 | 9/2006 | Silvera et al. |
| 2006/0209197 | A1 | 9/2006 | Vanhatalo |
| 2006/0217976 | A1 | 9/2006 | Gao et al. |
| 2006/0225097 | A1 | 10/2006 | Lawrence-Apfelbaum |
| 2006/0289622 | A1 | 12/2006 | Khor et al. |
| 2007/0003067 | A1 | 1/2007 | Gierl et al. |
| 2007/0005206 | A1 | 1/2007 | Zhang et al. |
| 2007/0022207 | A1 | 1/2007 | Millington |
| 2007/0025559 | A1 | 2/2007 | Mihelich et al. |
| 2007/0032895 | A1 | 2/2007 | Nackvi et al. |
| 2007/0086597 | A1 | 4/2007 | Kino |
| 2007/0087686 | A1 | 4/2007 | Holm et al. |
| 2007/0116254 | A1 | 5/2007 | Looney et al. |
| 2007/0121955 | A1 | 5/2007 | Johnston et al. |
| 2007/0136778 | A1 | 6/2007 | Birger et al. |
| 2007/0142944 | A1* | 6/2007 | Goldberg ............. G10H 1/0025 700/94 |
| 2007/0217619 | A1 | 9/2007 | Hall et al. |
| 2008/0002839 | A1 | 1/2008 | Eng |
| 2008/0014989 | A1 | 1/2008 | Sandegard et al. |
| 2008/0065247 | A1 | 3/2008 | Igoe |
| 2008/0069378 | A1 | 3/2008 | Rabinowitz et al. |
| 2008/0077261 | A1 | 3/2008 | Baudino et al. |
| 2008/0098027 | A1 | 4/2008 | Aarts |
| 2008/0107128 | A1 | 5/2008 | Lo et al. |
| 2008/0136623 | A1 | 6/2008 | Calvarese |
| 2008/0144864 | A1 | 6/2008 | Huon |
| 2008/0175411 | A1 | 7/2008 | Greve |
| 2008/0205647 | A1 | 8/2008 | Zhang et al. |
| 2008/0214160 | A1 | 9/2008 | Jonsson |
| 2008/0232603 | A1 | 9/2008 | Soulodre |
| 2008/0266385 | A1 | 10/2008 | Smith et al. |
| 2008/0281523 | A1 | 11/2008 | Dahl et al. |
| 2009/0003613 | A1 | 1/2009 | Christensen |
| 2009/0024662 | A1 | 1/2009 | Park et al. |
| 2009/0031147 | A1 | 1/2009 | Horvat |
| 2009/0047993 | A1 | 2/2009 | Vasa |
| 2009/0063274 | A1 | 3/2009 | Dublin, III et al. |
| 2009/0089054 | A1 | 4/2009 | Wang et al. |
| 2009/0110218 | A1 | 4/2009 | Swain |
| 2009/0138507 | A1 | 5/2009 | Burckart et al. |
| 2009/0147134 | A1 | 6/2009 | Iwamatsu |
| 2009/0169025 | A1 | 7/2009 | Chen |
| 2009/0171487 | A1 | 7/2009 | Wilhelm |
| 2009/0175476 | A1 | 7/2009 | Bottum |
| 2009/0180632 | A1 | 7/2009 | Goldberg et al. |
| 2009/0196428 | A1 | 8/2009 | Kim |
| 2009/0202082 | A1 | 8/2009 | Bharitkar et al. |
| 2009/0232481 | A1 | 9/2009 | Baalbergen et al. |
| 2009/0252481 | A1 | 10/2009 | Ekstrand |
| 2009/0262256 | A1 | 10/2009 | Asayama et al. |

(56) References Cited

U.S. PATENT DOCUMENTS

| | | | |
|---|---|---|---|
| 2009/0285404 | A1 | 11/2009 | Hsu et al. |
| 2009/0304194 | A1 | 12/2009 | Eggleston et al. |
| 2009/0304205 | A1 | 12/2009 | Hardacker et al. |
| 2009/0316923 | A1 | 12/2009 | Tashev et al. |
| 2010/0013550 | A1 | 1/2010 | Tanaka |
| 2010/0054275 | A1 | 3/2010 | Noonan et al. |
| 2010/0057451 | A1 | 3/2010 | Carraux et al. |
| 2010/0095332 | A1 | 4/2010 | Gran et al. |
| 2010/0103776 | A1 | 4/2010 | Chan |
| 2010/0104114 | A1 | 4/2010 | Chapman |
| 2010/0128902 | A1 | 5/2010 | Liu et al. |
| 2010/0135501 | A1 | 6/2010 | Corbett et al. |
| 2010/0142735 | A1 | 6/2010 | Yoon et al. |
| 2010/0146445 | A1 | 6/2010 | Kraut |
| 2010/0162117 | A1 | 6/2010 | Basso et al. |
| 2010/0189203 | A1 | 7/2010 | Wilhelmsson et al. |
| 2010/0195846 | A1 | 8/2010 | Yokoyama |
| 2010/0272270 | A1 | 10/2010 | Chaikin et al. |
| 2010/0290643 | A1 | 11/2010 | Mihelich et al. |
| 2010/0296659 | A1 | 11/2010 | Tanaka |
| 2010/0303248 | A1 | 12/2010 | Tawada |
| 2010/0303250 | A1 | 12/2010 | Goldberg et al. |
| 2010/0323793 | A1 | 12/2010 | Andall |
| 2011/0002471 | A1 | 1/2011 | Wihardja et al. |
| 2011/0007904 | A1 | 1/2011 | Tomoda et al. |
| 2011/0007905 | A1 | 1/2011 | Sato et al. |
| 2011/0024566 | A1 | 2/2011 | Soenarjo |
| 2011/0029111 | A1 | 2/2011 | Sabin et al. |
| 2011/0051959 | A1 | 3/2011 | Ito et al. |
| 2011/0087842 | A1 | 4/2011 | Lu et al. |
| 2011/0135103 | A1 | 6/2011 | Sun et al. |
| 2011/0150228 | A1 | 6/2011 | Yoon et al. |
| 2011/0150230 | A1 | 6/2011 | Tanaka |
| 2011/0150247 | A1 | 6/2011 | Oliveras |
| 2011/0153326 | A1 | 6/2011 | Garudadri et al. |
| 2011/0170710 | A1 | 7/2011 | Son |
| 2011/0216093 | A1 | 9/2011 | Griffin |
| 2011/0216924 | A1 | 9/2011 | Berardi et al. |
| 2011/0234480 | A1 | 9/2011 | Fino et al. |
| 2011/0235808 | A1 | 9/2011 | Kon |
| 2011/0246566 | A1 | 10/2011 | Kashef et al. |
| 2011/0268281 | A1 | 11/2011 | Florencio et al. |
| 2011/0286601 | A1 | 11/2011 | Fukui et al. |
| 2011/0293123 | A1 | 12/2011 | Neumeyer et al. |
| 2012/0010890 | A1 | 1/2012 | Koverzin |
| 2012/0032928 | A1 | 2/2012 | Alberth et al. |
| 2012/0051558 | A1 | 3/2012 | Kim et al. |
| 2012/0057724 | A1 | 3/2012 | Rabinowitz et al. |
| 2012/0063615 | A1 | 3/2012 | Crockett et al. |
| 2012/0093320 | A1 | 4/2012 | Flaks et al. |
| 2012/0114152 | A1 | 5/2012 | Nguyen et al. |
| 2012/0127831 | A1 | 5/2012 | Gicklhorn et al. |
| 2012/0140936 | A1 | 6/2012 | Bonnick et al. |
| 2012/0183156 | A1 | 7/2012 | Schlessinger et al. |
| 2012/0184335 | A1 | 7/2012 | Kim et al. |
| 2012/0209612 | A1 | 8/2012 | Bilobrov |
| 2012/0213391 | A1 | 8/2012 | Usami et al. |
| 2012/0215530 | A1 | 8/2012 | Harsch |
| 2012/0237037 | A1 | 9/2012 | Ninan et al. |
| 2012/0243697 | A1 | 9/2012 | Frye |
| 2012/0263325 | A1 | 10/2012 | Freeman et al. |
| 2012/0268145 | A1 | 10/2012 | Chandra et al. |
| 2012/0269356 | A1 | 10/2012 | Sheerin et al. |
| 2012/0270653 | A1 | 10/2012 | Kareemi et al. |
| 2012/0275613 | A1 | 11/2012 | Soulodre |
| 2012/0283593 | A1 | 11/2012 | Searchfield et al. |
| 2012/0288124 | A1 | 11/2012 | Fejzo et al. |
| 2013/0003981 | A1 | 1/2013 | Lane |
| 2013/0010970 | A1 | 1/2013 | Hegarty et al. |
| 2013/0019193 | A1 | 1/2013 | Rhee et al. |
| 2013/0024880 | A1 | 1/2013 | Moloney-Egnatios et al. |
| 2013/0028443 | A1 | 1/2013 | Pance et al. |
| 2013/0051572 | A1 | 2/2013 | Goh et al. |
| 2013/0108055 | A1 | 5/2013 | Hanna et al. |
| 2013/0129102 | A1 | 5/2013 | Li et al. |
| 2013/0129122 | A1 | 5/2013 | Johnson et al. |
| 2013/0166227 | A1 | 6/2013 | Hermann et al. |
| 2013/0171930 | A1 | 7/2013 | Anand et al. |
| 2013/0173794 | A1 | 7/2013 | Agerbak et al. |
| 2013/0179535 | A1 | 7/2013 | Baalu et al. |
| 2013/0202131 | A1 | 8/2013 | Kemmochi et al. |
| 2013/0211843 | A1 | 8/2013 | Clarkson |
| 2013/0216071 | A1 | 8/2013 | Maher et al. |
| 2013/0223642 | A1 | 8/2013 | Warren et al. |
| 2013/0230175 | A1 | 9/2013 | Francombe et al. |
| 2013/0259254 | A1 | 10/2013 | Xiang et al. |
| 2013/0279706 | A1 | 10/2013 | Marti |
| 2013/0294618 | A1 | 11/2013 | Lyubachev |
| 2013/0305152 | A1 | 11/2013 | Griffiths et al. |
| 2013/0308794 | A1 | 11/2013 | Jochim et al. |
| 2013/0315405 | A1 | 11/2013 | Kanishima et al. |
| 2013/0317783 | A1 | 11/2013 | Tennant |
| 2013/0346559 | A1 | 12/2013 | Van Erven et al. |
| 2014/0003622 | A1 | 1/2014 | Ikizyan et al. |
| 2014/0003623 | A1 | 1/2014 | Lang |
| 2014/0003626 | A1 | 1/2014 | Holman et al. |
| 2014/0006587 | A1 | 1/2014 | Kusano |
| 2014/0016784 | A1 | 1/2014 | Sen et al. |
| 2014/0016786 | A1 | 1/2014 | Sen |
| 2014/0016802 | A1 | 1/2014 | Sen |
| 2014/0023196 | A1 | 1/2014 | Xiang et al. |
| 2014/0029201 | A1 | 1/2014 | Yang et al. |
| 2014/0032709 | A1 | 1/2014 | Saussy et al. |
| 2014/0037097 | A1 | 2/2014 | LaBosco |
| 2014/0037107 | A1 | 2/2014 | Marino, Jr. et al. |
| 2014/0052770 | A1 | 2/2014 | Gran et al. |
| 2014/0079242 | A1 | 3/2014 | Nguyen et al. |
| 2014/0084014 | A1 | 3/2014 | Sim et al. |
| 2014/0086423 | A1 | 3/2014 | Domingo Yaguez et al. |
| 2014/0093093 | A1 | 4/2014 | Dusan et al. |
| 2014/0112481 | A1 | 4/2014 | Li et al. |
| 2014/0112502 | A1 | 4/2014 | Lee |
| 2014/0119551 | A1 | 5/2014 | Bharitkar et al. |
| 2014/0122092 | A1 | 5/2014 | Goldstein |
| 2014/0126730 | A1 | 5/2014 | Crawley et al. |
| 2014/0161265 | A1 | 6/2014 | Chaikin et al. |
| 2014/0169569 | A1 | 6/2014 | Toivanen et al. |
| 2014/0170979 | A1 | 6/2014 | Samanta Singhar |
| 2014/0180684 | A1 | 6/2014 | Strub |
| 2014/0180697 | A1 | 6/2014 | Torok et al. |
| 2014/0201635 | A1 | 7/2014 | Kumar et al. |
| 2014/0210728 | A1 | 7/2014 | Busse et al. |
| 2014/0219456 | A1 | 8/2014 | Morrell et al. |
| 2014/0219483 | A1 | 8/2014 | Hong |
| 2014/0226823 | A1 | 8/2014 | Sen et al. |
| 2014/0226837 | A1 | 8/2014 | Grokop |
| 2014/0242913 | A1 | 8/2014 | Pang |
| 2014/0244267 | A1 | 8/2014 | Levi |
| 2014/0253676 | A1 | 9/2014 | Nagase et al. |
| 2014/0267148 | A1 | 9/2014 | Luna et al. |
| 2014/0270202 | A1 | 9/2014 | Ivanov et al. |
| 2014/0270248 | A1 | 9/2014 | Ivanov et al. |
| 2014/0273859 | A1 | 9/2014 | Luna et al. |
| 2014/0274212 | A1 | 9/2014 | Zurek et al. |
| 2014/0279889 | A1 | 9/2014 | Luna |
| 2014/0285313 | A1 | 9/2014 | Luna et al. |
| 2014/0286496 | A1 | 9/2014 | Luna et al. |
| 2014/0294200 | A1 | 10/2014 | Baumgarte et al. |
| 2014/0294201 | A1 | 10/2014 | Johnson et al. |
| 2014/0310269 | A1 | 10/2014 | Zhang et al. |
| 2014/0321670 | A1 | 10/2014 | Nystrom et al. |
| 2014/0323036 | A1 | 10/2014 | Daley et al. |
| 2014/0334644 | A1 | 11/2014 | Selig et al. |
| 2014/0341399 | A1 | 11/2014 | Dusse et al. |
| 2014/0344689 | A1 | 11/2014 | Scott et al. |
| 2014/0355768 | A1 | 12/2014 | Sen et al. |
| 2014/0355794 | A1 | 12/2014 | Morrell et al. |
| 2014/0364056 | A1 | 12/2014 | Belk et al. |
| 2014/0369519 | A1 | 12/2014 | Leschka et al. |
| 2015/0011195 | A1 | 1/2015 | Li |
| 2015/0023509 | A1 | 1/2015 | Devantier et al. |
| 2015/0031287 | A1 | 1/2015 | Pang et al. |
| 2015/0032844 | A1 | 1/2015 | Tarr et al. |
| 2015/0036847 | A1 | 2/2015 | Donaldson |

(56) References Cited

U.S. PATENT DOCUMENTS

| | | | |
|---|---|---|---|
| 2015/0036848 | A1 | 2/2015 | Donaldson |
| 2015/0043736 | A1 | 2/2015 | Olsen |
| 2015/0051723 | A1 | 2/2015 | Bates et al. |
| 2015/0063610 | A1 | 3/2015 | Mossner |
| 2015/0078586 | A1 | 3/2015 | Ang et al. |
| 2015/0078596 | A1 | 3/2015 | Sprogis |
| 2015/0100991 | A1 | 4/2015 | Toth |
| 2015/0112689 | A1 | 4/2015 | Nandy et al. |
| 2015/0146886 | A1 | 5/2015 | Baumgarte |
| 2015/0149943 | A1 | 5/2015 | Nguyen et al. |
| 2015/0161360 | A1 | 6/2015 | Paruchuri et al. |
| 2015/0195666 | A1 | 7/2015 | Massey et al. |
| 2015/0201274 | A1 | 7/2015 | Ellner et al. |
| 2015/0208184 | A1 | 7/2015 | Tan et al. |
| 2015/0208188 | A1 | 7/2015 | Carlsson et al. |
| 2015/0215382 | A1 | 7/2015 | Arora et al. |
| 2015/0220558 | A1 | 8/2015 | Snibbe et al. |
| 2015/0221322 | A1 | 8/2015 | Iyengar et al. |
| 2015/0223002 | A1 | 8/2015 | Mehta et al. |
| 2015/0223004 | A1 | 8/2015 | Deprez et al. |
| 2015/0229699 | A1 | 8/2015 | Liu |
| 2015/0237454 | A1 | 8/2015 | Scheirer et al. |
| 2015/0260754 | A1 | 9/2015 | Perotti et al. |
| 2015/0263692 | A1 | 9/2015 | Bush |
| 2015/0264023 | A1 | 9/2015 | Reno |
| 2015/0271616 | A1 | 9/2015 | Kechichian |
| 2015/0271620 | A1 | 9/2015 | Lando et al. |
| 2015/0281866 | A1 | 10/2015 | Williams et al. |
| 2015/0286360 | A1 | 10/2015 | Wachter |
| 2015/0289064 | A1 | 10/2015 | Jensen et al. |
| 2015/0293744 | A1 | 10/2015 | Bae et al. |
| 2015/0350766 | A1 | 12/2015 | Schobel et al. |
| 2015/0358756 | A1 | 12/2015 | Harma et al. |
| 2015/0365762 | A1 | 12/2015 | Truon et al. |
| 2016/0011846 | A1 | 1/2016 | Sheen |
| 2016/0011848 | A1 | 1/2016 | Wilberding et al. |
| 2016/0011850 | A1 | 1/2016 | Sheen et al. |
| 2016/0014509 | A1 | 1/2016 | Hansson et al. |
| 2016/0014510 | A1 | 1/2016 | Sheen |
| 2016/0014511 | A1 | 1/2016 | Sheen et al. |
| 2016/0014534 | A1 | 1/2016 | Sheen |
| 2016/0014535 | A1 | 1/2016 | Wilberding et al. |
| 2016/0021473 | A1 | 1/2016 | Riggi et al. |
| 2016/0021481 | A1 | 1/2016 | Johnson et al. |
| 2016/0027467 | A1 | 1/2016 | Proud |
| 2016/0036404 | A1 | 2/2016 | Fleischmann et al. |
| 2016/0036881 | A1 | 2/2016 | Tembey et al. |
| 2016/0037277 | A1 | 2/2016 | Matsumoto et al. |
| 2016/0061597 | A1 | 3/2016 | De Bruijn |
| 2016/0070525 | A1 | 3/2016 | Sheen et al. |
| 2016/0073210 | A1 | 3/2016 | Sheen |
| 2016/0077574 | A1 | 3/2016 | Bansal et al. |
| 2016/0078864 | A1 | 3/2016 | Palanisamy et al. |
| 2016/0088438 | A1 | 3/2016 | O'Keeffe |
| 2016/0119730 | A1 | 4/2016 | Virtanen |
| 2016/0140969 | A1 | 5/2016 | Srinivasan et al. |
| 2016/0142849 | A1 | 5/2016 | Satheesh et al. |
| 2016/0165297 | A1 | 6/2016 | Jamal-Syed et al. |
| 2016/0192098 | A1 | 6/2016 | Oishi et al. |
| 2016/0192100 | A1 | 6/2016 | Rabinowitz et al. |
| 2016/0212535 | A1 | 7/2016 | Le Nerriec et al. |
| 2016/0234615 | A1 | 8/2016 | Lambourne |
| 2016/0241907 | A1 | 8/2016 | Pearson |
| 2016/0246449 | A1 | 8/2016 | Jarske |
| 2016/0254696 | A1 | 9/2016 | Plumb et al. |
| 2016/0260140 | A1 | 9/2016 | Shirley et al. |
| 2016/0295340 | A1 | 10/2016 | Baker et al. |
| 2016/0309276 | A1 | 10/2016 | Ridihalgh et al. |
| 2016/0316502 | A1 | 10/2016 | DeCicco |
| 2016/0323863 | A1 | 11/2016 | Park et al. |
| 2016/0330562 | A1 | 11/2016 | Crockett |
| 2016/0342201 | A1 | 11/2016 | Jehan |
| 2016/0353018 | A1 | 12/2016 | Anderson et al. |
| 2016/0366517 | A1 | 12/2016 | Chandran et al. |
| 2016/0373860 | A1 | 12/2016 | Leschka et al. |
| 2016/0378430 | A1 | 12/2016 | McCarthy |
| 2016/0379632 | A1 | 12/2016 | Hoffmeister et al. |
| 2017/0069338 | A1 | 3/2017 | Elliot et al. |
| 2017/0070826 | A1 | 3/2017 | Pedersen et al. |
| 2017/0083279 | A1 | 3/2017 | Sheen |
| 2017/0086003 | A1 | 3/2017 | Rabinowitz et al. |
| 2017/0105084 | A1 | 4/2017 | Holman |
| 2017/0142532 | A1 | 5/2017 | Pan |
| 2017/0162198 | A1 | 6/2017 | Chakladar et al. |
| 2017/0207762 | A1 | 7/2017 | Porter et al. |
| 2017/0215017 | A1 | 7/2017 | Hartung et al. |
| 2017/0223447 | A1 | 8/2017 | Johnson et al. |
| 2017/0230772 | A1 | 8/2017 | Johnson et al. |
| 2017/0242651 | A1 * | 8/2017 | Lang ....................... G06F 3/165 |
| 2017/0257722 | A1 | 9/2017 | Kerdranvat et al. |
| 2017/0273024 | A1 | 9/2017 | Xu et al. |
| 2017/0280265 | A1 | 9/2017 | Po |
| 2017/0286052 | A1 | 10/2017 | Hartung et al. |
| 2017/0287496 | A1 | 10/2017 | Heitkamp et al. |
| 2017/0303039 | A1 | 10/2017 | Iyer et al. |
| 2017/0311108 | A1 | 10/2017 | Patel |
| 2017/0330429 | A1 | 11/2017 | Tak et al. |
| 2017/0330566 | A1 | 11/2017 | Trott et al. |
| 2017/0337932 | A1 | 11/2017 | Iyengar et al. |
| 2017/0358305 | A1 | 12/2017 | Kudurshian et al. |
| 2017/0358313 | A1 | 12/2017 | Shih |
| 2017/0374482 | A1 | 12/2017 | McPherson et al. |
| 2018/0011685 | A1 | 1/2018 | Weingartner |
| 2018/0014989 | A1 | 1/2018 | Levine |
| 2018/0025732 | A1 | 1/2018 | Lepauloux et al. |
| 2018/0053394 | A1 | 2/2018 | Gersten |
| 2018/0096460 | A1 | 4/2018 | Tripp |
| 2018/0121432 | A1 | 5/2018 | Parson et al. |
| 2018/0176713 | A1 | 6/2018 | Linsky et al. |
| 2018/0181741 | A1 | 6/2018 | Whaley |
| 2018/0211667 | A1 | 7/2018 | Haubrich et al. |
| 2018/0240463 | A1 | 8/2018 | Perotti |
| 2018/0253281 | A1 | 9/2018 | Jarvis et al. |
| 2018/0278999 | A1 | 9/2018 | David et al. |
| 2018/0293974 | A1 | 10/2018 | Georges et al. |
| 2018/0315429 | A1 | 11/2018 | Taple et al. |
| 2018/0336449 | A1 | 11/2018 | Adan et al. |
| 2018/0376268 | A1 | 12/2018 | Kerdranvat et al. |
| 2019/0007232 | A1 | 1/2019 | Kim et al. |
| 2019/0013021 | A1 | 1/2019 | Chang et al. |
| 2019/0020761 | A1 | 1/2019 | Golden et al. |
| 2019/0025878 | A1 | 1/2019 | Shin et al. |
| 2019/0037328 | A1 | 1/2019 | McPherson et al. |
| 2019/0058942 | A1 | 2/2019 | Garner et al. |
| 2019/0074008 | A1 | 3/2019 | Beckhardt et al. |
| 2019/0147905 | A1 | 5/2019 | Mai |
| 2019/0156818 | A1 | 5/2019 | Piersol et al. |
| 2019/0172461 | A1 | 6/2019 | Jin |
| 2019/0207777 | A1 | 7/2019 | Patel et al. |
| 2019/0214023 | A1 | 7/2019 | Ihara |
| 2019/0221205 | A1 | 7/2019 | Czyryba et al. |
| 2019/0222756 | A1 | 7/2019 | Moloney et al. |
| 2019/0237069 | A1 | 8/2019 | Zhao et al. |
| 2019/0237071 | A1 | 8/2019 | Wang et al. |
| 2019/0259381 | A1 | 8/2019 | Ebenezer |
| 2019/0267008 | A1 | 8/2019 | Leong |
| 2019/0295533 | A1 | 9/2019 | Wang et al. |
| 2019/0311719 | A1 | 10/2019 | Adams |
| 2019/0320278 | A1 | 10/2019 | McPherson et al. |
| 2019/0355384 | A1 | 11/2019 | Sereshki et al. |
| 2019/0371327 | A1 | 12/2019 | Quinn et al. |
| 2019/0392834 | A1 | 12/2019 | Yi et al. |
| 2019/0392837 | A1 | 12/2019 | Jung et al. |
| 2020/0005830 | A1 | 1/2020 | Wasada et al. |
| 2020/0089464 | A1 | 3/2020 | Curtis |
| 2020/0089469 | A1 | 3/2020 | Wilberding et al. |
| 2020/0090643 | A1 | 3/2020 | Shin et al. |
| 2020/0090646 | A1 | 3/2020 | Smith et al. |
| 2020/0128317 | A1 | 4/2020 | Feldman |
| 2020/0194001 | A1 | 6/2020 | Smith et al. |
| 2020/0249346 | A1 | 8/2020 | Lim et al. |
| 2020/0258512 | A1 | 8/2020 | Smith et al. |
| 2020/0258513 | A1 | 8/2020 | Smith et al. |
| 2020/0275250 | A1 | 8/2020 | Choi et al. |

(56) References Cited

U.S. PATENT DOCUMENTS

| | | | |
|---|---|---|---|
| 2020/0280800 | A1 | 9/2020 | Wilberding et al. |
| 2020/0312315 | A1 | 10/2020 | Li et al. |
| 2020/0382888 | A1 | 12/2020 | McPherson et al. |
| 2021/0005199 | A1 | 1/2021 | Gella et al. |
| 2021/0043198 | A1 | 2/2021 | Tanaka et al. |
| 2021/0074317 | A1 | 3/2021 | Sereshki et al. |
| 2021/0082435 | A1 | 3/2021 | Lebeau et al. |
| 2021/0084589 | A1 | 3/2021 | Yu |
| 2021/0090578 | A1 | 3/2021 | Trapp et al. |
| 2021/0134280 | A1 | 5/2021 | Kurtz |
| 2021/0141050 | A1 | 5/2021 | Janssen et al. |
| 2021/0174794 | A1 | 6/2021 | Mont-Reynaud |
| 2021/0174812 | A1 | 6/2021 | Gao |
| 2021/0193132 | A1 | 6/2021 | Hanes et al. |
| 2021/0210085 | A1 | 7/2021 | Smith |
| 2021/0241759 | A1 | 8/2021 | Yang et al. |
| 2021/0256974 | A1 | 8/2021 | Boettger et al. |
| 2021/0287670 | A1 | 9/2021 | Regan et al. |
| 2021/0295833 | A1 | 9/2021 | Rastrow et al. |
| 2021/0318849 | A1 | 10/2021 | Artsiom |
| 2021/0326099 | A1 | 10/2021 | Hirsch et al. |
| 2021/0358496 | A1 | 11/2021 | Sukumar |
| 2021/0366476 | A1 | 11/2021 | Smith et al. |
| 2021/0382679 | A1 | 12/2021 | Kuivalainen et al. |
| 2021/0383794 | A1 | 12/2021 | Kim et al. |
| 2022/0020388 | A1 | 1/2022 | Trim et al. |
| 2022/0027051 | A1 | 1/2022 | Kant et al. |
| 2022/0208186 | A1 | 6/2022 | Smith |
| 2022/0386945 | A1 | 12/2022 | Wu et al. |
| 2023/0237997 | A1 | 7/2023 | Ramic et al. |
| 2023/0362566 | A1 | 11/2023 | Bush |
| 2024/0001077 | A1 | 1/2024 | D'Amato et al. |
| 2024/0096348 | A1 | 3/2024 | Sereshki et al. |
| 2024/0265921 | A1 | 8/2024 | Dureau |
| 2024/0373161 | A1 | 11/2024 | Singleton et al. |
| 2024/0412729 | A1 | 12/2024 | Smith |

FOREIGN PATENT DOCUMENTS

| | | | |
|---|---|---|---|
| CN | 1622694 | A | 6/2005 |
| CN | 1984507 | A | 6/2007 |
| CN | 101032187 | A | 9/2007 |
| CN | 101047777 | A | 10/2007 |
| CN | 101366177 | A | 2/2009 |
| CN | 101473636 | A | 7/2009 |
| CN | 101478296 | A | 7/2009 |
| CN | 101491116 | A | 7/2009 |
| CN | 101569093 | A | 10/2009 |
| CN | 101681219 | A | 3/2010 |
| CN | 101754087 | A | 6/2010 |
| CN | 101800051 | A | 8/2010 |
| CN | 102004823 | A | 4/2011 |
| CN | 102318325 | A | 1/2012 |
| CN | 102823277 | A | 12/2012 |
| CN | 102893633 | A | 1/2013 |
| CN | 103491397 | A | 1/2014 |
| CN | 103811010 | A | 5/2014 |
| CN | 103988523 | A | 8/2014 |
| CN | 104219604 | A | 12/2014 |
| CN | 104247461 | A | 12/2014 |
| CN | 104284291 | A | 1/2015 |
| CN | 104584061 | A | 4/2015 |
| CN | 104967953 | A | 10/2015 |
| CN | 105163221 | A | 12/2015 |
| CN | 109243452 | A | 1/2019 |
| CN | 110349579 | A | 10/2019 |
| DE | 102007032281 | A1 | 1/2009 |
| EP | 0505949 | A1 | 9/1992 |
| EP | 0772374 | A2 | 5/1997 |
| EP | 1133896 | B1 | 8/2002 |
| EP | 1349427 | A2 | 10/2003 |
| EP | 1612999 | A1 | 1/2006 |
| EP | 2043381 | A2 | 4/2009 |
| EP | 1349427 | B1 | 12/2009 |
| EP | 2161950 | A2 | 3/2010 |
| EP | 2194471 | A1 | 6/2010 |
| EP | 2197220 | A2 | 6/2010 |
| EP | 2288178 | A1 | 2/2011 |
| EP | 2429155 | A1 | 3/2012 |
| EP | 1825713 | B1 | 10/2012 |
| EP | 2613573 | A1 | 7/2013 |
| EP | 2591617 | B1 | 6/2014 |
| EP | 2747081 | A1 | 6/2014 |
| EP | 2835989 | A2 | 2/2015 |
| EP | 2860992 | A1 | 4/2015 |
| EP | 2874413 | A1 | 5/2015 |
| EP | 2974382 | B1 | 4/2017 |
| EP | 2986034 | B1 | 5/2017 |
| EP | 3618074 | A1 | 3/2020 |
| EP | 3832643 | A1 | 6/2021 |
| JP | H02280199 | A | 11/1990 |
| JP | H05199593 | A | 8/1993 |
| JP | H05211700 | A | 8/1993 |
| JP | H06327089 | A | 11/1994 |
| JP | H0723490 | A | 1/1995 |
| JP | H1069280 | A | 3/1998 |
| JP | H10307592 | A | 11/1998 |
| JP | 2002502193 | A | 1/2002 |
| JP | 2002067815 | A | 3/2002 |
| JP | 2002101500 | A | 4/2002 |
| JP | 2003143252 | A | 5/2003 |
| JP | 2003304590 | A | 10/2003 |
| JP | 2005086686 | A | 3/2005 |
| JP | 2005217559 | A | 8/2005 |
| JP | 2005538633 | A | 12/2005 |
| JP | 2006017893 | A | 1/2006 |
| JP | 2006180039 | A | 7/2006 |
| JP | 2006191562 | A | 7/2006 |
| JP | 2006340285 | A | 12/2006 |
| JP | 2007068125 | A | 3/2007 |
| JP | 2007271802 | A | 10/2007 |
| JP | 2007325073 | A | 12/2007 |
| JP | 2008035254 | A | 2/2008 |
| JP | 2008228133 | A | 9/2008 |
| JP | 2009188474 | A | 8/2009 |
| JP | 2009288260 | A | 12/2009 |
| JP | 2010056970 | A | 3/2010 |
| JP | 2010081124 | A | 4/2010 |
| JP | 2010141892 | A | 6/2010 |
| JP | 2011123376 | A | 6/2011 |
| JP | 2011130212 | A | 6/2011 |
| JP | 2011164166 | A | 8/2011 |
| JP | 2011215378 | A | 10/2011 |
| JP | 2011217068 | A | 10/2011 |
| JP | 2013247456 | A | 12/2013 |
| JP | 2013253884 | A | 12/2013 |
| JP | 2014519274 | A | 8/2014 |
| JP | 2014523165 | A | 9/2014 |
| JP | 2016024652 | A | 2/2016 |
| JP | 2016524193 | A | 8/2016 |
| JP | 6356331 | B2 | 7/2018 |
| JP | 6567735 | B2 | 8/2019 |
| JP | 2021032906 | A | 3/2021 |
| KR | 1020060116383 | | 11/2006 |
| KR | 1020080011831 | | 2/2008 |
| KR | 20120111130 | A | 10/2012 |
| KR | 20160005045 | A | 1/2016 |
| KR | 20160007527 | A | 1/2016 |
| KR | 20160101198 | A | 8/2016 |
| KR | 20160145634 | A | 12/2016 |
| KR | 20210080788 | A | 7/2021 |
| WO | 9731437 | A1 | 8/1997 |
| WO | 200182650 | A2 | 11/2001 |
| WO | 2004066673 | A1 | 8/2004 |
| WO | 2005013047 | A2 | 2/2005 |
| WO | 2007016465 | A2 | 2/2007 |
| WO | 2011139502 | A1 | 11/2011 |
| WO | 2013006323 | A2 | 1/2013 |
| WO | 2013016500 | A1 | 1/2013 |
| WO | 2013089236 | A1 | 6/2013 |
| WO | 2013126603 | A1 | 8/2013 |
| WO | 2014032709 | A1 | 3/2014 |
| WO | 2014036121 | A1 | 3/2014 |
| WO | 2014040667 | A1 | 3/2014 |

(56) References Cited

FOREIGN PATENT DOCUMENTS

| | | | |
|---|---|---|---|
| WO | 2015024881 | A1 | 2/2015 |
| WO | 2015108794 | A1 | 7/2015 |
| WO | 2016040324 | A1 | 3/2016 |
| WO | 2016054090 | A1 | 4/2016 |
| WO | 2016118327 | A1 | 7/2016 |
| WO | 2016189285 | A1 | 12/2016 |
| WO | 2017049169 | A1 | 3/2017 |
| WO | 2017147081 | A1 | 8/2017 |
| WO | 2018064362 | A1 | 4/2018 |
| WO | 2019005112 | A1 | 1/2019 |
| WO | 2020006410 | A1 | 1/2020 |
| WO | 2020102991 | A1 | 5/2020 |
| WO | 2020163679 | A1 | 8/2020 |
| WO | 2020218650 | A1 | 10/2020 |
| WO | 2020252163 | A1 | 12/2020 |
| WO | 2021127578 | A1 | 6/2021 |

OTHER PUBLICATIONS

Notice of Allowance mailed on Dec. 8, 2022, issued in connection with U.S. Appl. No. 17/340,353, filed Jun. 7, 2021, 9 pages.
Notice of Allowance mailed on Feb. 8, 2023, issued in connection with U.S. Appl. No. 17/664,556, filed May 23, 2022, 9 pages.
Notice of Allowance mailed on Apr. 9, 2025, issued in connection with U.S. Appl. No. 18/398,489, filed Dec. 28, 2023, 7 pages.
Notice of Allowance mailed on Dec. 9, 2024, issued in connection with U.S. Appl. No. 18/449,244, filed Aug. 14, 2023, 8 pages.
Notice of Allowance mailed on Nov. 9, 2016, issued in connection with U.S. Appl. No. 14/805,340, filed Jul. 21, 2015, 13 pages.
Notice of Allowance mailed on Feb. 1, 2018, issued in connection with U.S. Appl. No. 15/480,265, filed Apr. 5, 2017, 8 pages.
Notice of Allowance mailed on Mar. 1, 2023, issued in connection with U.S. Appl. No. 17/445,272, filed Aug. 17, 2021, 8 pages.
Notice of Allowance mailed on Nov. 1, 2021, issued in connection with U.S. Appl. No. 17/103,556, filed Nov. 24, 2020, 5 pages.
Notice of Allowance mailed on Apr. 10, 2015, issued in connection with U.S. Appl. No. 13/536,493, filed Jun. 28, 2012, 8 pages.
Notice of Allowance mailed on Aug. 10, 2018, issued in connection with U.S. Appl. No. 15/785,088, filed Oct. 16, 2017, 6 pages.
Notice of Allowance mailed on Jan. 10, 2024, issued in connection with U.S. Appl. No. 18/069,042, filed Dec. 20, 2022, 18 pages.
Notice of Allowance mailed on Jul. 10, 2018, issued in connection with U.S. Appl. No. 15/673,170, filed Aug. 9, 2017, 2 pages.
Notice of Allowance mailed on Jul. 10, 2024, issued in connection with U.S. Appl. No. 18/309,939, filed May 1, 2023, 5 pages.
Notice of Allowance mailed on Jun. 10, 2020, issued in connection with U.S. Appl. No. 16/713,858, filed Dec. 13, 2019, 8 pages.
Notice of Allowance mailed on Jun. 10, 2025, issued in connection with U.S. Appl. No. 18/649,847, filed Apr. 29, 2024, 09 pages.
Notice of Allowance mailed on Dec. 11, 2018, issued in connection with U.S. Appl. No. 15/909,327, filed Mar. 1, 2018, 10 pages.
Notice of Allowance mailed on Dec. 11, 2024, issued in connection with U.S. Appl. No. 18/313,859, filed May 8, 2023, 07 pages.
Notice of Allowance mailed on Feb. 11, 2019, issued in connection with U.S. Appl. No. 15/588,186, filed May 5, 2017, 5 pages.
Notice of Allowance mailed on Jul. 11, 2017, issued in connection with U.S. Appl. No. 14/678,248, filed Apr. 3, 2015, 11 pages.
Notice of Allowance mailed on Mar. 11, 2015, issued in connection with U.S. Appl. No. 13/340,126, filed Dec. 29, 2011, 7 pages.
Notice of Allowance mailed on May 11, 2023, issued in connection with U.S. Appl. No. 17/804,372, filed May 27, 2022, 8 pages.
Notice of Allowance mailed on Apr. 12, 2016, issued in connection with U.S. Appl. No. 14/681,465, filed Apr. 8, 2015, 13 pages.
Notice of Allowance mailed on Apr. 12, 2024, issued in connection with U.S. Appl. No. 18/358,710, filed Jul. 25, 2023, 9 pages.
Notice of Allowance mailed on Aug. 12, 2019, issued in connection with U.S. Appl. No. 16/416,648, filed May 20, 2019, 7 pages.
Notice of Allowance mailed on Dec. 12, 2016, issued in connection with U.S. Appl. No. 14/805,140, filed Jul. 21, 2015, 24 pages.
Notice of Allowance mailed on Dec. 12, 2017, issued in connection with U.S. Appl. No. 14/481,505, filed Sep. 9, 2014, 9 pages.
Notice of Allowance mailed on Feb. 12, 2025, issued in connection with U.S. Appl. No. 17/650,441, filed Feb. 9, 2022, 15 pages.
Notice of Allowance mailed on Jan. 12, 2022, issued in connection with U.S. Appl. No. 16/994,627, filed Aug. 16, 2020, 7 pages.
Notice of Allowance mailed on Nov. 12, 2019, issued in connection with U.S. Appl. No. 15/955,545, filed Apr. 17, 2018, 9 pages.
Notice of Allowance mailed on Nov. 12, 2024, issued in connection with U.S. Appl. No. 18/192,452, filed Oct. 20, 2020, 2 pages.
Notice of Allowance mailed on Sep. 12, 2016, issued in connection with U.S. Appl. No. 15/066,072, filed Mar. 10, 2016, 7 pages.
Notice of Allowance mailed on Sep. 12, 2017, issued in connection with U.S. Appl. No. 15/207,682, filed Jul. 12, 2016, 8 pages.
Notice of Allowance mailed on Apr. 13, 2020, issued in connection with U.S. Appl. No. 16/181,865, filed Nov. 6, 2018, 10 pages.
Notice of Allowance mailed on Apr. 13, 2023, issued in connection with U.S. Appl. No. 18/058,639, filed Nov. 23, 2022, 15 pages.
Notice of Allowance mailed on Feb. 13, 2017, issued in connection with U.S. Appl. No. 14/864,506, filed Sep. 24, 2015, 8 pages.
Notice of Allowance mailed on Feb. 13, 2023, issued in connection with U.S. Appl. No. 17/543,430, filed Dec. 6, 2021, 10 pages.
Notice of Allowance mailed on Feb. 13, 2025, issued in connection with U.S. Appl. No. 18/396,279, filed Dec. 26, 2023, 8 pages.
Notice of Allowance mailed on Jul. 13, 2022, issued in connection with U.S. Appl. No. 17/033,821, filed Sep. 27, 2020, 8 pages.
Notice of Allowance mailed on Mar. 13, 2024, issued in connection with U.S. Appl. No. 18/449,254, filed Aug. 14, 2023, 10 pages.
Notice of Allowance mailed on Mar. 13, 2025, issued in connection with U.S. Appl. No. 18/484,198, filed Oct. 10, 2023, 13 pages.
Notice of Allowance mailed on Nov. 13, 2017, issued in connection with U.S. Appl. No. 14/726,921, filed Jun. 1, 2015, 8 pages.
Notice of Allowance mailed on Sep. 13, 2023, issued in connection with U.S. Appl. No. 17/543,014, filed Dec. 6, 2021, 9 pages.
Notice of Allowance mailed on Jul. 14, 2020, issued in connection with U.S. Appl. No. 16/556,297, filed Aug. 30, 2019, 11 pages.
Notice of Allowance mailed on Jun. 14, 2023, issued in connection with U.S. Appl. No. 17/816,238, filed Jul. 29, 2022, 11 pages.
Notice of Allowance mailed on Mar. 14, 2019, issued in connection with U.S. Appl. No. 15/343,996, filed Nov. 4, 2016, 8 pages.
Notice of Allowance mailed on Oct. 14, 2021, issued in connection with U.S. Appl. No. 16/115,525, filed Aug. 28, 2018, 5 pages.
Notice of Allowance mailed on Dec. 15, 2023, issued in connection with U.S. Appl. No. 18/157,937, filed Jan. 23, 2023, 8 pages.
Notice of Allowance mailed on Jan. 15, 2019, issued in connection with U.S. Appl. No. 16/115,524, filed Aug. 28, 2018, 8 pages.
Notice of Allowance mailed on Jun. 15, 2017, issued in connection with U.S. Appl. No. 15/096,827, filed Apr. 12, 2016, 5 pages.
Non-Final Office Action mailed on May 11, 2023, issued in connection with U.S. Appl. No. 17/458,673, filed Aug. 27, 2021, 18 pages.
Non-Final Office Action mailed on Oct. 11, 2017, issued in connection with U.S. Appl. No. 15/480,265, filed Apr. 5, 2017, 8 pages.
Non-Final Office Action mailed on Oct. 11, 2018, issued in connection with U.S. Appl. No. 15/856,791, filed Dec. 28, 2017, 13 pages.
Non-Final Office Action mailed on Dec. 12, 2024, issued in connection with U.S. Appl. No. 18/410,328, filed Jan. 11, 2024, 15 pages.
Non-Final Office Action mailed on Mar. 12, 2020, issued in connection with U.S. Appl. No. 16/796,496, filed Feb. 20, 2020, 13 pages.
Non-Final Office Action mailed on Sep. 12, 2016, issued in connection with U.S. Appl. No. 14/811,587, filed Jul. 28, 2015, 24 pages.
Non-Final Office Action mailed on Aug. 13, 2021, issued in connection with U.S. Appl. No. 16/994,874, filed Aug. 17, 2020, 10 pages.
Non-Final Office Action mailed on Jul. 13, 2016, issued in connection with U.S. Appl. No. 14/940,779, filed Nov. 13, 2015, 16 pages.
Non-Final Office Action mailed on Mar. 13, 2020, issued in connection with U.S. Appl. No. 15/005,496, filed Jan. 25, 2016, 20 pages.

(56) References Cited

OTHER PUBLICATIONS

Non-Final Office Action mailed on Mar. 13, 2024, issued in connection with U.S. Appl. No. 18/309,939, filed May 1, 2023, 15 pages.
Non-Final Office Action mailed on Dec. 14, 2016, issued in connection with U.S. Appl. No. 14/481,505, filed Sep. 9, 2014, 19 pages.
Non-Final Office Action mailed on Jul. 14, 2025, issued in connection with U.S. Appl. No. 18/461,457, filed Sep. 5, 2023, 13 pages.
Non-Final Office Action mailed on Mar. 14, 2017, issued in connection with U.S. Appl. No. 15/096,827, filed Apr. 12, 2016, 12 pages.
Non-Final Office Action mailed on May 14, 2019, issued in connection with U.S. Appl. No. 15/955,545, filed Apr. 17, 2018, 15 pages.
Non-Final Office Action mailed on Oct. 14, 2015, issued in connection with U.S. Appl. No. 14/216,325, filed Mar. 17, 2014, 7 pages.
Non-Final Office Action mailed on Dec. 15, 2022, issued in connection with U.S. Appl. No. 17/807,595, filed Jun. 17, 2022, 16 pages.
Non-Final Office Action mailed on May 15, 2018, issued in connection with U.S. Appl. No. 15/806,126, filed Nov. 7, 2017, 17 pages.
Non-Final Office Action mailed on May 15, 2023, issued in connection with U.S. Appl. No. 17/567,311, filed Jan. 3, 2022, 12 pages.
Non-Final Office Action mailed on Nov. 15, 2021, issued in connection with U.S. Appl. No. 17/135,308, filed Dec. 28, 2020, 19 pages.
Non-Final Office Action mailed on Oct. 15, 2024, issued in connection with U.S. Appl. No. 17/340,590, filed Jun. 7, 2021, 26 pages.
Non-Final Office Action mailed on Oct. 15, 2025, issued in connection with U.S. Appl. No. 18/502,644, filed Nov. 6, 2023, 41 pages.
Non-Final Office Action mailed on Jul. 16, 2025, issued in connection with U.S. Appl. No. 18/154,317, filed Jan. 13, 2023, 28 pages.
Non-Final Office Action mailed on Jun. 16, 2017, issued in connection with U.S. Appl. No. 15/005,496, filed Jan. 25, 2016, 15 pages.
Non-Final Office Action mailed on Nov. 16, 2018, issued in connection with U.S. Appl. No. 15/996,878, filed Jun. 4, 2018, 8 pages.
Non-Final Office Action mailed on Sep. 16, 2020, issued in connection with U.S. Appl. No. 16/115,525, filed Aug. 28, 2018, 11 pages.
Non-Final Office Action mailed on Jan. 17, 2023, issued in connection with U.S. Appl. No. 17/407,793, filed Aug. 20, 2021, 9 pages.
Non-Final Office Action mailed on Aug. 18, 2020, issued in connection with U.S. Appl. No. 16/827,143, filed Mar. 23, 2020, 8 pages.
Non-Final Office Action mailed on Dec. 18, 2018, issued in connection with U.S. Appl. No. 16/011,402, filed Jun. 18, 2018, 10 pages.
Non-Final Office Action mailed on Feb. 18, 2016, issued in connection with U.S. Appl. No. 14/644,136, filed Mar. 10, 2015, 10 pages.
Non-Final Office Action mailed on Jan. 18, 2019, issued in connection with U.S. Appl. No. 16/123,928, filed Sep. 6, 2018, 16 pages.
Non-Final Office Action mailed on Jan. 18, 2024, issued in connection with U.S. Appl. No. 18/048,034, filed Oct. 20, 2022, 10 pages.
Non-Final Office Action mailed on Jun. 18, 2019, issued in connection with U.S. Appl. No. 15/005,496, filed Jan. 25, 2016, 15 pages.
Non-Final Office Action mailed on Mar. 18, 2022, issued in connection with U.S. Appl. No. 17/033,818, filed Sep. 27, 2020, 12 pages.
Non-Final Office Action mailed on Mar. 18, 2024, issued in connection with U.S. Appl. No. 17/532,744, filed Nov. 22, 2021, 20 pages.
Non-Final Office Action mailed on Apr. 19, 2023, issued in connection with U.S. Appl. No. 17/807,270, filed Jun. 16, 2022, 19 pages.
Non-Final Office Action mailed on Aug. 19, 2021, issued in connection with U.S. Appl. No. 17/357,302, filed Jun. 24, 2021, 16 pages.
Non-Final Office Action mailed on Feb. 19, 2020, issued in connection with U.S. Appl. No. 16/665,415, filed Oct. 28, 2019, 53 pages.
Non-Final Office Action mailed on Jan. 19, 2024, issued in connection with U.S. Appl. No. 18/308,087, filed Apr. 27, 2023, 22 pages.
Non-Final Office Action mailed on Jan. 19, 2024, issued in connection with U.S. Appl. No. 18/331,580, filed Jun. 8, 2023, 11 pages.
Non-Final Office Action mailed on Jul. 19, 2023, issued in connection with U.S. Appl. No. 18/066,077, filed Dec. 14, 2022, 36 pages.
Non-Final Office Action mailed on Jun. 19, 2020, issued in connection with U.S. Appl. No. 16/403,077, filed May 3, 2019, 6 pages.
Non-Final Office Action mailed on Sep. 19, 2017, issued in connection with U.S. Appl. No. 15/056,553, filed Feb. 29, 2016, 7 pages.
Non-Final Office Action mailed on Apr. 2, 2018, issued in connection with U.S. Appl. No. 15/872,979, filed Jan. 16, 2018, 6 pages.
Non-Final Office Action mailed on Aug. 2, 2017, issued in connection with U.S. Appl. No. 15/298,115, filed Oct. 19, 2016, 22 pages.
Non-Final Office Action mailed on Feb. 2, 2024, issued in connection with U.S. Appl. No. 18/297,214, filed Apr. 7, 2023, 13 pages.
Non-Final Office Action mailed on Apr. 20, 2017, issued in connection with U.S. Appl. No. 15/005,853, filed Jan. 25, 2016, 8 pages.
Non-Final Office Action mailed on Feb. 20, 2025, issued in connection with U.S. Appl. No. 18/052,698, filed Nov. 4, 2022, 29 pages.
Non-Final Office Action mailed on Jul. 20, 2016, issued in connection with U.S. Appl. No. 14/682,182, filed Apr. 9, 2015, 13 pages.
Non-Final Office Action mailed on Jun. 20, 2017, issued in connection with U.S. Appl. No. 15/207,682, filed Jul. 12, 2016, 17 pages.
Non-Final Office Action mailed on Jun. 20, 2024, issued in connection with U.S. Appl. No. 18/007,415, filed Jan. 30, 2023, 12 pages.
European Patent Office, European Extended Search Report mailed on Jan. 14, 2022, issued in connection with European Application No. 21171959.6, 12 pages.
European Patent Office, European Extended Search Report mailed on Mar. 16, 2020, issued in connection with European Application No. 19209551.1, 7 pages.
European Patent Office, European Extended Search Report mailed on Oct. 16, 2018, issued in connection with European Application No. 17185193.4, 6 pages.
European Patent Office, European Extended Search Report mailed on Jul. 17, 2019, issued in connection with European Application No. 19167365.6, 7 pages.
European Patent Office, European Extended Search Report mailed on Dec. 18, 2025, issued in connection with European Application No. 25178570.5, 13 pages.
European Patent Office, European Extended Search Report mailed on Mar. 18, 2026, issued in connection with European Application No. 25208151.8, 16 pages.
European Patent Office, European Extended Search Report mailed on Jan. 2, 2024, issued in connection with European Application No. 23188226.7, 10 pages.
European Patent Office, European Extended Search Report mailed on Nov. 21, 2025, issued in connection with European Application No. 25176873.5, 12 pages.
European Patent Office, European Extended Search Report mailed on Jan. 22, 2026, issued in connection with European Application No. 25205387.1, 11 pages.

(56) References Cited

OTHER PUBLICATIONS

European Patent Office, European Extended Search Report mailed on May 22, 2026, issued in connection with European Application No. 26164068.4, 11 pages.
European Patent Office, European Extended Search Report mailed on Jun. 23, 2025, issued in connection with European Application No. 25162256.9, 8 pages.
European Patent Office, European Extended Search Report mailed on Mar. 25, 2020, issued in connection with European Application No. 19215348.4, 10 pages.
European Patent Office, European Extended Search Report mailed on Jun. 26, 2018, issued in connection with European Application No. 18171206.8, 9 pages.
European Patent Office, European Extended Search Report mailed on Mar. 5, 2026, issued in connection with European Application No. 25205415.0, 9 pages.
European Patent Office, European Extended Search Report mailed on Sep. 8, 2017, issued in connection with European Application No. 17000460.0, 8 pages.
European Patent Office, European Extended Search Report mailed on Jul. 9, 2024, issued in connection with European Application No. 24162741.3, 12 pages.
European Patent Office, European Office Action mailed on Nov. 10, 2020, issued in connection with European Application No. 19168800.1, 5 pages.
European Patent Office, European Office Action mailed on Dec. 11, 2018, issued in connection with European Application No. 15778787.0, 6 pages.
European Patent Office, European Office Action mailed on Jul. 11, 2019, issued in connection with European Application No. 15778787.0, 10 pages.
European Patent Office, European Office Action mailed on Sep. 16, 2020, issued in connection with European Application No. 15778787.0, 7 pages.
European Patent Office, European Office Action mailed on Aug. 19, 2020, issued in connection with European Application No. 17754501.9, 6 pages.
European Patent Office, European Office Action mailed on Nov. 2, 2018, issued in connection with European Application No. 18171206.8, 6 pages.
European Patent Office, European Office Action mailed on Jan. 3, 2020, issued in connection with European Application No. 17703876.7, 8 pages.
European Patent Office, European Office Action mailed on Feb. 4, 2019, issued in connection with European Application No. 17703876.7, 9 pages.
European Patent Office, European Office Action mailed on Sep. 7, 2020, issued in connection with European Application No. 19161826.3, 6 pages.
European Patent Office, European Office Action mailed on Jul. 9, 2020, issued in connection with European Application No. 19167365.6, 4 pages.
European Patent Office, European Office Action mailed on May 9, 2019, issued in connection with European Application No. 18171206.8, 7 pages.
European Patent Office, European Partial Search Report mailed on Jun. 7, 2019, issued in connection with European Application No. 19161826.3, 17 pages.
European Patent Office, European Search Report mailed on Feb. 2, 2024, issued in connection with European Application No. 23200723.7, 5 pages.
European Patent Office, European Search Report mailed on Jun. 13, 2019, issued in connection with European Application No. 18204450.3, 11 pages.
European Patent Office, European Search Report mailed on Sep. 13, 2019, issued in connection with European Application No. 19161826.3, 13 pages.
European Patent Office, European Search Report mailed on Oct. 17, 2023, issued in connection with European Application No. 23178432.3, 8 pages.
European Patent Office, European Search Report mailed on Jan. 18, 2018, issued in connection with European Patent Application No. 17185193.4, 9 pages.
European Patent Office, European Search Report mailed on Jul. 9, 2019, issued in connection with European Application No. 19168800.1, 12 pages.
European Patent Office, Examination Report mailed on Jul. 12, 2021, issued in connection with European Patent Application No. 17754501.9 6 pages.
European Patent Office, Extended European Search Report mailed on Jan. 5, 2017, issued in connection with European Patent Application No. 15765555.6, 8 pages.
European Patent Office, Extended Search Report mailed on Jan. 25, 2017, issued in connection with European Application No. 15765548.1, 7 pages.
European Patent Office, Extended Search Report mailed on Apr. 26, 2017, issued in connection with European Application No. 15765548.1, 10 pages.
European Patent Office, Office Action mailed on Nov. 12, 2018, issued in connection with European Application No. 17000460.0, 6 pages.
European Patent Office, Office Action mailed on Jun. 13, 2017, issued in connection with European patent application No. 17000484.0, 10 pages.
European Patent Office, Office Action mailed on Dec. 15, 2016, issued in connection with European Application No. 15766998.7, 7 pages.
European Patent Office, Summons to Attend Oral Proceedings mailed on Nov. 15, 2018, issued in connection with European Application No. 16748186.0, 57 pages.
European Patent Office, Summons to Attend Oral Proceedings mailed on Apr. 22, 2022, issued in connection with European Application No. 15778787.0, 6 pages.
European Patent Office, Summons to Attend Oral Proceedings mailed on Sep. 24, 2019, issued in connection with European Application No. 17000460.0, 5 pages.
European Patent Office, Summons to Attend Oral Proceedings mailed on Jun. 26, 2024, issued in connection with European Application No. 19740292.8, 10 pages.
European Patent Office, Summons to Attend Oral Proceedings mailed on Nov. 29, 2024, issued in connection with European Application No. 21193616.6, 9 pages.
European Patent Office, Summons to Attend Oral Proceedings mailed on Aug. 6, 2024, issued in connection with European Application No. 18789515.6, 8 pages.
Ex Parte Quayle Office Action mailed on Apr. 15, 2019, issued in connection with U.S. Appl. No. 15/235,598, filed Aug. 12, 2016, 7 pages.
Ex Parte Quayle Office Action mailed on Dec. 26, 2019, issued in connection with U.S. Appl. No. 16/542,418, filed Aug. 16, 2019, 7 pages.
Excerpts from Andrew Tanenbaum, Computer Networks. 4th Edition. Copyright 2003, 87 pages [produced by Google in IPR of U.S. Pat. No. 9,219,460, IPR2021-00475 on Feb. 5, 2021].
Notice of Allowance mailed on Nov. 20, 2017, issued in connection with U.S. Appl. No. 15/298,115, filed Oct. 19, 2016, 10 pages.
Notice of Allowance mailed on Sep. 20, 2017, issued in connection with U.S. Appl. No. 14/481,514, filed Sep. 9, 2014, 10 pages.
Notice of Allowance mailed on Dec. 21, 2016, issued in connection with U.S. Appl. No. 14/682,182, filed Apr. 9, 2015, 8 pages.
Notice of Allowance mailed on Feb. 21, 2018, issued in connection with U.S. Appl. No. 15/005,853, filed Jan. 25, 2016, 5 pages.
Notice of Allowance mailed on Jul. 21, 2017, issued in connection with U.S. Appl. No. 15/211,835, filed Jul. 15, 2016, 10 pages.
Notice of Allowance mailed on Jun. 21, 2019, issued in connection with U.S. Appl. No. 15/235,598, filed Aug. 12, 2016, 11 pages.
Notice of Allowance mailed on Jun. 21, 2023, issued in connection with U.S. Appl. No. 17/556,426, filed Dec. 20, 2021, 8 pages.
Notice of Allowance mailed on May 21, 2025, issued in connection with U.S. Appl. No. 18/404,254, filed Jan. 4, 2024, 2 pages.
Notice of Allowance mailed on Oct. 21, 2019, issued in connection with U.S. Appl. No. 16/182,886, filed Nov. 7, 2018, 10 pages.

(56) References Cited

OTHER PUBLICATIONS

Notice of Allowance mailed on Oct. 21, 2024, issued in connection with U.S. Appl. No. 18/503,971, filed Nov. 7, 2023, 7 pages.
Notice of Allowance mailed on Sep. 21, 2023, issued in connection with U.S. Appl. No. 17/567,311, filed Jan. 3, 2022, 8 pages.
Notice of Allowance mailed on Apr. 22, 2021, issued in connection with U.S. Appl. No. 16/812,618, filed Mar. 9, 2020, 12 pages.
Notice of Allowance mailed on Aug. 22, 2025, issued in connection with U.S. Appl. No. 17/222,950, filed Apr. 5, 2021, 07 pages.
Notice of Allowance mailed on Feb. 22, 2021, issued in connection with U.S. Appl. No. 16/944,884, filed Jul. 31, 2020, 9 pages.
Notice of Allowance mailed on Jun. 22, 2017, issued in connection with U.S. Appl. No. 14/644,136, filed Mar. 10, 2015, 12 pages.
Notice of Allowance mailed on Jun. 22, 2023, issued in connection with U.S. Appl. No. 17/407,793, filed Aug. 20, 2021, 10 pages.
Notice of Allowance mailed on Mar. 22, 2023, issued in connection with U.S. Appl. No. 17/662,282, filed May 6, 2022, 5 pages.
Notice of Allowance mailed on Oct. 22, 2025, issued in connection with U.S. Appl. No. 18/410,328, filed Jan. 11, 2024, 05 pages.
Notice of Allowance mailed on Aug. 23, 2018, issued in connection with U.S. Appl. No. 15/909,529, filed Mar. 1, 2018, 8 pages.
Notice of Allowance mailed on Aug. 23, 2023, issued in connection with U.S. Appl. No. 18/308,016, filed Apr. 27, 2023, 13 pages.
Notice of Allowance mailed on Feb. 23, 2021, issued in connection with U.S. Appl. No. 16/115,525, filed Aug. 28, 2018, 8 pages.
Notice of Allowance mailed on Jan. 23, 2025, issued in connection with U.S. Appl. No. 18/595,934, filed Mar. 5, 2024, 11 Pages.
Notice of Allowance mailed on Jun. 23, 2016, issued in connection with U.S. Appl. No. 14/921,781, filed Oct. 23, 2015, 8 pages.
Notice of Allowance mailed on Mar. 23, 2020, issued in connection with U.S. Appl. No. 16/542,418, filed Aug. 16, 2019, 5 pages.
Notice of Allowance mailed on May 23, 2018, issued in connection with U.S. Appl. No. 15/698,283, filed Sep. 7, 2017, 8 pages.
Notice of Allowance mailed on Nov. 23, 2020, issued in connection with U.S. Appl. No. 16/403,077, filed May 3, 2019, 6 pages.
Notice of Allowance mailed on Oct. 23, 2017, issued in connection with U.S. Appl. No. 14/481,522, filed Sep. 9, 2014, 16 pages.
Notice of Allowance mailed on Oct. 23, 2020, issued in connection with U.S. Appl. No. 16/555,846, filed Aug. 29, 2019, 5 pages.
Notice of Allowance mailed on Oct. 23, 2024, issued in connection with U.S. Appl. No. 17/650,441, filed Feb. 9, 2022, 16 pages.
Notice of Allowance mailed on Sep. 23, 2016, issued in connection with U.S. Appl. No. 15/070,160, filed Mar. 15, 2016, 7 pages.
Notice of Allowance mailed on Sep. 23, 2022, issued in connection with U.S. Appl. No. 17/373,179, filed Jul. 12, 2021, 5 pages.
Notice of Allowance mailed on Sep. 23, 2024, issued in connection with U.S. Appl. No. 18/313,013, filed May 5, 2023, 9 pages.
Notice of Allowance mailed on Jul. 24, 2019, issued in connection with U.S. Appl. No. 15/229,693, filed Aug. 5, 2016, 13 pages.
Notice of Allowance mailed on Jul. 24, 2020, issued in connection with U.S. Appl. No. 16/665,415, filed Oct. 28, 2019, 12 pages.
Notice of Allowance mailed on Jul. 24, 2024, issued in connection with U.S. Appl. No. 18/456,941, filed Aug. 28, 2023, 11 pages.
Notice of Allowance mailed on Jun. 24, 2025, issued in connection with U.S. Appl. No. 18/410,407, filed Jan. 11, 2024, 11 pages.
Notice of Allowance mailed on May 24, 2017, issued in connection with U.S. Appl. No. 14/997,868, filed Jan. 18, 2016, 5 pages.
Notice of Allowance mailed on May 24, 2024, issued in connection with U.S. Appl. No. 18/154,228, filed Jan. 13, 2023, 8 pages.
Notice of Allowance mailed on Nov. 24, 2017, issued in connection with U.S. Appl. No. 15/681,640, filed Aug. 21, 2017, 8 pages.
Notice of Allowance mailed on Apr. 25, 2017, issued in connection with U.S. Appl. No. 14/696,014, filed Apr. 24, 2015, 7 pages.
Notice of Allowance mailed on Apr. 25, 2017, issued in connection with U.S. Appl. No. 15/207,682, filed Jul. 12, 2016, 7 pages.
Notice of Allowance mailed on Apr. 25, 2019, issued in connection with U.S. Appl. No. 15/806,126, filed Nov. 7, 2017, 8 pages.
Notice of Allowance mailed on Jan. 25, 2021, issued in connection with U.S. Appl. No. 17/129,670, filed Dec. 21, 2020, 10 pages.
Notice of Allowance mailed on Mar. 25, 2025, issued in connection with U.S. Appl. No. 18/404,254, filed Jan. 4, 2024, 10 pages.
Notice of Allowance mailed on Oct. 25, 2016, issued in connection with U.S. Appl. No. 14/826,873, filed Aug. 14, 2015, 5 pages.
Notice of Allowance mailed on Apr. 26, 2023, issued in connection with U.S. Appl. No. 18/058,667, filed Nov. 23, 2022, 8 pages.
Notice of Allowance mailed on Dec. 26, 2023, issued in connection with U.S. Appl. No. 18/066,077, filed Dec. 14, 2022, 6 pages.
Notice of Allowance mailed on Dec. 26, 2024, issued in connection with U.S. Appl. No. 17/532,744, filed Nov. 22, 2021, 10 pages.
Notice of Allowance mailed on Feb. 26, 2016, issued in connection with U.S. Appl. No. 14/921,762, filed Oct. 23, 2015, 7 pages.
Notice of Allowance mailed on Jul. 26, 2016, issued in connection with U.S. Appl. No. 14/481,511, filed Sep. 9, 2014, 12 pages.
Excerpts from Morfey, Christopher L., Dictionary of Acoustics. Copyright 2001, 4 pages [produced by Google in IPR of U.S. Pat. No. 9,219,460, IPR2021-00475 on Feb. 5, 2021].
Final Office Action mailed on Jul. 1, 2022, issued in connection with U.S. Appl. No. 17/033,818, filed Sep. 27, 2020, 13 pages.
Final Office Action mailed on Jul. 1, 2025, issued in connection with U.S. Appl. No. 18/410,328, filed Jan. 11, 2024, 09 pages.
Final Office Action mailed on Dec. 2, 2019, issued in connection with U.S. Appl. No. 15/005,496, filed Jan. 25, 2016, 19 pages.
Final Office Action mailed on Apr. 3, 2017, issued in connection with U.S. Appl. No. 14/678,248, filed Apr. 3, 2015, 22 pages.
Final Office Action mailed on Feb. 3, 2025, issued in connection with U.S. Appl. No. 18/154,317, filed Jan. 13, 2023, 29 pages.
Final Office Action mailed on Dec. 4, 2024, issued in connection with U.S. Appl. No. 18/007,415, filed Jan. 30, 2023, 14 pages.
Final Office Action mailed on Jan. 6, 2025, issued in connection with U.S. Appl. No. 18/461,430, filed Sep. 5, 2023, 26 pages.
Final Office Action mailed on Aug. 12, 2025, issued in connection with U.S. Appl. No. 18/052,698, filed Nov. 4, 2022, 31 pages.
Final Office Action mailed on Feb. 13, 2025, issued in connection with U.S. Appl. No. 18/502,644, filed Nov. 6, 2023, 34 pages.
Final Office Action mailed on Jul. 13, 2017, issued in connection with U.S. Appl. No. 14/726,921, filed Jun. 1, 2015, 10 pages.
Final Office Action mailed on Jun. 13, 2017, issued in connection with U.S. Appl. No. 14/481,505, filed Sep. 9, 2014, 22 pages.
Final Office Action mailed on Dec. 14, 2020, issued in connection with U.S. Appl. No. 16/812,618, filed Mar. 9, 2020, 17 pages.
Final Office Action mailed on Feb. 14, 2019, issued in connection with U.S. Appl. No. 15/005,496, filed Jan. 25, 2016, 16 pages.
Final Office Action mailed on Feb. 14, 2019, issued in connection with U.S. Appl. No. 15/217,399, filed Jul. 22, 2016, 37 pages.
Final Office Action mailed on May 14, 2025, issued in connection with U.S. Appl. No. 18/623,602, filed Apr. 1, 2024, 05 pages.
Final Office Action mailed on Oct. 14, 2016, issued in connection with U.S. Appl. No. 14/682,182, filed Apr. 9, 2015, 16 pages.
Final Office Action mailed on Oct. 17, 2016, issued in connection with U.S. Appl. No. 14/678,248, filed Apr. 3, 2015, 22 pages.
Final Office Action mailed on Sep. 17, 2021, issued in connection with U.S. Appl. No. 16/564,766, filed Sep. 9, 2019, 8 pages.
Final Office Action mailed on Apr. 18, 2017, issued in connection with U.S. Appl. No. 14/678,263, filed Apr. 3, 2015, 16 pages.
Final Office Action mailed on Apr. 18, 2018, issued in connection with U.S. Appl. No. 15/056,553, filed Feb. 29, 2016, 8 pages.
Final Office Action mailed on Dec. 18, 2014, issued in connection with U.S. Appl. No. 13/340,126, filed Dec. 29, 2011, 12 pages.
Final Office Action mailed on Jul. 18, 2024, issued in connection with U.S. Appl. No. 17/450,925, filed Oct. 14, 2021, 11 pages.
Final Office Action mailed on Jan. 19, 2017, issued in connection with U.S. Appl. No. 14/940,779, filed Nov. 13, 2015, 15 pages.
Final Office Action mailed on Apr. 2, 2018, issued in connection with U.S. Appl. No. 15/166,241, filed May 26, 2016, 14 pages.
Final Office Action mailed on Aug. 2, 2024, issued in connection with U.S. Appl. No. 18/048,034, filed Oct. 20, 2022, 7 pages.
Final Office Action mailed on Aug. 20, 2021, issued in connection with U.S. Appl. No. 16/919,467, filed Jul. 2, 2020, 22 pages.
Final Office Action mailed on Aug. 20, 2024, issued in connection with U.S. Appl. No. 18/449,244, filed Aug. 14, 2023, 17 pages.
Final Office Action mailed on Sep. 20, 2023, issued in connection with U.S. Appl. No. 17/810,549, filed Jul. 1, 2022, 18 pages.

(56) References Cited

OTHER PUBLICATIONS

Final Office Action mailed on Oct. 21, 2016, issued in connection with U.S. Appl. No. 14/696,014, filed Apr. 24, 2015, 13 pages.
Final Office Action mailed on Sep. 22, 2020, issued in connection with U.S. Appl. No. 15/005,496, filed Jan. 25, 2016, 17 pages.
Final Office Action mailed on Jan. 25, 2018, issued in connection with U.S. Appl. No. 15/005,496, filed Jan. 25, 2016, 17 pages.
Final Office Action mailed on Mar. 25, 2019, issued in connection with U.S. Appl. No. 15/856,791, filed Dec. 28, 2017, 11 pages.
Final Office Action mailed on Feb. 27, 2024, issued in connection with U.S. Appl. No. 17/340,590, filed Jun. 7, 2021, 28 pages.
Final Office Action mailed on Mar. 28, 2025, issued in connection with U.S. Appl. No. 18/395,386, filed Dec. 22, 2023, 35 pages.
Final Office Action mailed on Oct. 28, 2019, issued in connection with U.S. Appl. No. 16/181,865, filed Nov. 6, 2018, 17 pages.
Final Office Action mailed on Apr. 3, 2018, issued in connection with U.S. Appl. No. 15/235,598, filed Aug. 12, 2016, 12 pages.
Final Office Action mailed on Mar. 3, 2020, issued in connection with U.S. Appl. No. 16/115,525, filed Aug. 28, 2018, 13 pages.
Final Office Action mailed on Aug. 30, 2022, issued in connection with U.S. Appl. No. 17/107,157, filed Nov. 30, 2020, 32 pages.
Final Office Action mailed on Jan. 30, 2025, issued in connection with U.S. Appl. No. 18/410,407, filed Jan. 11, 2024, 16 Pages.
Final Office Action mailed on Jan. 30, 2025, issued in connection with U.S. Appl. No. 18/520,336, filed Nov. 27, 2023, 22 pages.
Final Office Action mailed on Oct. 30, 2023, issued in connection with U.S. Appl. No. 17/458,673, filed Aug. 27, 2021, 20 pages.
Final Office Action mailed on Oct. 30, 2025, issued in connection with U.S. Appl. No. 18/460,198, filed Sep. 1, 2023, 26 pages.
Final Office Action mailed on Feb. 5, 2018, issued in connection with U.S. Appl. No. 15/229,693, filed Aug. 5, 2016, 21 pages.
Final Office Action mailed on Mar. 5, 2019, issued in connection with U.S. Appl. No. 15/056,553, filed Feb. 29, 2016, 9 pages.
Final Office Action mailed on Dec. 6, 2018, issued in connection with U.S. Appl. No. 15/806,126, filed Nov. 7, 2017, 18 pages.
Final Office Action mailed on Jul. 8, 2024, issued in connection with U.S. Appl. No. 17/222,950, filed Apr. 5, 2021, 10 pages.
Final Office Action mailed on Apr. 9, 2019, issued in connection with U.S. Appl. No. 15/229,693, filed Aug. 5, 2016, 33 pages.
First Action Interview Office Action mailed on Mar. 3, 2017, issued in connection with U.S. Appl. No. 14/726,921, filed Jun. 1, 2015, 9 pages.
First Action Interview Office Action mailed on Jul. 12, 2016, issued in connection with U.S. Appl. No. 14/481,514, filed Sep. 9, 2014, 10 pages.
Notice of Allowance mailed on Feb. 4, 2019, issued in connection with U.S. Appl. No. 16/181,583, filed Nov. 6, 2018, 9 pages.
Notice of Allowance mailed on Feb. 4, 2020, issued in connection with U.S. Appl. No. 16/416,619, filed May 20, 2019, 7 pages.
Notice of Allowance mailed on Jan. 4, 2024, issued in connection with U.S. Appl. No. 17/493,430, filed Oct. 4, 2021, 9 pages.
Notice of Allowance mailed on Nov. 4, 2021, issued in connection with U.S. Appl. No. 16/665,154, filed Oct. 28, 2019, 8 pages.
Notice of Allowance mailed on Oct. 4, 2018, issued in connection with U.S. Appl. No. 15/166,241, filed May 26, 2016, 7 pages.
Notice of Allowance mailed on Apr. 5, 2018, issued in connection with U.S. Appl. No. 15/681,640, filed Aug. 21, 2017, 8 pages.
Notice of Allowance mailed on Apr. 5, 2023, issued in connection with U.S. Appl. No. 17/562,465, filed Dec. 27, 2021, 10 pages.
Notice of Allowance mailed on Apr. 5, 2024, issued in connection with U.S. Appl. No. 18/448,502, filed Aug. 11, 2023, 7 pages.
Notice of Allowance mailed on Feb. 5, 2021, issued in connection with U.S. Appl. No. 16/827,143, filed Mar. 23, 2020, 9 pages.
Notice of Allowance mailed on Jun. 5, 2019, issued in connection with U.S. Appl. No. 15/859,311, filed Dec. 29, 2017, 8 pages.
Notice of Allowance mailed on Jun. 5, 2019, issued in connection with U.S. Appl. No. 15/865,221, filed Jan. 8, 2018, 8 pages.
Notice of Allowance mailed on Mar. 5, 2019, issued in connection with U.S. Appl. No. 16/102,499, filed Aug. 13, 2018, 8 pages.
Notice of Allowance mailed on May 5, 2017, issued in connection with U.S. Appl. No. 14/826,873, filed Aug. 14, 2015, 5 pages.
Notice of Allowance mailed on May 5, 2022, issued in connection with U.S. Appl. No. 17/316,371, filed May 10, 2021, 10 pages.
Notice of Allowance mailed on Oct. 5, 2018, issued in connection with U.S. Appl. No. 16/115,524, filed Aug. 28, 2018, 10 pages.
Notice of Allowance mailed on Aug. 6, 2020, issued in connection with U.S. Appl. No. 16/564,684, filed Sep. 9, 2019, 8 pages.
Notice of Allowance mailed on Feb. 6, 2019, issued in connection with U.S. Appl. No. 15/996,878, filed Jun. 4, 2018, 8 pages.
Notice of Allowance mailed on Aug. 7, 2024, issued in connection with U.S. Appl. No. 18/478,241, filed Sep. 29, 2023, 10 pages.
Notice of Allowance mailed on Jun. 7, 2024, issued in connection with U.S. Appl. No. 18/316,434, filed May 12, 2023, 9 pages.
Notice of Allowance mailed on Apr. 8, 2019, issued in connection with U.S. Appl. No. 16/011,402, filed Jun. 18, 2018, 8 pages.
Notice of Allowance mailed on Jul. 8, 2019, issued in connection with U.S. Appl. No. 15/856,791, filed Dec. 28, 2017, 5 pages.
Notice of Allowance mailed on Jun. 8, 2020, issued in connection with U.S. Appl. No. 16/658,896, filed Oct. 21, 2019, 8 pages.
Notice of Allowance mailed on Jun. 8, 2021, issued in connection with U.S. Appl. No. 17/104,466, filed Nov. 25, 2020, 8 pages.
Notice of Allowance mailed on Mar. 8, 2024, issued in connection with U.S. Appl. No. 17/135,173, filed Dec. 28, 2020, 9 pages.
Notice of Allowance mailed on May 8, 2018, issued in connection with U.S. Appl. No. 15/650,386, filed Jul. 14, 2017, 13 pages.
Notice of Allowance mailed on Apr. 9, 2020, issued in connection with U.S. Appl. No. 16/416,593, filed May 20, 2019, 9 pages.
Notice of Allowance mailed on Jun. 9, 2020, issued in connection with U.S. Appl. No. 15/966,534, filed Apr. 30, 2018, 16 pages.
Notice of Allowance mailed on May 9, 2019, issued in connection with U.S. Appl. No. 15/996,878, filed Jun. 4, 2018, 7 pages.
Notice of Allowance mailed on Apr. 19, 2017, issued in connection with U.S. Appl. No. 14/481,511, filed Sep. 9, 2014, 10 pages.
Papp Istvan et al. "Adaptive Microphone Array for Unknown Desired Speaker's Transfer Function", The Journal of the Acoustical Society of America, American Institute of Physics for the Acoustical Society of America, New York, NY vol. 122, No. 2, Jul. 19, 2007, pp. 44-49.
Pre-Brief Appeal Conference Decision mailed on Mar. 19, 2019, issued in connection with U.S. Appl. No. 15/806,126, filed Nov. 7, 2017, 2 pages.
Preinterview First Office Action mailed on Oct. 6, 2016, issued in connection with U.S. Appl. No. 14/726,921, filed Jun. 1, 2015, 6 pages.
Preinterview First Office Action mailed on Jul. 12, 2017, issued in connection with U.S. Appl. No. 14/793,205, filed Jul. 7, 2015, 5 pages.
Preinterview First Office Action mailed on May 17, 2016, issued in connection with U.S. Appl. No. 14/481,505, filed Sep. 9, 2014, 7 pages.
Preinterview First Office Action mailed on May 25, 2016, issued in connection with U.S. Appl. No. 14/481,514, filed Sep. 9, 2014, 7 pages.
Prismiq, Inc., "Prismiq Media Player User Guide," 2003, 44 pages.
Rosenblatt, Jonathan et al. On the Optimality of Averaging in Distributed Statistical Learning. Information and Inference, Department of Computer Science and Applied Mathematics, Weizmann Institute of Science, vol. 5, No. 4, Jun. 16, 2015, 30 pages. Retrieved from the Internet: URL:https://arxiv.org/pdf/1407.2724.pdf.
Ross, Alex, "Wizards of Sound: Retouching acoustics, from the restaurant to the concert hall," The New Yorker, Feb. 23, 2015. Web. Feb. 26, 2015, 9 pages.
Rubenson, Aaron. Voice Interoperability Initiative Welcomes Facebook,Garmin and Xiaomi and Releases First Multi-AgentDesign Guide. VII Announcement New Members and Multi-Agent Design Guide, Sep. 9, 2020, 2 pages. [retrieved on Jan. 4, 2022], Retrieved from the Internet: URL: https://developer.amazon.com/en-US/blogs/alexa/device-makers/2020/09/vii-announcement-new-members-and-multi-agent-design-guide.
SmartThings.com, "Google Home Broadcasts" Oct. 2017, pp. 1-7 [retrieved from https://community.smartthings.eom/t/google-home-broadcasts/101416].

(56) References Cited

OTHER PUBLICATIONS

Soda S., et al., "Handsfree Voice Interface for Home Network Service Using a Microphone Array Network," 2012 Third International Conference on Networking and Computing, 2012, pp. 195-200.
*Sonos, Inc.* v. *Google LLC*, WDTX Case No. 6:20-cv-00881, Google's Answer and Counterclaims; dated Jan. 8, 2021, 39 pages.
Supplemental Notice of Allowability mailed on Oct. 27, 2016, issued in connection with U.S. Appl. No. 14/481,511, filed Sep. 9, 2014, 6 pages.
Varela O., et al., "Combining Pulse-based Features for Rejecting Far-field Speech in a Hmm-based Voice Activity Detector," Computers & Electrical Engineering, 2011, vol. 37(4), pp. 589-600.
Wikipedia, Server(Computing) https://web.archive.org/web/20160703173710/https://en.wikipedia.org/wiki/Server_ (computing), published Jul. 3, 2016, 7 pages.
Chinese Patent Office, First Office Action and Translation mailed on Dec. 24, 2020, issued in connection with Chinese Application No. 201910978233.1, 15 pages.
Chinese Patent Office, First Office Action and Translation mailed on Jan. 28, 2021, issued in connection with Chinese Application No. 201680054164.X, 19 pages.
Chinese Patent Office, First Office Action and Translation mailed on Jun. 29, 2020, issued in connection with Chinese Application No. 201780057093.3, 11 pages.
Chinese Patent Office, First Office Action and Translation mailed on Feb. 3, 2021, issued in connection with Chinese Application No. 202010095178.4, 15 pages.
Chinese Patent Office, First Office Action and Translation mailed on Aug. 4, 2020, issued in connection with Chinese Application No. 201910395715.4, 22 pages.
Chinese Patent Office, First Office Action mailed on Aug. 11, 2017, issued in connection with Chinese Patent Application No. 201580013837.2, 8 pages.
Chinese Patent Office, First Office Action mailed on Nov. 20, 2018, issued in connection with Chinese Application No. 201580047998.3, 21 pages.
Chinese Patent Office, First Office Action mailed on Sep. 25, 2017, issued in connection with Chinese Patent Application No. 201580013894.0, 9 pages.
Chinese Patent Office, First Office Action mailed on Nov. 5, 2018, issued in connection with Chinese Application No. 201680044080.8, 5 pages.
Chinese Patent Office, Office Action mailed on Nov. 14, 2019, issued in connection with Chinese Application No. 201680040086.8, 9 pages.
Chinese Patent Office, Second Office Action and Translation mailed on Aug. 26, 2019, issued in connection with Chinese Application No. 201580047998.3, 25 pages.
Chinese Patent Office, Second Office Action mailed on Jan. 11, 2019, issued in connection with Chinese Application No. 201680044080.8, 4 pages.
Chinese Patent Office, Second Office Action mailed on Feb. 3, 2019, issued in connection with Chinese Application No. 201580048594.6, 11 pages.
Chinese Patent Office, Second Office Action mailed on May 6, 2020, issued in connection with Chinese Application No. 201680040086.8, 3 pages.
Chinese Patent Office, Second Office Action with Translation mailed on Jan. 9, 2018, issued in connection with Chinese Patent Application No. 201580013837.2, 10 pages.
Chinese Patent Office, Third Office Action mailed on Apr. 11, 2019, issued in connection with Chinese Application No. 201580048594.6, 4 pages.
Cho N., et al., "Voice Activation System Using Acoustic Event Detection and Keyword/speaker Recognition," 2011 IEEE International Conference on Consumer Electronics (ICCE), Las Vegas, NV, USA, 2011, pp. 21-22.
"Constellation Acoustic System: a revolutionary breakthrough in acoustical design," Meyer Sound Laboratories, Inc. 2012, 32 pages.
"Constellation Microphones," Meyer Sound Laboratories, Inc. 2013, 2 pages.
Corrected Notice of Allowability mailed on Jan. 19, 2017, issued in connection with U.S. Appl. No. 14/826,873, filed Aug. 14, 2015, 11 pages.
Corrected Notice of Allowance mailed on Sep. 5, 2025, issued in connection with U.S. Appl. No. 17/222,950, filed Apr. 5, 2021, 03 pages.
Corrected Notice of Allowance mailed on Jun. 17, 2025, issued in connection with U.S. Appl. No. 17/340,590, filed Jun. 7, 2021, 9 pages.
Corrected Notice of Allowance mailed on Dec. 20, 2024, issued in connection with U.S. Appl. No. 17/450,925, filed Oct. 14, 2021, 05 pages.
Corrected Notice of Allowance mailed on Dec. 20, 2024, issued in connection with U.S. Appl. No. 18/410,120, filed Jan. 11, 2024, 05 pages.
Daddy, B., "Calibrating Your Audio with a Sound Pressure Level (SPL) Meter," Blue-ray.com, Feb. 22, 2008 Retrieved Oct. 10, 2014, 15 pages.
European Patent Office, European EPC Article 94.3 and Rule 164(2)(b) mailed on Nov. 23, 2023, issued in connection with European Application No. 20761443.9, 15 pages.
European Patent Office, European EPC Article 94.3 mailed on Jan. 10, 2024, issued in connection with European Application No. 20757152.2, 6 pages.
European Patent Office, European EPC Article 94.3 mailed on Oct. 14, 2025, issued in connection with European Application No. 22797948.1, 12 pages.
European Patent Office, European EPC Article 94.3 mailed on Aug. 16, 2021, issued in connection with European Application No. 19765920.4, 5 pages.
European Patent Office, European EPC Article 94.3 mailed on Dec. 18, 2023, issued in connection with European Application No. 21703134.3, 7 pages.
European Patent Office, European EPC Article 94.3 mailed on Dec. 19, 2024, issued in connection with European U.S. Appl. No. 22/153,523, 4 pages.
European Patent Office, European EPC Article 94.3 mailed on Feb. 2, 2024, issued in connection with European Application No. 21171959.6, 9 pages.
European Patent Office, European EPC Article 94.3 mailed on Feb. 21, 2025, issued in connection with European Application No. 21703134.3, 7 pages.
European Patent Office, European EPC Article 94.3 mailed on Jan. 21, 2025, issued in connection with European Application No. 23188226.7, 11 pages.
European Patent Office, European EPC Article 94.3 mailed on Jul. 22, 2024, issued in connection with European Application No. 23188226.7, 9 pages.
European Patent Office, European EPC Article 94.3 mailed on Dec. 23, 2021, issued in connection with European Application No. 19197116.7, 5 pages.
European Patent Office, European EPC Article 94.3 mailed on Jan. 24, 2024, issued in connection with European Application No. 21180778.9, 8 pages.
European Patent Office, European EPC Article 94.3 mailed on Jan. 27, 2025, issued in connection with European Application No. 19780508.8, 5 pages.
European Patent Office, European EPC Article 94.3 mailed on Feb. 28, 2024, issued in connection with European Application No. 18306501, 7 pages.
European Patent Office, European EPC Article 94.3 mailed on Apr. 29, 2024, issued in connection with European Application No. 21195031.6, 4 pages.
European Patent Office, European EPC Article 94.3 mailed on Oct. 29, 2021, issued in connection with European Application No. 20196286.7, 5 pages.
European Patent Office, European EPC Article 94.3 mailed on Feb. 3, 2023, issued in connection with European Application No. 19765920.4, 5 pages.

(56) References Cited

OTHER PUBLICATIONS

European Patent Office, European EPC Article 94.3 mailed on Apr. 30, 2021, issued in connection with European Application No. 20196286.7, 5 pages.
European Patent Office, European EPC Article 94.3 mailed on Jun. 4, 2024, issued in connection with European Application No. 21180778.9, 5 pages.
European Patent Office, European EPC Article 94.3 mailed on Feb. 5, 2025, issued in connection with European Application No. 20842825, 8 pages.
European Patent Office, European EPC Article 94.3 mailed on Mar. 7, 2025, issued in connection with European Application No. 20185599.6, 6 pages.
European Patent Office, European Examination Report mailed on May 11, 2018, issued in connection with European Application No. 16748186.0, 6 pages.
European Patent Office, European Extended Search Report mailed on Dec. 6, 2024, issued in connection with European Application No. 24174559.5, 12 pages.
European Patent Office, European Extended Search Report mailed on Jun. 10, 2022, issued in connection with European Application No. 22155834.9, 8 pages.
European Patent Office, European Extended Search Report mailed on Dec. 11, 2020, issued in connection with European Application No. 20196286.7, 6 pages.
Non-Final Office Action mailed on Feb. 29, 2024, issued in connection with U.S. Appl. No. 18/449,244, filed Aug. 14, 2023, 15 pages.
Non-Final Office Action mailed on Mar. 29, 2018, issued in connection with U.S. Appl. No. 15/716,313, filed Sep. 26, 2017, 16 pages.
Non-Final Office Action mailed on Sep. 29, 2022, issued in connection with U.S. Appl. No. 17/340,353, filed Jun. 7, 2021, 8 pages.
Non-Final Office Action mailed on Sep. 29, 2024, issued in connection with U.S. Appl. No. 18/404,254, filed Jan. 4, 2024, 14 pages.
Non-Final Office Action mailed on May 3, 2021, issued in connection with U.S. Appl. No. 16/564,766, filed Sep. 9, 2019, 16 pages.
Non-Final Office Action mailed on Apr. 30, 2025, issued in connection with U.S. Appl. No. 18/460,198, filed Sep. 1, 2023, 21 pages.
Non-Final Office Action mailed on Aug. 30, 2019, issued in connection with U.S. Appl. No. 16/115,525, filed Aug. 28, 2018, 13 pages.
Non-Final Office Action mailed on Aug. 30, 2024, issued in connection with U.S. Appl. No. 18/154,317, filed Jan. 13, 2023, 28 pages.
Non-Final Office Action mailed on Jul. 30, 2024, issued in connection with U.S. Appl. No. 17/994,577, filed Nov. 28, 2022, 13 pages.
Non-Final Office Action mailed on May 30, 2017, issued in connection with U.S. Appl. No. 15/478,770, filed Apr. 4, 2017, 9 pages.
Non-Final Office Action mailed on May 30, 2024, issued in connection with U.S. Appl. No. 18/503,971, filed Nov. 7, 2023, 8 pages.
Non-Final Office Action mailed on Sep. 30, 2022, issued in connection with U.S. Appl. No. 17/113,799, filed Dec. 7, 2020, 79 pages.
Non-Final Office Action mailed on Mar. 31, 2021, issued in connection with U.S. Appl. No. 16/919,467, filed Jul. 2, 2020, 10 pages.
Non-Final Office Action mailed on May 31, 2019, issued in connection with U.S. Appl. No. 16/185,906, filed Nov. 9, 2018, 7 pages.
Non-Final Office Action mailed on May 31, 2023, issued in connection with U.S. Appl. No. 17/810,549, filed Jul. 1, 2022, 19 pages.
Non-Final Office Action mailed on Oct. 31, 2025, issued in connection with U.S. Appl. No. 18/693,793, filed Mar. 20, 2024, 17 pages.
Non-Final Office Action mailed on Mar. 4, 2020, issued in connection with U.S. Appl. No. 15/966,534, filed Apr. 30, 2018, 11 pages.
Non-Final Office Action mailed on Jan. 5, 2021, issued in connection with U.S. Appl. No. 17/078,382, filed Oct. 23, 2020, 11 pages.
Non-Final Office Action mailed on Aug. 6, 2024, issued in connection with U.S. Appl. No. 18/313,859, filed May 8, 2023, 20 pages.
Non-Final Office Action mailed on Jul. 6, 2020, issued in connection with U.S. Appl. No. 16/812,618, filed Mar. 9, 2020, 15 pages.
Non-Final Office Action mailed on Nov. 6, 2018, issued in connection with U.S. Appl. No. 15/235,598, filed Aug. 12, 2016, 13 pages.
Non-Final Office Action mailed on Aug. 7, 2023, issued in connection with U.S. Appl. No. 17/807,270, filed Jun. 16, 2022, 20 pages.
Non-Final Office Action mailed on Aug. 7, 2024, issued in connection with U.S. Appl. No. 18/502,644, filed Nov. 6, 2023, 31 pages.
Non-Final Office Action mailed on Feb. 7, 2019, issued in connection with U.S. Appl. No. 15/859,311, filed Dec. 29, 2017, 9 pages.
Non-Final Office Action mailed on Feb. 7, 2019, issued in connection with U.S. Appl. No. 15/865,221, filed Jan. 8, 2018, 10 pages.
Non-Final Office Action mailed on Mar. 7, 2024, issued in connection with U.S. Appl. No. 17/458,673, filed Aug. 27, 2021, 26 pages.
Non-Final Office Action mailed on Mar. 7, 2024, issued in connection with U.S. Appl. No. 18/338,841, filed Jun. 21, 2023, 15 pages.
Non-Final Office Action mailed on Apr. 8, 2024, issued in connection with U.S. Appl. No. 18/459,982, filed Sep. 1, 2023, 16 pages.
Non-Final Office Action mailed on Jul. 8, 2024, issued in connection with U.S. Appl. No. 18/520,531, filed Nov. 27, 2023, 63 pages.
Non-Final Office Action mailed on Jun. 8, 2021, issued in connection with U.S. Appl. No. 17/207,640, filed Mar. 20, 2021, 17 pages.
Non-Final Office Action mailed on Dec. 9, 2022, issued in connection with U.S. Appl. No. 17/662,282, filed May 6, 2022, 12 pages.
Non-Final Office Action mailed on Jan. 9, 2018, issued in connection with U.S. Appl. No. 15/698,283, filed Sep. 7, 2017, 18 pages.
Non-Final Office Action mailed on Jan. 9, 2018, issued in connection with U.S. Appl. No. 15/727,913, filed Oct. 9, 2017, 8 pages.
Notice of Allowance mailed Jul. 21, 2021, issued in connection with U.S. Appl. No. 16/944,884, filed Jul. 31, 2020, 8 pages.
Notice of Allowance mailed Aug. 4, 2021, issued in connection with U.S. Appl. No. 17/104,466, filed Nov. 25, 2020, 9 pages.
Notice of Allowance mailed on May 1, 2017, issued in connection with U.S. Appl. No. 14/805,140, filed Jul. 21, 2015, 13 pages.
Notice of Allowance mailed on Oct. 1, 2024, issued in connection with U.S. Appl. No. 18/460,141, filed Sep. 1, 2023, 8 pages.
Notice of Allowance mailed on Oct. 1, 2025, issued in connection with U.S. Appl. No. 18/461,430, filed Sep. 5, 2023, 09 pages.
Notice of Allowance mailed on Nov. 2, 2016, issued in connection with U.S. Appl. No. 14/884,001, filed Oct. 15, 2015, 8 pages.
Notice of Allowance mailed on Feb. 3, 2025, issued in connection with U.S. Appl. No. 18/695,670, filed Mar. 26, 2024, 10 pages.
Notice of Allowance mailed on Jul. 3, 2025, issued in connection with U.S. Appl. No. 18/492,583, filed Oct. 23, 2023, 8 pages.
Notice of Allowance mailed on Jun. 3, 2016, issued in connection with U.S. Appl. No. 14/921,799, filed Oct. 23, 2015, 8 pages.
Notice of Allowance mailed on Nov. 3, 2025, issued in connection with U.S. Appl. No. 18/635,731, filed Apr. 15, 2024, 13 pages.
Notice of Allowance mailed on Nov. 4, 2016, issued in connection with U.S. Appl. No. 14/481,514, filed Sep. 9, 2014, 10 pages.
Notice of Allowance mailed on Sep. 5, 2025, issued in connection with U.S. Appl. No. 18/623,602, filed Apr. 1, 2024, 05 pages.
Notice of Allowance mailed on Feb. 6, 2025, issued in connection with U.S. Appl. No. 17/957,691, filed Sep. 30, 2022, 12 pages.
Notice of Allowance mailed on Jun. 6, 2018, issued in connection with U.S. Appl. No. 15/727,913, filed Oct. 9, 2017, 5 pages.
Notice of Allowance mailed on Oct. 6, 2022, issued in connection with U.S. Appl. No. 17/582,317, filed Jan. 24, 2022, 9 pages.
Notice of Allowance mailed on Dec. 7, 2015, issued in connection with U.S. Appl. No. 14/216,325, filed Mar. 17, 2014, 7 pages.
Notice of Allowance mailed on Mar. 7, 2025, issued in connection with U.S. Appl. No. 17/340,590, filed Jun. 7, 2021, 12 pages.
Non-Final Office Action mailed on Jun. 20, 2024, issued in connection with U.S. Appl. No. 18/520,336, filed Nov. 27, 2023, 20 pages.
Non-Final Office Action mailed on Mar. 20, 2025, issued in connection with U.S. Appl. No. 18/338,996, filed Jun. 21, 2023, 11 pages.
Non-Final Office Action mailed on May 20, 2024, issued in connection with U.S. Appl. No. 18/600,044, filed Mar. 8, 2024, 24 pages.

(56) References Cited

OTHER PUBLICATIONS

Non-Final Office Action mailed on Nov. 20, 2024, issued in connection with U.S. Appl. No. 18/395,386, filed Dec. 22, 2023, 30 pages.
Non-Final Office Action mailed on Dec. 21, 2018, issued in connection with U.S. Appl. No. 16/181,213, filed Nov. 5, 2018, 13 pages.
Non-Final Office Action mailed on Jun. 21, 2016, issued in connection with U.S. Appl. No. 14/678,248, filed Apr. 3, 2015, 10 pages.
Non-Final Office Action mailed on Jun. 21, 2019, issued in connection with U.S. Appl. No. 16/181,865, filed Nov. 6, 2018, 12 pages.
Non-Final Office Action mailed on Nov. 21, 2014, issued in connection with U.S. Appl. No. 13/536,493, filed Jun. 28, 2012, 20 pages.
Non-Final Office Action mailed on Nov. 21, 2024, issued in connection with U.S. Appl. No. 18/048,034, filed Oct. 20, 2022, 11 pages.
Non-Final Office Action mailed on Nov. 21, 2024, issued in connection with U.S. Appl. No. 18/508,105, filed Nov. 13, 2023, 16 pages.
Non-Final Office Action mailed on Sep. 21, 2023, issued in connection with U.S. Appl. No. 18/352,394, filed Jul. 14, 2023, 6 pages.
Non-Final Office Action mailed on Jun. 22, 2018, issued in connection with U.S. Appl. No. 15/217,399, filed Jul. 22, 2016, 33 pages.
Non-Final Office Action mailed on Jun. 22, 2020, issued in connection with U.S. Appl. No. 16/555,832, filed Aug. 29, 2019, 15 pages.
Non-Final Office Action mailed on Oct. 22, 2019, issued in connection with U.S. Appl. No. 16/416,619, filed May 20, 2019, 12 pages.
Non-Final Office Action mailed on Oct. 22, 2021, issued in connection with U.S. Appl. No. 16/949,951, filed Nov. 20, 2020, 10 pages.
Non-Final Office Action mailed on Jan. 23, 2019, issued in connection with U.S. Appl. No. 16/113,032, filed Aug. 27, 2018, 8 pages.
Non-Final Office Action mailed on Jun. 23, 2023, issued in connection with U.S. Appl. No. 18/189,869, filed Mar. 24, 2023, 13 pages.
Non-Final Office Action mailed on Apr. 24, 2024, issued in connection with U.S. Appl. No. 18/461,430, filed Sep. 5, 2023, 22 pages.
Non-Final Office Action mailed on Apr. 24, 2025, issued in connection with U.S. Appl. No. 18/331,710, filed Jun. 8, 2023, 20 pages.
Non-Final Office Action mailed on Jan. 24, 2024, issued in connection with U.S. Appl. No. 18/189,863, filed Mar. 24, 2023, 28 pages.
Non-Final Office Action mailed on Jun. 24, 2022, issued in connection with U.S. Appl. No. 17/373,179, filed Jul. 12, 2021, 8 pages.
Non-Final Office Action mailed on May 24, 2019, issued in connection with U.S. Appl. No. 16/401,981, filed May 2, 2019, 14 pages.
Non-Final Office Action mailed on May 24, 2023, issued in connection with U.S. Appl. No. 18/175,283, filed Feb. 27, 2023, 13 pages.
Non-Final Office Action mailed on Feb. 25, 2022, issued in connection with U.S. Appl. No. 17/107,157, filed Nov. 30, 2020, 30 pages.
Non-Final Office Action mailed on Jan. 25, 2023, issued in connection with U.S. Appl. No. 17/816,238, filed Jul. 29, 2022, 10 pages.
Non-Final Office Action mailed on Oct. 25, 2016, issued in connection with U.S. Appl. No. 14/864,506, filed Sep. 24, 2015, 9 pages.
Non-Final Office Action mailed on Oct. 25, 2023, issued in connection with U.S. Appl. No. 18/308,065, filed Apr. 27, 2023, 15 pages.
Non-Final Office Action mailed on Apr. 26, 2024, issued in connection with U.S. Appl. No. 18/310,025, filed May 1, 2023, 9 pages.
Non-Final Office Action mailed on Jan. 26, 2024, issued in connection with U.S. Appl. No. 17/450,925, filed Oct. 14, 2021, 9 pages.
Non-Final Office Action mailed on Jun. 26, 2023, issued in connection with U.S. Appl. No. 17/543,014, filed Dec. 6, 2021, 17 pages.
Non-Final Office Action mailed on Nov. 26, 2024, issued in connection with U.S. Appl. No. 18/398,489, filed Dec. 28, 2023, 08 pages.
Non-Final Office Action mailed on Sep. 26, 2018, issued in connection with U.S. Appl. No. 15/229,693, filed Aug. 5, 2016, 25 pages.
Non-Final Office Action mailed on Sep. 26, 2024, issued in connection with U.S. Appl. No. 18/595,934, filed Mar. 5, 2024, 13 pages.
Non-Final Office Action mailed on Aug. 27, 2025, issued in connection with U.S. Appl. No. 18/408,495, filed Jan. 9, 2024, 10 pages.
Non-Final Office Action mailed on Dec. 27, 2017, issued in connection with U.S. Appl. No. 15/357,520, filed Nov. 21, 2016, 28 pages.
Non-Final Office Action mailed on Feb. 27, 2018, issued in connection with U.S. Appl. No. 14/864,393, filed Sep. 24, 2015, 19 pages.
Non-Final Office Action mailed on Feb. 27, 2018, issued in connection with U.S. Appl. No. 15/718,556, filed Sep. 28, 2017, 19 pages.
Non-Final Office Action mailed on Feb. 27, 2023, issued in connection with U.S. Appl. No. 17/556,426, filed Dec. 20, 2021, 8 pages.
Non-Final Office Action mailed on Feb. 27, 2024, issued in connection with U.S. Appl. No. 18/343,487, filed Jun. 28, 2023, 42 pages.
Non-Final Office Action mailed on Jan. 27, 2025, issued in connection with U.S. Appl. No. 18/492,583, filed Oct. 23, 2023, 9 pages.
Non-Final Office Action mailed on Jul. 27, 2016, issued in connection with U.S. Appl. No. 14/696,014, filed Apr. 24, 2015, 11 pages.
Non-Final Office Action mailed on Mar. 27, 2017, issued in connection with U.S. Appl. No. 15/211,835, filed Jul. 15, 2016, 30 pages.
Non-Final Office Action mailed on Mar. 27, 2018, issued in connection with U.S. Appl. No. 15/785,088, filed Oct. 16, 2017, 11 pages.
Non-Final Office Action mailed on Sep. 27, 2023, issued in connection with U.S. Appl. No. 18/154,228, filed Jan. 13, 2023, 12 pages.
Non-Final Office Action mailed on Jul. 28, 2016, issued in connection with U.S. Appl. No. 14/884,001, filed Oct. 15, 2015, 8 pages.
Non-Final Office Action mailed on Mar. 28, 2024, issued in connection with U.S. Appl. No. 18/192,452, filed Mar. 29, 2023, 7 pages.
Non-Final Office Action mailed on May 28, 2021, issued in connection with U.S. Appl. No. 17/098,134, filed Nov. 13, 2020, 14 pages.
Non-Final Office Action mailed on Nov. 28, 2017, issued in connection with U.S. Appl. No. 15/673,170, filed Aug. 9, 2017, 7 pages.
Non-Final Office Action mailed on Sep. 28, 2018, issued in connection with U.S. Appl. No. 15/588,186, filed May 5, 2017, 12 pages.
Non-Final Office Action mailed on Sep. 28, 2018, issued in connection with U.S. Appl. No. 15/595,519, filed May 15, 2017, 12 pages.
First Action Interview Office Action mailed on Jun. 30, 2016, issued in connection with U.S. Appl. No. 14/481,505, filed Sep. 9, 2014, 9 pages.

(56) References Cited

OTHER PUBLICATIONS

First Action Interview Pilot Program Pre-Interview Communication mailed on Apr. 5, 2017, issued in connection with U.S. Appl. No. 14/793,190, filed Jul. 7, 2015, 4 pages.
First Action Interview Pilot Program Pre-Interview Communication mailed on Oct. 7, 2015, issued in connection with U.S. Appl. No. 14/216,306, filed Mar. 17, 2014, 5 pages.
First Action Interview Pilot Program Pre-Interview Communication mailed on Feb. 16, 2016, issued in connection with U.S. Appl. No. 14/681,465, filed Apr. 8, 2015, 5 pages.
Gonzalez et al., "Simultaneous Measurement of Multichannel Acoustic Systems," J. Audio Eng. Soc., 2004, pp. 26-42, vol. 52, No. 1/2.
*Google LLC* v. *Sonos, Inc.*, Declaration of Jeffery S. Vipperman, PHD. in Support of Petition for Inter Partes Review of U.S. Pat. No. 9,219,460, IPR2021-00475, Feb. 2, 2021, 92 pages.
*Google LLC* v. *Sonos, Inc.*, Declaration of Michael T. Johnson, Ph.D. Exhibit 2016 in Patent Owner Response to Petition for Inter Partes Review of U.S. Pat. No. 9,219,460, IPR2021-00475, Jun. 13, 2022, 117 pages.
*Google LLC* v. *Sonos, Inc.*, Deposition of Jeffrey S. Vipperman, Ph.D. Exhibit 2017 in Patent Owner Response to Petition for Inter Partes Review of U.S. Pat. No. 9,219,460, IPR2021-00475, Jun. 13, 2022, 183 pages.
*Google LLC* v. *Sonos, Inc.*, File History of U.S. Appl. No. 61/601,529 Maher. Exhibit 2018 in Patent Owner Response to Petition for Inter Partes Review of U.S. Pat. No. 9,219,460, IPR2021-00475, Jun. 13, 2022, 14 pages.
*Google LLC* v. *Sonos, Inc.*, Judgment. Final Written Decision Determining All Challenged Claims Unpatentable for IPR of U.S. Pat. No. 9,219,460, IPR2021-00475, Feb. 15, 2023, 45 pages.
*Google LLC* v. *Sonos, Inc.*, Patent Owner Response to Petition for Inter Partes Review of U.S. Pat. No. 9,219,460, IPR2021-00475, Jun. 13, 2022, 49 pages.
*Google LLC* v. *Sonos, Inc.*, Patent Owner Sur-Reply to Petitioner's Reply for Inter Partes Review of U.S. Pat. No. 9,219,460, IPR2021-00475, Oct. 12, 2022, 32 pages.
*Google LLC* v. *Sonos, Inc.*, Petition for IPR of U.S. Pat. No. 9,219,460, IPR2021-00475, Feb. 5, 2021, 88 pages.
*Google LLC* v. *Sonos, Inc.*, Petitioner's Reply for Inter Partes Review of U.S. Pat. No. 9,219,460, IPR2021-00475, Sep. 6, 2022, 30 pages.
*Google LLC* v. *Sonos, Inc.*, Record of Oral Hearing for IPR of U.S. Pat. No. 9,219,460, IPR2021-00475, Dec. 14, 2022, 60 pages.
Indian Patent Office, Examination Report mailed on Feb. 28, 2024, issued in connection with Indian Patent Application No. 201847035625, 3 pages.
International Bureau, International Preliminary Report on Patentability and Written Opinion, mailed on Jan. 15, 2019, issued in connection with International Application No. PCT/US2017/042191, filed on Jul. 14, 2017, 10 pages.
International Bureau, International Preliminary Report on Patentability and Written Opinion, mailed on Mar. 20, 2018, issued in connection with International Application No. PCT/US2016/052264, filed on Sep. 16, 2016, 10 pages.
International Bureau, International Preliminary Report on Patentability and Written Opinion, mailed on Mar. 20, 2018, issued in connection with International Application No. PCT/US2016/052266, filed on Sep. 16, 2016, 7 pages.
International Bureau, International Preliminary Report on Patentability and Written Opinion, mailed on Dec. 22, 2022, issued in connection with International Application No. PCT/US2021/036386, filed on Jun. 8, 2021, 8 pages.
International Bureau, International Preliminary Report on Patentability and Written Opinion, mailed on Jan. 23, 2018, issued in connection with International Application No. PCT/US2016/043109, filed on Jul. 20, 2016, 7 pages.
International Bureau, International Preliminary Report on Patentability and Written Opinion, mailed on Jan. 23, 2018, issued in connection with International Application No. PCT/US2016/043116, filed on Jul. 20, 2016, 8 pages.
International Bureau, International Preliminary Report on Patentability and Written Opinion, mailed on Oct. 24, 2017, issued in connection with International Application No. PCT/US2016/028997, filed on Apr. 22, 2016, 7 pages.
International Bureau, International Preliminary Report on Patentability and Written Opinion, mailed on Apr. 6, 2023, issued in connection with International Application No. PCT/US2021/071598, filed on Sep. 25, 2021, 8 pages.
International Bureau, International Preliminary Report on Patentability and Written Opinion, mailed on Jan. 9, 2018, issued in connection with International Application No. PCT/US2016/041179, filed on Jul. 6, 2016, 6 pages.
International Bureau, International Preliminary Report on Patentability, mailed on Dec. 1, 2022, issued in connection with International Application No. PCT/US2021/070524, filed on May 10, 2021, 9 pages.
International Bureau, International Preliminary Report on Patentability, mailed on Apr. 11, 2024, issued in connection with International Application No. PCT/US2022/077107, filed on Sep. 27, 2022, 9 pages.
International Bureau, International Preliminary Report on Patentability, mailed on Mar. 2, 2021, issued in connection with International Application No. PCT/US2019/048366, filed on Aug. 27, 2019, 7 pages.
International Bureau, International Preliminary Report on Patentability, mailed on Mar. 2, 2021, issued in connection with International Application No. PCT/US2019/048569, filed on Aug. 28, 2019, 11 pages.
International Bureau, International Preliminary Report on Patentability, mailed on Aug. 22, 2024, issued in connection with International Application No. PCT/US2023/062179, filed on Feb. 8, 2023, 8 pages.
International Bureau, International Preliminary Report on Patentability, mailed on Sep. 24, 2015, issued in connection with International Application No. PCT/US2014/030560, filed on Mar. 17, 2014, 7 pages.
International Bureau, International Preliminary Report on Patentability mailed on Sep. 29, 2016, issued in connection with International Application No. PCT/US2015/020993, filed on Mar. 17, 2015, 8 pages.
International Bureau, International Preliminary Report on Patentability mailed on Sep. 29, 2016, issued in connection with International Application No. PCT/US2015/021000, filed on Mar. 17, 2015, 9 pages.
International Bureau, International Preliminary Report on Patentability, mailed on Apr. 4, 2024, issued in connection with International Application No. PCT/US2022/076972, filed on Sep. 23, 2022, 14 pages.
International Bureau, International Preliminary Report on Patentability, mailed on Aug. 9, 2018, issued in connection with International Application No. PCT/US2017/014596, filed on Jan. 23, 2017, 11 pages.
International Bureau, International Search Report and Written Opinion mailed on Dec. 15, 2020, issued in connection with International Application No. PCT/US2020/045746, filed on Aug. 11, 2020, 23 pages.
International Bureau, International Search Report and Written Opinion mailed on Dec. 19, 2022, issued in connection with International Application No. PCT/US2022/077107, filed on Sep. 27, 2022, 13 pages.
International Bureau, International Search Report and Written Opinion mailed on Mar. 23, 2023, issued in connection with International Application No. PCT/US2022/076972, filed on Sep. 23, 2022, 20 pages.
International Bureau, International Search Report and Written Opinion mailed on Apr. 25, 2023, issued in connection with International Application No. PCT/US2023/062179, filed on Feb. 8, 2023, 11 pages.
International Bureau, International Search Report and Written Opinion mailed on Nov. 25, 2019, issued in connection with International Application No. PCT/US2019/048569, filed on Aug. 28, 2019, 13 pages.

(56) References Cited

OTHER PUBLICATIONS

International Bureau, International Search Report and Written Opinion mailed on Nov. 7, 2019, issued in connection with International Application No. PCT/US2019/048366, filed on Aug. 27, 2019, 9 pages.
International Searching Authority, International Preliminary Report on Patentability mailed on Mar. 23, 2017, issued in connection with International Patent Application No. PCT/US2015/048944, filed on Sep. 8, 2015, 8 pages.
International Searching Authority, International Preliminary Report on Patentability mailed on Oct. 24, 2017, issued in connection with International Application No. PCT/US2016/028994 filed on Apr. 22, 2016, 7 pages.
International Searching Authority, International Search Report and Written Opinion mailed on Jul. 4, 2016, issued in connection with International Application No. PCT/US2016/028994, filed on Apr. 22, 2016, 12 pages.
International Searching Authority, International Search Report and Written Opinion mailed on Jul. 5, 2016, issued in connection with International Application No. PCT/US2016/028997, filed on Apr. 22, 2016, 13 pages.
International Searching Authority, International Search Report and Written Opinion mailed on Jun. 5, 2015, issued in connection with International Application No. PCT/US2015/021000, filed on Mar. 17, 2015, 12 pages.
International Searching Authority, International Search Report and Written Opinion mailed on Oct. 12, 2016, issued in connection with International Application No. PCT/US2016/041179 filed on Jul. 6, 2016, 9 pages.
International Searching Authority, International Search Report and Written Opinion mailed on Jun. 16, 2015, issued in connection with International Application No. PCT/US2015/020993, filed on Mar. 17, 2015, 11 pages.
International Searching Authority, International Search Report and Written Opinion mailed on Nov. 18, 2015, issued in connection with International Application No. PCT/US2015/048954, filed on Sep. 8, 2015, 11 pages.
International Searching Authority, International Search Report and Written Opinion mailed on Oct. 18, 2016, issued in connection with International Application No. PCT/US2016/043116, filed on Jul. 20, 2016, 14 pages.
International Searching Authority, International Search Report and Written Opinion mailed on Oct. 18, 2016, issued in connection with International Application No. PCT/US2016/043840, filed on Jul. 25, 2016, 14 pages.
International Searching Authority, International Search Report and Written Opinion mailed on Nov. 23, 2015, issued in connection with International Application No. PCT/US2015/048942, filed on Sep. 8, 2015, 14 pages.
International Searching Authority, International Search Report and Written Opinion mailed on Nov. 23, 2015, issued in connection with International Application No. PCT/US2015/048944, filed on Sep. 8, 2015, 12 pages.
International Searching Authority, International Search Report and Written Opinion mailed on Nov. 23, 2016, issued in connection with International Patent Application No. PCT/US2016/052266, filed on Sep. 16, 2016, 11 pages.
International Searching Authority, International Search Report and Written Opinion mailed on Jan. 24, 2017, issued in connection with International Application No. PCT/US2016/052264, filed on Sep. 16, 2016, 17 pages.
International Searching Authority, International Search Report and Written Opinion mailed on Oct. 25, 2016, issued in connection with International Application No. PCT/US2016/043109, filed on Jul. 20, 2016, 12 pages.
International Searching Authority, International Search Report and Written Opinion mailed on Sep. 25, 2017, issued in connection with International Application No. PCT/US2017/042191, filed on Jul. 14, 2017, 16 pages.
International Searching Authority, International Search Report and Written Opinion mailed on Aug. 3, 2017, in connection with International Application No. PCT/US2017014596, 20 pages.
Japanese Patent Office, Decision to Grant a Patent and Translation mailed on May 20, 2025, issued in connection with Japanese Patent Application No. 2023-144387, 5 pages.
Japanese Patent Office, Decision to Grant a Patent and Translation mailed on Mar. 26, 2025, issued in connection with Japanese Patent Application No. 2023-144379, 5 pages.
Japanese Patent Office, Decision to Grant a Patent and Translation mailed on May 7, 2025, issued in connection with Japanese Patent Application No. 2023-149069, 5 pages.
Japanese Patent Office, Decision to Grant and Translation mailed on Mar. 5, 2025, issued in connection with Japanese Patent Application No. 2024-028691, 5 pages.
Japanese Patent Office, English Translation of Office Action mailed on May 8, 2018, issued in connection with Japanese Application No. 2017-513241, 4 pages.
Japanese Patent Office, Examination Report and Translation mailed on Dec. 7, 2021, issued in connection with Japanese Patent Application No. 2020-185230, 10 pages.
Japanese Patent Office, Japanese Office Action mailed on Oct. 3, 2017, issued in connection with Japanese Application No. 2017-501082, 7 pages.
Japanese Patent Office, Non-Final Office Action and Translation mailed on Dec. 10, 2019, issued in connection with Japanese Patent Application No. 2018-213477, 8 pages.
Japanese Patent Office, Non-Final Office Action mailed on Jan. 24, 2023, issued in connection with Japanese Patent Application No. 2021-194522, 6 pages.
Japanese Patent Office, Non-Final Office Action with Translation mailed on Apr. 25, 2017, issued in connection with Japanese Patent Application No. 2016-568888, 7 pages.
Japanese Patent Office, Non-Final Office Action with Translation mailed on Oct. 3, 2017, issued in connection with Japanese Patent Application No. 2017-501082, 3 pages.
Japanese Patent Office, Notice of Reasons for Refusal and Translation mailed on Dec. 10, 2024, issued in connection with Japanese Patent Application No. 2023-149069, 8 pages.
Japanese Patent Office, Notice of Reasons for Refusal and Translation mailed on Dec. 3, 2024, issued in connection with Japanese Patent Application No. 2023-144379, 12 pages.
Japanese Patent Office, Notice of Reasons for Refusal and Translation mailed on Dec. 3, 2024, issued in connection with Japanese Patent Application No. 2023-144387, 8 pages.
Japanese Patent Office, Notice of Reasons for Refusal and Translation mailed on Oct. 5, 2021, issued in connection with Japanese Patent Application No. 2020-134012, 10 pages.
Japanese Patent Office, Office Action and Translation mailed on Jun. 12, 2020, issued in connection with Japanese Patent Application No. 2019-056360, 6 pages.
Japanese Patent Office, Office Action and Translation mailed on Apr. 13, 2021, issued in connection with Japanese Patent Application No. 2020-048867, 4 pages.
Japanese Patent Office, Office Action and Translation mailed on Nov. 4, 2020, issued in connection with Japanese Patent Application No. 2019-141349, 6 pages.
Japanese Patent Office, Office Action and Translation mailed on Sep. 5, 2023, issued in connection with Japanese Application No. 2022-115789, 6 pages.
Japanese Patent Office, Office Action and Translation mailed on Mar. 7, 2023, issued in connection with Japanese Application No. 2022-001030, 11 pages.
Japanese Patent Office, Office Action and Translation mailed on Oct. 8, 2024, issued in connection with Japanese Patent Application No. 2023-118922, 9 pages.
Japanese Patent Office, Office Action mailed on Dec. 7, 2021, issued in connection with Japanese Patent Application No. 2020-185230, 8 pages.
Japanese Patent Office, Office Action mailed on Jun. 12, 2018, issued in connection with Japanese Application No. 2018-502729, 4 pages.

(56) References Cited

OTHER PUBLICATIONS

Japanese Patent Office, Office Action mailed on May 14, 2019, issued in connection with Japanese Patent Application No. 2018-500529, 8 pages.
Japanese Patent Office, Office Action mailed on Aug. 21, 2018, issued in connection with Japanese Application No. 2018-514418, 7 pages.
Japanese Patent Office, Office Action mailed on Jul. 24, 2018, issued in connection with Japanese Application No. 2018-514419, 5 pages.
Japanese Patent Office, Office Action mailed on Feb. 4, 2020, issued in connection with Japanese Patent Application No. 2018-500529, 6 pages.
Japanese Patent Office, Office Action mailed on Jun. 4, 2019, issued in connection with Japanese Patent Application No. 2018-112810, 4 pages.
Japanese Patent Office, Office Action mailed on May 8, 2018, issued in connection with Japanese Application No. 2017-513241, 8 pages.
Japanese Patent Office, Office Action with English Summary mailed on Jul. 18, 2017, issued in connection with Japanese Patent Application No. 2017-513171, 4 pages.
Japanese Patent Office, Translation of Office Action mailed on May 14, 2019, issued in connection with Japanese Patent Application No. 2018-500529, 5 pages.
Korean Patent Office, Korean Examination Report and Translation mailed on Jan. 16, 2026, issued in connection with Korean Application No. 10-2021-7028723, 20 pages.
Korean Patent Office, Korean Examination Report and Translation mailed on Jul. 17, 2024, issued in connection with Korean Application No. 10-2022-7024007, 10 pages.
Korean Patent Office, Korean Examination Report and Translation mailed on Aug. 5, 2024, issued in connection with Korean Application No. 10-2023-7031855, 10 pages.
Korean Patent Office, Korean Examination Report and Translation mailed on Nov. 6, 2024, issued in connection with Korean Application No. 10-2023-7032988, 13 pages.
Korean Patent Office, Korean Office Action and Translation mailed on Oct. 20, 2024, issued in connection with Korean Application No. 10-2023-7036702, 22 pages.
Korean Patent Office, Korean Preliminary Rejection and Translation mailed on Dec. 26, 2023, issued in connection with Korean Application No. 10-2023-7031855, 4 pages.
Lei et al. An Audio Frequency Acquision and Release System Based on TMS320VC5509, Instrumentation Technology, Editorial Department Email, Issue 02, 2007, 4 pages.
Motorola, "Simplefi, Wireless Digital Audio Receiver, Installation and User Guide," Dec. 31, 2001, 111 pages.
Mulcahy, John, "Room EQ Wizard: Room Acoustics Software," REW, 2014, retrieved Oct. 10, 2014, 4 pages.
Notice of Allowance mailed on Mar. 15, 2017, issued in connection with U.S. Appl. No. 14/826,856, filed Aug. 14, 2015, 7 pages.
Notice of Allowance mailed on Mar. 15, 2023, issued in connection with U.S. Appl. No. 16/949,973, filed Nov. 23, 2020, 21 pages.
Notice of Allowance mailed on May 15, 2019, issued in connection with U.S. Appl. No. 16/113,032, filed Aug. 27, 2018, 9 pages.
Notice of Allowance mailed on Nov. 15, 2021, issued in connection with U.S. Appl. No. 16/994,874, filed Aug. 17, 2020, 9 pages.
Notice of Allowance mailed on Oct. 15, 2018, issued in connection with U.S. Appl. No. 15/716,313, filed Sep. 26, 2017, 10 pages.
Notice of Allowance mailed on Oct. 15, 2025, issued in connection with U.S. Appl. No. 18/461,409, filed Sep. 5, 2023, 09 pages.
Notice of Allowance mailed on Sep. 15, 2022, issued in connection with U.S. Appl. No. 17/033,818, filed Sep. 27, 2020, 7 pages.
Notice of Allowance mailed on Feb. 16, 2022, issued in connection with U.S. Appl. No. 16/919,467, filed Jul. 2, 2020, 9 pages.
Notice of Allowance mailed on Jan. 16, 2024, issued in connection with U.S. Appl. No. 17/810,549, filed Jul. 1, 2022, 7 pages.
Notice of Allowance mailed on Jul. 16, 2020, issued in connection with U.S. Appl. No. 16/530,324, filed Aug. 2, 2019, 9 pages.
Notice of Allowance mailed on Jun. 16, 2017, issued in connection with U.S. Appl. No. 14/884,001, filed Oct. 15, 2015, 8 pages.
Notice of Allowance mailed on May 16, 2019, issued in connection with U.S. Appl. No. 16/181,213, filed Nov. 5, 2018, 10 pages.
Notice of Allowance mailed on May 16, 2025, issued in connection with U.S. Appl. No. 18/659,707, filed May 9, 2024, 07 pages.
Notice of Allowance mailed on Oct. 16, 2017, issued in connection with U.S. Appl. No. 15/478,770, filed Apr. 4, 2017, 10 pages.
Notice of Allowance mailed on Oct. 16, 2019, issued in connection with U.S. Appl. No. 16/401,981, filed May 2, 2019, 8 pages.
Notice of Allowance mailed on Sep. 16, 2016, issued in connection with U.S. Appl. No. 15/066,049, filed Mar. 10, 2016, 7 pages.
Notice of Allowance mailed on Sep. 16, 2024, issued in connection with U.S. Appl. No. 18/432,733, filed Feb. 5, 2024, 1 page.
Notice of Allowance mailed on Apr. 17, 2024, issued in connection with U.S. Appl. No. 18/088,976, filed Dec. 27, 2022, 7 pages.
Notice of Allowance mailed on Apr. 17, 2024, issued in connection with U.S. Appl. No. 18/471,693, filed Sep. 21, 2023, 12 pages.
Notice of Allowance mailed on Aug. 17, 2022, issued in connection with U.S. Appl. No. 17/316,371, filed May 10, 2021, 9 pages.
Notice of Allowance mailed on Dec. 17, 2018, issued in connection with U.S. Appl. No. 16/055,884, filed Aug. 6, 2018, 5 pages.
Notice of Allowance mailed on Jul. 17, 2024, issued in connection with U.S. Appl. No. 18/310,025, filed May 1, 2023, 7 pages.
Notice of Allowance mailed on May 17, 2017, issued in connection with U.S. Appl. No. 15/339,260, filed Oct. 31, 2016, 7 pages.
Notice of Allowance mailed on Oct. 17, 2019, issued in connection with U.S. Appl. No. 16/542,433, filed Aug. 16, 2019, 9 pages.
Notice of Allowance mailed on Oct. 17, 2024, issued in connection with U.S. Appl. No. 18/460,141, filed Sep. 1, 2023, 2 pages.
Notice of Allowance mailed on Oct. 17, 2024, issued in connection with U.S. Appl. No. 18/520,531, filed Nov. 27, 2023, 10 pages.
Notice of Allowance mailed on Aug. 18, 2022, issued in connection with U.S. Appl. No. 17/660,185, filed Apr. 21, 2022, 11 pages.
Notice of Allowance mailed on Dec. 18, 2024, issued in connection with U.S. Appl. No. 17/450,925, filed Oct. 14, 2021, 10 pages.
Notice of Allowance mailed on Dec. 18, 2024, issued in connection with U.S. Appl. No. 18/410,120, filed Jan. 11, 2024, 07 pages.
Notice of Allowance mailed on Jan. 18, 2024, issued in connection with U.S. Appl. No. 18/352,394, filed Jul. 14, 2023, 7 pages.
Notice of Allowance mailed on Mar. 18, 2019, issued in connection with U.S. Appl. No. 16/056,862, filed Aug. 7, 2018, 12 pages.
Notice of Allowance mailed on Mar. 18, 2021, issued in connection with U.S. Appl. No. 15/005,496, filed Jan. 25, 2016, 8 pages.
Notice of Allowance mailed on Oct. 18, 2021, issued in connection with U.S. Appl. No. 16/570,679, filed Sep. 13, 2019, 9 pages.
Notice of Allowance mailed on Sep. 18, 2024, issued in connection with U.S. Appl. No. 17/532,744, filed Nov. 22, 2021, 13 pages.
Notice of Allowance mailed on Sep. 18, 2024, issued in connection with U.S. Appl. No. 18/455,415, filed Aug. 24, 2023, 16 pages.
Notice of Allowance mailed on Apr. 19, 2023, issued in connection with U.S. Appl. No. 17/113,799, filed Dec. 7, 2020, 7 pages.
Notice of Allowance mailed on Aug. 19, 2016, issued in connection with U.S. Appl. No. 14/644,136, filed Mar. 10, 2015, 12 pages.
Notice of Allowance mailed on Aug. 19, 2024, issued in connection with U.S. Appl. No. 18/345,588, filed Jun. 30, 2023, 20 pages.
Notice of Allowance mailed on Jan. 19, 2022, issued in connection with U.S. Appl. No. 17/399,294, filed Aug. 11, 2021, 11 pages.
Notice of Allowance mailed on Jul. 19, 2019, issued in connection with U.S. Appl. No. 16/123,928, filed Sep. 6, 2018, 8 pages.
Notice of Allowance mailed on Jul. 19, 2024, issued in connection with U.S. Appl. No. 18/328,932, filed Jun. 5, 2023, 9 pages.
Notice of Allowance mailed on Jun. 19, 2017, issued in connection with U.S. Appl. No. 14/793,190, filed Jul. 7, 2015, 5 pages.
Notice of Allowance mailed on Sep. 19, 2017, issued in connection with U.S. Appl. No. 14/793,205, filed Jul. 7, 2015, 16 pages.
Notice of Allowance mailed on Sep. 19, 2018, issued in connection with U.S. Appl. No. 14/864,393, filed Sep. 24, 2015, 10 pages.
Notice of Allowance mailed on Feb. 2, 2022, issued in connection with U.S. Appl. No. 16/949,951, filed Nov. 20, 2020, 8 pages.
Notice of Allowance mailed on Mar. 2, 2020, issued in connection with U.S. Appl. No. 16/213,552, filed Dec. 7, 2018, 9 pages.
Notice of Allowance mailed on Oct. 2, 2023, issued in connection with U.S. Appl. No. 18/189,869, filed Mar. 24, 2023, 8 pages.

(56) References Cited

OTHER PUBLICATIONS

Notice of Allowance mailed on Sep. 2, 2021, issued in connection with U.S. Appl. No. 17/357,302, filed Jun. 24, 2021, 10 pages.
Notice of Allowance mailed on Apr. 20, 2017, issued in connection with U.S. Appl. No. 14/940,779, filed Nov. 13, 2015, 11 pages.
Notice of Allowance mailed on Apr. 20, 2022, issued in connection with U.S. Appl. No. 17/098,134, filed Nov. 13, 2020, 5 pages.
Notice of Allowance mailed on Mar. 26, 2025, issued in connection with U.S. Appl. No. 18/048,034, filed Oct. 20, 2022, 08 pages.
Notice of Allowance mailed on May 26, 2023, issued in connection with U.S. Appl. No. 18/060,176, filed Nov. 30, 2023, 10 pages.
Notice of Allowance mailed on Oct. 26, 2016, issued in connection with U.S. Appl. No. 14/811,587, filed Jul. 28, 2015, 11 pages.
Notice of Allowance mailed on Sep. 26, 2024, issued in connection with U.S. Appl. No. 17/932,715, filed Sep. 16, 2022, 9 pages.
Notice of Allowance mailed on Feb. 27, 2017, issued in connection with U.S. Appl. No. 14/805,340, filed Jul. 21, 2015, 9 pages.
Notice of Allowance mailed on Feb. 27, 2023, issued in connection with U.S. Appl. No. 17/107,157, filed Nov. 30, 2020, 13 pages.
Notice of Allowance mailed on Jul. 27, 2017, issued in connection with U.S. Appl. No. 15/005,853, filed Jan. 25, 2016, 5 pages.
Notice of Allowance mailed on Jun. 27, 2017, issued in connection with U.S. Appl. No. 15/344,069, filed Nov. 4, 2016, 8 pages.
Notice of Allowance mailed on Mar. 27, 2024, issued in connection with U.S. Appl. No. 18/061,570, filed Dec. 5, 2022, 8 pages.
Notice of Allowance mailed on Oct. 27, 2020, issued in connection with U.S. Appl. No. 16/555,832, filed Aug. 29, 2019, 5 pages.
Notice of Allowance mailed on Oct. 27, 2021, issued in connection with U.S. Appl. No. 17/135,293, filed Dec. 28, 2020, 11 pages.
Notice of Allowance mailed on Aug. 28, 2017, issued in connection with U.S. Appl. No. 15/089,004, filed Apr. 1, 2016, 5 pages.
Notice of Allowance mailed on Aug. 28, 2024, issued in connection with U.S. Appl. No. 18/432,733, filed Feb. 5, 2024, 10 pages.
Notice of Allowance mailed on Feb. 28, 2024, issued in connection with U.S. Appl. No. 16/989,350, filed Aug. 10, 2020, 9 pages.
Notice of Allowance mailed on Jul. 28, 2017, issued in connection with U.S. Appl. No. 14/678,263, filed Apr. 3, 2015, 10 pages.
Notice of Allowance mailed on Jul. 28, 2017, issued in connection with U.S. Appl. No. 15/211,822, filed Jul. 15, 2016, 9 pages.
Notice of Allowance mailed on Jun. 28, 2023, issued in connection with U.S. Appl. No. 18/189,876, filed Mar. 24, 2023, 20 pages.
Notice of Allowance mailed on Mar. 28, 2018, issued in connection with U.S. Appl. No. 15/673,170, filed Aug. 9, 2017, 5 pages.
Notice of Allowance mailed on Mar. 28, 2023, issued in connection with U.S. Appl. No. 18/058,659, filed Nov. 23, 2022, 10 pages.
Notice of Allowance mailed on Mar. 28, 2024, issued in connection with U.S. Appl. No. 18/316,400, filed May 12, 2023, 8 pages.
Notice of Allowance mailed on Oct. 28, 2024, issued in connection with U.S. Appl. No. 18/460,141, filed Sep. 1, 2023, 2 pages.
Notice of Allowance mailed on Aug. 29, 2018, issued in connection with U.S. Appl. No. 15/357,520, filed Nov. 21, 2016, 11 pages.
Notice of Allowance mailed on Aug. 29, 2018, issued in connection with U.S. Appl. No. 15/718,556, filed Sep. 28, 2017, 8 pages.
Notice of Allowance mailed on Aug. 29, 2019, issued in connection with U.S. Appl. No. 16/185,906, filed Nov. 9, 2018, 8 pages.
Notice of Allowance mailed on Aug. 29, 2023, issued in connection with U.S. Appl. No. 17/804,372, filed May 27, 2022, 9 pages.
Notice of Allowance mailed on Dec. 29, 2017, issued in connection with U.S. Appl. No. 14/793,205, filed Jul. 7, 2015, 5 pages.
Notice of Allowance mailed on Jul. 29, 2016, issued in connection with U.S. Appl. No. 14/481,522, filed Sep. 9, 2014, 11 pages.
Notice of Allowance mailed on Jul. 29, 2024, issued in connection with U.S. Appl. No. 18/459,982, filed Sep. 1, 2023, 08 pages.
Notice of Allowance mailed on Mar. 29, 2023, issued in connection with U.S. Appl. No. 17/807,595, filed Jun. 17, 2022, 6 pages.
Notice of Allowance mailed on Oct. 29, 2015, issued in connection with U.S. Appl. No. 14/216,306, filed Mar. 17, 2014, 9 pages.
Notice of Allowance mailed on Sep. 29, 2021, issued in connection with U.S. Appl. No. 17/207,640, filed Mar. 20, 2021, 13 pages.
Notice of Allowance mailed on Jan. 3, 2024, issued in connection with U.S. Appl. No. 17/524,377, filed Nov. 11, 2021, 9 pages.
Notice of Allowance mailed on Jul. 3, 2024, issued in connection with U.S. Appl. No. 18/507,713, filed Nov. 13, 2023, 11 pages.
Notice of Allowance mailed on Mar. 3, 2021, issued in connection with U.S. Appl. No. 16/403,077, filed May 3, 2019, 6 pages.
Notice of Allowance mailed on Mar. 3, 2021, issued in connection with U.S. Appl. No. 17/078,382, filed Oct. 23, 2020, 9 pages.
Notice of Allowance mailed on Mar. 3, 2022, issued in connection with U.S. Appl. No. 17/135,308, filed Dec. 28, 2020, 7 pages.
Notice of Allowance mailed on May 3, 2019, issued in connection with U.S. Appl. No. 15/217,399, filed Jul. 22, 2016, 7 pages.
Notice of Allowance mailed on May 3, 2019, issued in connection with U.S. Appl. No. 16/181,583, filed Nov. 6, 2018, 7 pages.
Notice of Allowance mailed on May 3, 2024, issued in connection with U.S. Appl. No. 18/331,580, filed Jun. 8, 2023, 7 pages.
Notice of Allowance mailed on Aug. 30, 2017, issued in connection with U.S. Appl. No. 15/088,994, filed Apr. 1, 2016, 10 pages.
Notice of Allowance mailed on Dec. 30, 2016, issued in connection with U.S. Appl. No. 14/696,014, filed Apr. 24, 2015, 13 pages.
Notice of Allowance mailed on Jan. 30, 2017, issued in connection with U.S. Appl. No. 15/339,260, filed Oct. 31, 2016, 8 pages.
Notice of Allowance mailed on Aug. 31, 2018, issued in connection with U.S. Appl. No. 15/872,979, filed Jan. 16, 2018, 7 pages.
Notice of Allowance mailed on Aug. 31, 2018, issued in connection with U.S. Appl. No. 16/055,884, filed Aug. 6, 2018, 8 pages.
Notice of Allowance mailed on Aug. 31, 2021, issued in connection with U.S. Appl. No. 16/944,884, filed Jul. 31, 2020, 8 pages.
Notice of Allowance mailed on Jul. 31, 2024, issued in connection with U.S. Appl. No. 18/192,452, filed Mar. 29, 2023, 8 pages.
Notice of Allowance mailed on Jul. 31, 2024, issued in connection with U.S. Appl. No. 18/453,052, filed Aug. 21, 2023, 9 pages.
Notice of Allowance mailed on Mar. 31, 2020, issued in connection with U.S. Appl. No. 16/538,629, filed Aug. 12, 2019, 9 pages.
Notice of Allowance mailed on Apr. 4, 2017, issued in connection with U.S. Appl. No. 14/682,182, filed Apr. 9, 2015, 8 pages.
Notice of Allowance mailed on Feb. 4, 2019, issued in connection with U.S. Appl. No. 15/166,241, filed Aug. 26, 2016, 8 pages.
Advisory Action mailed on Jul. 1, 2019, issued in connection with U.S. Appl. No. 15/229,693, filed Aug. 5, 2016, 2 pages.
Advisory Action mailed on Jul. 10, 2018, issued in connection with U.S. Appl. No. 15/056,553, filed Feb. 29, 2016, 3 pages.
Advisory Action mailed on Dec. 11, 2020, issued in connection with U.S. Appl. No. 15/005,496, filed Jan. 25, 2016, 3 pages.
Advisory Action mailed on Jul. 12, 2018, issued in connection with U.S. Appl. No. 15/166,241, filed May 26, 2016, 3 pages.
Advisory Action mailed on Jul. 12, 2018, issued in connection with U.S. Appl. No. 15/235,598, filed Aug. 12, 2016, 3 pages.
Advisory Action mailed on Nov. 12, 2024, issued in connection with U.S. Appl. No. 17/450,925, filed Oct. 14, 2021, 3 pages.
Advisory Action mailed on Aug. 16, 2017, issued in connection with U.S. Appl. No. 14/481,505, filed Sep. 9, 2014, 3 pages.
Advisory Action mailed on Jun. 19, 2018, issued in connection with U.S. Appl. No. 15/229,693, filed Aug. 5, 2016, 3 pages.
Advisory Action mailed on Sep. 19, 2017, issued in connection with U.S. Appl. No. 14/726,921, filed Jun. 1, 2015, 3 pages.
Advisory Action mailed on Nov. 22, 2021, issued in connection with U.S. Appl. No. 16/919,467, filed Jul. 2, 2020, 4 pages.
Advisory Action mailed on Apr. 24, 2024, issued in connection with U.S. Appl. No. 17/807,270, filed Jun. 16, 2022, 3 pages.
Advisory Action mailed on Oct. 25, 2024, issued in connection with U.S. Appl. No. 18/048,034, filed Oct. 20, 2022, 3 pages.
Advisory Action mailed on Feb. 26, 2024, issued in connection with U.S. Appl. No. 17/532,744, filed Nov. 22, 2021, 4 pages.
Advisory Action mailed on Jun. 3, 2020, issued in connection with U.S. Appl. No. 16/115,525, filed Aug. 28, 2018, 3 pages.
Advisory Action mailed on Apr. 30, 2019, issued in connection with U.S. Appl. No. 15/005,496, filed Jan. 25, 2016, 3 pages.
Advisory Action mailed on Feb. 7, 2019, issued in connection with U.S. Appl. No. 15/806,126, filed Nov. 7, 2017, 3 pages.

(56) References Cited

OTHER PUBLICATIONS

Amazon Ask Questions, "Q: Can Two Dots Listen to Separate Music in Different Rooms?," Sep. 2017, pp. 1-5 [retrieved from https://www.amazon.com/ask/questions/Tx199M38M3QKL18/1/ref=ask_al_psf_al_hza].
Amazon. "Multi-Agent Design Guide", Voice Interoperability Initiative: Multi-Agent Design Guide, 36 pages. [retrieved on Jan. 4, 2022], Retrieved from the Internet: URL: https://build.amazonalexadev.com/VII_Multi_Agent_Design_Guide.html.
"AuEQ for the iPhone," Mar. 25, 2015, retrieved from the internet: URL:https://web.archive.org/web20150325152629/http://www.hotto.de/mobileapps/iphoneaueq.html [retrieved on Jun. 24, 2016], 6 pages.
Australian Patent Office, Australian Examination Report Action mailed on Apr. 10, 2025, issued in connection with Australian Application No. 2020290464, 3 pages.
Australian Patent Office, Australian Examination Report Action mailed on Aug. 16, 2024, issued in connection with Australian Application No. 2023248160, 2 pages.
Australian Patent Office, Australian Examination Report Action mailed on Sep. 18, 2024, issued in connection with Australian Application No. 2020218258, 3 pages.
Australian Patent Office, Australian Examination Report Action mailed on Aug. 19, 2024, issued in connection with Australian Application No. 2023237094, 2 pages.
Australian Patent Office, Australian Examination Report Action mailed on Jun. 24, 2024, issued in connection with Australian Application No. 2019405936, 3 pages.
Australian Patent Office, Australian Examination Report Action mailed on Nov. 28, 2025, issued in connection with Australian Application No. 2020405200, 2 pages.
Australian Patent Office, Australian Examination Report Action mailed on Jul. 29, 2024, issued in connection with Australian Application No. 2023237192, 3 pages.
Australian Patent Office, Australian Examination Report Action mailed on Mar. 6, 2025, issued in connection with Australian Application No. 2023201078, 2 pages.
Australian Patent Office, Notice of Acceptance Action mailed on Feb. 27, 2026, issued in connection with Australian Application No. 2023201078, 3 pages.
Australian Patent Office, Notice of Acceptance Action mailed on Oct. 7, 2025, issued in connection with Australian Application No. 2020290464, 3 pages.
"AV Amplifier DSP-Z7", Yamaha, 2008 [retrieved on Jan. 3, 2022]. Retrieved from the Internet: URL: https://de.yamaha.com/files/download/other_assets/6/318616/DSP-Z7_en.pdf, pp. 1-154.
BeoLab5 User Manual. Bang & Olufsen. Version 1.0, 20 pages [produced by Google in WDTX Case No. 6:20-cv-00881 Answer on Jan. 8, 2021].
Bohn, Dieter. The Verge. "Amazon Creates a Huge Alliance to Demand Voice Assistant Compatibility." Sep. 24, 2019, 15 pages. Retrieved from the Internet: URL: https://www.theverge.com/2019/9/24/20881321/amazon-voice-interoperability-initiative-alexa-microsoft-baidu-intel-qualcommspotify-assistants.
Burger, Dennis, "Automated Room Correction Explained," hometheaterreview.com, Nov. 18, 2013, http://hometheaterreview.com/automated-room-correction-explained/ Retrieved Oct. 10, 2014, 3 pages.
Canadian Patent Office, Canadian Examination Report mailed on Oct. 1, 2024, issued in connection with Canadian Application No. 3123601, 4 pages.
Canadian Patent Office, Canadian Examination Report mailed on Aug. 12, 2024, issued in connection with Canadian Application No. 3067776, 3 pages.
Canadian Patent Office, Canadian Examination Report mailed on Oct. 13, 2022, issued in connection with Canadian Application No. 3121516, 4 pages.
Canadian Patent Office, Canadian Examination Report mailed on Oct. 13, 2023, issued in connection with Canadian Application No. 3148021, 8 pages.
Canadian Patent Office, Canadian Examination Report mailed on Jun. 18, 2024, issued in connection with Canadian Application No. 3084279, 4 pages.
Canadian Patent Office, Canadian Examination Report mailed on Dec. 19, 2023, issued in connection with Canadian Application No. 3067776, 3 pages.
Canadian Patent Office, Canadian Examination Report mailed on Apr. 29, 2024, issued in connection with Canadian Application No. 3164558, 4 pages.
Canadian Patent Office, Canadian Examination Report mailed on Jan. 3, 2024, issued in connection with Canadian Application No. 3123601, 3 pages.
Canadian Patent Office, Canadian Examination Report mailed on Oct. 3, 2025, issued in connection with Canadian Application No. 3227238, 4 pages.
Canadian Patent Office, Canadian Examination Report mailed on May 8, 2024, issued in connection with Canadian Application No. 3146914, 5 pages.
Chen, Trista P. et al. VRAPS: Visual Rhythm-Based Audio Playback System. IEEE, Gracenote, Inc., 2010, pp. 721-722.
Chinese Patent Office, Chinese Office Action and Translation mailed on Apr. 1, 2021, issued in connection with Chinese Application No. 201910395715.4, 8 pages.
Chinese Patent Office, First Office Action and Translation mailed on Nov. 3, 2021, issued in connection with Chinese Application No. 202011278502.2, 10 pages.
Chinese Patent Office, First Office Action and Translation mailed on Jun. 19, 2019, issued in connection with Chinese Application No. 201680054189.X, 11 pages.
Chinese Patent Office, First Office Action and Translation mailed on Feb. 22, 2021, issued in connection with Chinese Application No. 202010187024.8, 11 pages.
Chinese Patent Office, First Office Action and Translation mailed on Apr. 23, 2024, issued in connection with Chinese Application No. 202110542908.5, 10 pages.
Non-Final Action mailed on Jan. 29, 2016, issued in connection with U.S. Appl. No. 14/481,511, filed Sep. 9, 2014, 10 pages.
Non-Final Office Action mailed Sep. 16, 2021, issued in connection with U.S. Appl. No. 17/098,134, filed Nov. 13, 2020, 10 pages.
Non-Final Office Action mailed Jul. 21, 2021, issued in connection with U.S. Appl. No. 16/570,679, filed Sep. 13, 2019, 18 pages.
Non-Final Office Action mailed Jul. 23, 2021, issued in connection with U.S. Appl. No. 16/665,154, filed Oct. 28, 2019, 8 pages.
Non-Final Office Action mailed Sep. 7, 2021, issued in connection with U.S. Appl. No. 16/994,627, filed Aug. 16, 2020, 11 pages.
Non-Final Office Action mailed on Mar. 1, 2017, issued in connection with U.S. Appl. No. 15/344,069, filed Nov. 4, 2016, 20 pages.
Non-Final Office Action mailed on Nov. 1, 2017, issued in connection with U.S. Appl. No. 15/235,598, filed Aug. 12, 2016, 15 pages.
Non-Final Office Action mailed on Jan. 2, 2025, issued in connection with U.S. Appl. No. 18/659,707, filed May 9, 2024, 13 pages.
Non-Final Office Action mailed on Jun. 2, 2014, issued in connection with U.S. Appl. No. 13/340,126, filed Dec. 29, 2011, 14 pages.
Non-Final Office Action mailed on Jun. 2, 2017, issued in connection with U.S. Appl. No. 15/229,693, filed Aug. 5, 2016, 18 pages.
Non-Final Office Action mailed on Nov. 2, 2017, issued in connection with U.S. Appl. No. 15/166,241, filed May 26, 2016, 12 pages.
Non-Final Office Action mailed on Oct. 2, 2017, issued in connection with U.S. Appl. No. 15/005,853, filed Jan. 25, 2016, 8 pages.
Non-Final Office Action mailed on Dec. 3, 2024, issued in connection with U.S. Appl. No. 17/222,950, filed Apr. 5, 2021, 10 pages.
Non-Final Office Action mailed on Dec. 3, 2024, issued in connection with U.S. Appl. No. 18/649,847, filed Apr. 29, 2024, 09 pages.
Non-Final Office Action mailed on Feb. 3, 2016, issued in connection with U.S. Appl. No. 14/481,522, filed Sep. 9, 2014, 12 pages.
Non-Final Office Action mailed on Jul. 3, 2018, issued in connection with U.S. Appl. No. 15/909,327, filed Mar. 1, 2018, 30 pages.
Non-Final Office Action mailed on Jan. 4, 2017, issued in connection with U.S. Appl. No. 15/207,682, filed Jul. 12, 2016, 6 pages.
Non-Final Office Action mailed on Nov. 4, 2016, issued in connection with U.S. Appl. No. 14/826,856, filed Aug. 14, 2015, 10 pages.
Non-Final Office Action mailed on Sep. 4, 2019, issued in connection with U.S. Appl. No. 16/213,552, filed Dec. 7, 2018, 16 pages.

(56) References Cited

OTHER PUBLICATIONS

Non-Final Office Action mailed on Jul. 5, 2017, issued in connection with U.S. Appl. No. 14/481,522, filed Sep. 9, 2014, 8 pages.
Non-Final Office Action mailed on Sep. 5, 2024, issued in connection with U.S. Appl. No. 18/410,407, filed Jan. 11, 2024, 18 pages.
Non-Final Office Action mailed on Aug. 6, 2025, issued in connection with U.S. Appl. No. 18/508,105, filed Nov. 13, 2023, 38 pages.
Non-Final Office Action mailed on Jul. 6, 2016, issued in connection with U.S. Appl. No. 15/070,160, filed Mar. 15, 2016, 6 pages.
Non-Final Office Action mailed on Jun. 6, 2018, issued in connection with U.S. Appl. No. 15/005,496, filed Jan. 25, 2016, 16 pages.
Non-Final Office Action mailed on Nov. 6, 2024, issued in connection with U.S. Appl. No. 18/623,602, filed Apr. 1, 2024, 08 pages.
Non-Final Office Action mailed on Oct. 6, 2016, issued in connection with U.S. Appl. No. 14/678,263, filed Apr. 3, 2015, 30 pages.
Non-Final Office Action mailed on Dec. 7, 2015, issued in connection with U.S. Appl. No. 14/921,762, filed Oct. 23, 2015, 5 pages.
Non-Final Office Action mailed on Jul. 7, 2016, issued in connection with U.S. Appl. No. 15/066,049, filed Mar. 10, 2016, 6 pages.
Non-Final Office Action mailed on Mar. 7, 2017, issued in connection with U.S. Appl. No. 14/481,514, filed Sep. 9, 2014, 24 pages.
Non-Final Office Action mailed on Sep. 7, 2016, issued in connection with U.S. Appl. No. 14/826,873, filed Aug. 14, 2015, 12 pages.
Non-Final Office Action mailed on Jul. 8, 2016, issued in connection with U.S. Appl. No. 15/066,072, filed Mar. 10, 2016, 6 pages.
Non-Final Office Action mailed on Nov. 8, 2024, issued in connection with U.S. Appl. No. 18/484,198, filed Oct. 10, 2023, 20 pages.
Non-Final Office Action mailed on Apr. 9, 2025, issued in connection with U.S. Appl. No. 18/461,430, filed Sep. 5, 2023, 21 pages.
Non-Final Office Action mailed on Dec. 9, 2016, issued in connection with U.S. Appl. No. 14/678,248, filed Apr. 3, 2015, 22 pages.
Non-Final Office Action mailed on Feb. 1, 2024, issued in connection with U.S. Appl. No. 18/313,013, filed May 5, 2023, 47 pages.
Non-Final Office Action mailed on May 1, 2024, issued in connection with U.S. Appl. No. 17/650,441, filed Feb. 9, 2022, 12 pages.
Non-Final Office Action mailed on Apr. 10, 2018, issued in connection with U.S. Appl. No. 15/909,529, filed Mar. 1, 2018, 8 pages.
Non-Final Office Action mailed on Apr. 10, 2025, issued in connection with U.S. Appl. No. 18/068,494, filed Dec. 19, 2022, 27 pages.
Non-Final Office Action mailed on Jul. 10, 2025, issued in connection with U.S. Appl. No. 18/520,336, filed Nov. 27, 2023, 24 pages.
Non-Final Office Action mailed on Mar. 10, 2017, issued in connection with U.S. Appl. No. 14/997,868, filed Jan. 18, 2016, 10 pages.
Non-Final Office Action mailed on Sep. 10, 2018, issued in connection with U.S. Appl. No. 15/056,553, filed Feb. 29, 2016, 8 pages.
Non-Final Office Action mailed on Sep. 10, 2024, issued in connection with U.S. Appl. No. 18/410,120, filed Jan. 11, 2024, 07 pages.
Non-Final Office Action mailed on Apr. 11, 2017, issued in connection with U.S. Appl. No. 15/088,994, filed Apr. 1, 2016, 13 pages.
Non-Final Office Action mailed on Apr. 11, 2017, issued in connection with U.S. Appl. No. 15/089,004, filed Apr. 1, 2016, 9 pages.
Non-Final Office Action mailed on Apr. 11, 2024, issued in connection with U.S. Appl. No. 18/456,941, filed Aug. 28, 2023, 10 pages.
Non-Final Office Action mailed on Apr. 11, 2025, issued in connection with U.S. Appl. No. 18/635,731, filed Apr. 15, 2024, 24 pages.
Non-Final Office Action mailed on Dec. 11, 2019, issued in connection with U.S. Appl. No. 16/556,297, filed Aug. 30, 2019, 9 pages.
Non-Final Office Action mailed on Dec. 11, 2019, issued in connection with U.S. Appl. No. 16/658,896, filed Oct. 21, 2019, 14 pages.
Non-Final Office Action mailed on Feb. 11, 2021, issued in connection with U.S. Appl. No. 17/104,466, filed Nov. 25, 2020, 39 pages.
Non-Final Office Action mailed on Jul. 11, 2024, issued in connection with U.S. Appl. No. 18/313,013, filed May 5, 2023, 18 pages.
An Overview of IEEE 1451.4 Transducer Electronic Data Sheets (TEDS) National Instruments, 19 pages, [retrieved on Sep. 4, 2018].
John Mark and Paul Hufnagel "What is 1451.4, what are its uses and how does it work?" IEEE Standards Association, The IEEE 1451.4 Standard for Smart Transducers, 14 pages, [retrieved on Sep. 4, 2018].
Microsoft Corporation, "Using Microsoft Outlook 2003," Cambridge College, 2003, 33 pages.

* cited by examiner

DYNAMIC COMPUTATION OF SYSTEM RESPONSE VOLUME

CROSS-REFERENCE TO RELATED APPLICATIONS

This application is a continuation of U.S. application Ser. No. 18/507,713, filed Nov. 13, 2023, titled "Dynamic Computation of System Response Volume." U.S. application Ser. No. 18/507,713 is a continuation of U.S. application Ser. No. 17/986,241, filed Nov. 14, 2022, titled "Dynamic Computation of System Response Volume." U.S. application Ser. No. 17/986,241 is a continuation of U.S. application Ser. No. 17/391,404, filed Aug. 2, 2021, titled "Dynamic Computation of System Response Volume." U.S. application Ser. No. 17/391,404 is a continuation of U.S. application Ser. No. 16/600,949, filed Oct. 14, 2019, titled "Dynamic Computation of System Response Volume." U.S. application Ser. No. 16/600,949 is a continuation of U.S. application Ser. No. 16/102,153, filed Aug. 13, 2018, titled "Dynamic Computation of System Response Volume." U.S. application Ser. No. 16/102,153 is a continuation of U.S. application Ser. No. 15/699,982, filed Sep. 8, 2017, titled "Dynamic Computation of System Response Volume." The entire contents of the Ser. No. 15/699,982, 16/102,153, 16/600,949, 17/391,404, 17/986,241, and 18/507,713 applications are incorporated by reference herein.

This application relates to: (i) App. No. 62/298,410, titled "Default Playback Device(s)," filed Feb. 22, 2016; (ii) App. No. 62/298,418, titled "Audio Response Playback," filed Feb. 22, 2016; (iii) App. No. 62/298,433, titled "Room-corrected Voice Detection," filed Feb. 22, 2016; (iv) App. No. 62/298,439, titled "Content Mixing," filed Feb. 22, 2016; (v) App. No. 62/298,425, titled "Music Service Section," filed Feb. 22, 2016; (vi) App. No. 62/298,350, titled "Metadata exchange involving a networked playback system and a networked microphone system," filed Feb. 22, 2016; (vii) App. No. 62/298,388, titled "Handling of loss of pairing between networked devices," filed Feb. 22, 2016; (viii) App. No. 62/298,393, titled "Action based on User ID," filed Feb. 22, 2016; (ix) App. No. 62/132,350, titled "Voice Control of a Media Playback System," filed Mar. 12, 2015. The entire contents of the 62/298,410; 62/298,418; 62/298,433; 62/298,439; 62/298,425; 62/298,350; 62/298,388; 62/298,393; and 62/132,350 applications are incorporated herein by reference for all purposes.

FIELD OF THE DISCLOSURE

The disclosure is related to consumer goods and, more particularly, to methods, systems, products, features, services, and other elements directed to media playback and aspects thereof.

BACKGROUND

Options for accessing and listening to digital audio in an out-loud setting were limited until in 2003, when Sonos, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever-growing interest in digital media, there continues to be a need to develop consumer-accessible technologies to further enhance the listening experience.

SUMMARY

The present disclosure describes systems and methods for, among other things, determining and setting a system response volume for networked devices that generate and output system responses (e.g., a voice response or other system response) in response to voice commands. An example of a voice command is "What song is playing?" The system response may be, "Let it Be by the Beatles." In another example, the voice command may be "What movie is playing on my television?" And the system response might be, "Mothra versus Godzilla." In operation, the playback volume of audio content played by the system (i.e., the volume of music or audio associated with video programming) may be different than the system response volume (i.e., the volume for voice responses).

The present disclosure describes many examples for determining a system response volume for one or more networked devices under many different configuration scenarios. The disclosed examples describe functions performed by networked devices, voice enabled devices (VEDs), networked microphone devices (NMDs), audio playback devices (PBDs), and video playback devices (VPDs). As used herein, the term networked device is a class of devices that includes, but is not limited to VEDs, NMDs, PBDs, and VPDs.

VEDs are a similarly class of devices that includes but is not limited to NMDs, PBDs, and VPDs. For example, one type of VED is an NMD, which is a networked device comprising one or more processors, a network interface, and one or more microphones. Some NMDs may additionally include one or more speakers and perform media playback functions. Another type of VED is a PBD, which is a networked device comprising one or more processors, a network interface, and one or more speakers. Some PBDs may optionally include one or more microphones and perform the functions of an NMD. Yet another type of VED is a VPD, which is a networked device comprising one or more processors, a network interface, one or more speakers, and at least one video display. Some VPDs may optionally include one or more microphones and perform the functions of an NMD. PBDs and VPDs may be generally referred to as media playback devices.

Some examples include determining that a requirement exists to output a system response; and in response to determining that a requirement exists to output a system response, (i) setting a system response volume for a first speaker associated with the first networked device and (ii) outputting a system response at the set system response volume via the first speaker associated with the first networked device.

In some examples, these steps occur at the time (or substantially the same time) the system outputs a system response or in response to particular trigger events. This may be advantageous as it allows the system to assess the surrounding environment at the time the system outputs the system response or at the time of the particular trigger event. Specifically, this may reduce the likelihood of hearing a system response at an undesirably high or undesirably low system response volume attributed to a change in the surrounding environment between determining that a requirement exists to output a system response and the outputting of the system response.

Performing these steps at the time of the system output also allows the system to dynamically set the system response volume and output the system response because the system assesses the environment at the time of outputting the system response (or substantially right before outputting the system response), which accounts for rapid environmental change. For example, a user may be playing audio content through a PBD at a loud volume. Shortly after, the user may mute the audio content. Setting the system response volume at the time of outputting the system response ensures the system recognizes that user muted the audio content, which allows the system to set an appropriate system response volume.

In some examples, determining that a requirement exists to output a system response comprises receiving a voice input via a first microphone associated with the first networked device. In some examples, determining that a requirement exists to output a system response comprises activating a system alert or notification.

In some examples, the first networked device comprises the first speaker and the first microphone. In some examples, the first networked device comprises the first microphone and a second networked device comprises the first speaker. In some examples, the first networked device comprises the first speaker and a second networked device comprises the first microphone.

In some examples, the first networked device comprises the first speaker and a second networked device comprises a second speaker, and outputting the system response at the set system response volume via the first speaker associated with the first networked device comprises outputting the system response at the set system response volume via the first speaker associated with the first networked device in synchrony with the second networked device outputting the system response at the set system response volume via the second speaker.

In some examples, setting the system response volume for the first speaker associated with the first networked device comprises: (i) obtaining a sound pressure level (SPL) measurement via one or more microphones associated with the first networked device; and (ii) setting the system response volume based on the SPL measurement.

In some circumstances, the system may set the system response volume to a predetermined amount higher than the obtained SPL measurement. This may be beneficial in situations where there is ambient noise (e.g., conversations between people in the listening area and/or media content playing) because it may allow the user to hear the system response over the ambient noise.

In some examples, setting the system response volume based on the obtained sound pressure level measurement comprises setting the system response volume to between about 1 dB to about 6 dB higher than instantaneous and/or prior sound measurements (e.g., an SPL measurement and/or a measurement derived from an SPL measurement).

In some examples, setting the system response volume for the first speaker associated with the first networked device comprises: (i) accessing a previously-determined system response volume; and (ii) setting the system response volume to the previously-determined system response volume.

In some examples, the previously-determined system response volume was determined via steps comprising: (i) detecting a trigger event; and (ii) in response to detecting the trigger event, determining the system response volume. In some examples, the trigger event comprises, during media playback via the first speaker, changing a volume of the media playback, and determining the system response volume for the first speaker associated with the first networked device comprises: (i) obtaining an SPL measurement via one or more microphones associated with the first networked device; and (ii) setting the system response volume based on the SPL measurement. In some examples, changing a volume of the media playback comprises at least one of (i) increasing the volume of the media playback, (ii) decreasing the volume of the media playback, (iii) muting the media playback, and (iv) unmuting the media playback.

In some examples, the trigger event comprises a reconfiguration of the first networked device. In some examples, the reconfiguration comprises one of (i) configuring the first networked device from playing back media content as a standalone playback device to playing back media in synchrony with at least a second networked device and (ii) configuring the first networked device from playing back media in synchrony with at least a second networked device to playing back media as a standalone playback device.

In some examples, the trigger event comprises expiration of a timeframe, and wherein determining the system response volume for the first speaker associated with the first networked device comprises: (i) obtaining an SPL measurement via one or more microphones associated with the first networked device; and (ii) setting the system response volume based on the SPL measurement.

In some examples, the trigger event comprises at least one of (i) detection of motion in an area of the first networked device by a motion detector associated with the first networked device and (ii) detecting a change in light in an area of the first networked device by a light detector associated with the first networked device.

BRIEF DESCRIPTION OF THE DRAWINGS

Features, aspects, and advantages of the presently disclosed technology may be better understood with regard to the following description, appended claims, and accompanying drawings where:

Figure 1:
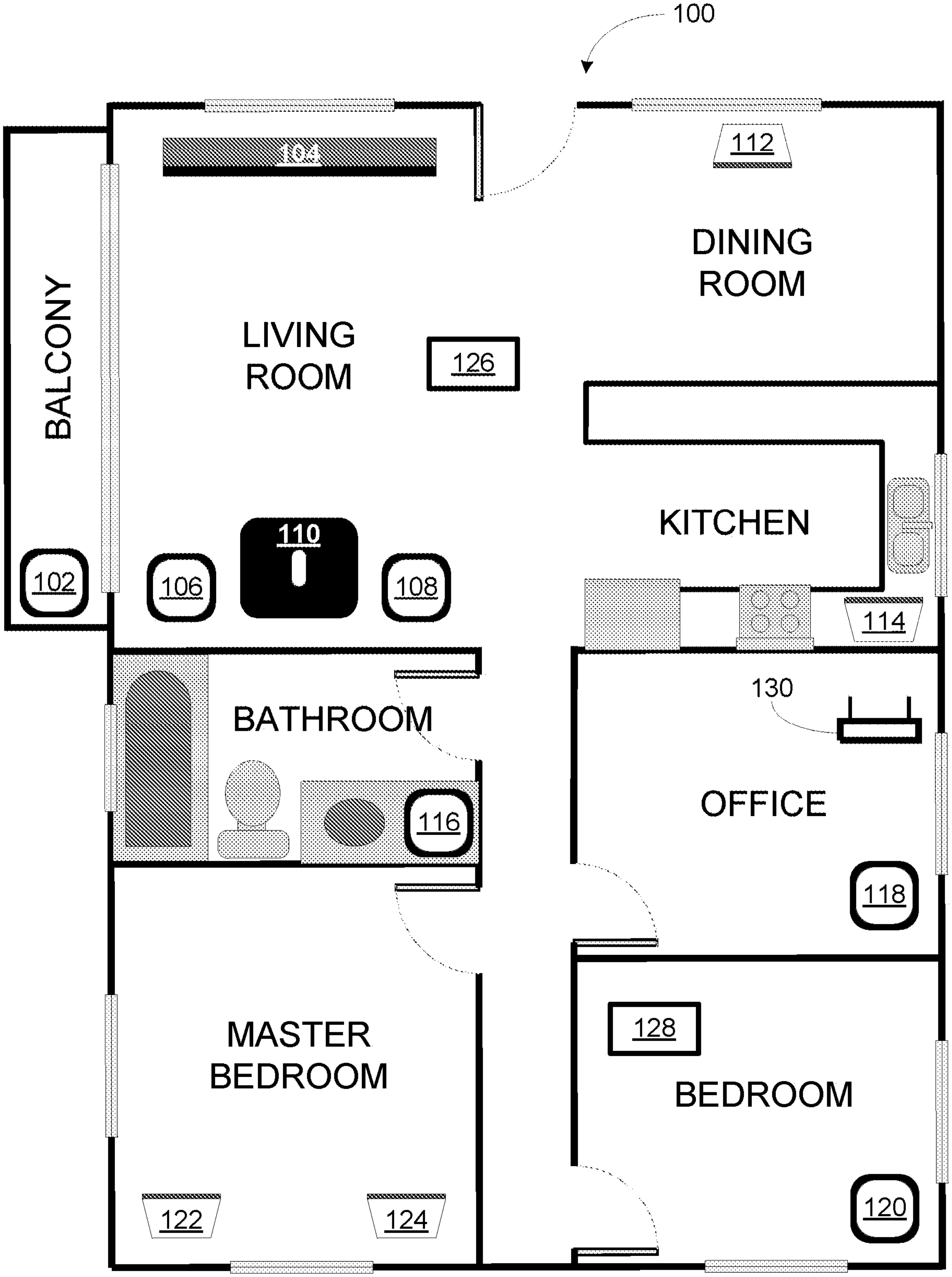
FIG. 1 shows an example media playback system configuration in which certain embodiments may be practiced.

The drawings are for the purpose of illustrating example embodiments, but it is understood that the inventions are not limited to the arrangements and instrumentalities shown in the drawings.

DETAILED DESCRIPTION

I. Overview

As mentioned above, this disclosure is related to functions performed by a class of networked device generally referred to herein as voice enabled devices ("VED"). One type of VED is a networked microphone device ("NMD"), which is a networked device comprising one or more processors, a network interface, and one or more microphones. Some NMDs may additionally include one or more speakers. Another type of VED is an audio playback device ("PBD"), which is a networked device comprising one or more processors, a network interface, one or more microphones, and one or more speakers. Yet another type of VED is a video playback device ("VPD"), which is a networked device comprising one or more processors, a network interface, one or more microphones, one or more speakers, and at least one video display. PBDs and VPDs may be generally referred to as media playback devices. As used herein, the term networked device includes but is not necessarily limited to VEDs, PBDs, NMDs, and PVDs, and the term VED includes but is not necessarily limited to PBDs, NMDs, and PVDs.

Each of the above-described VEDs implements at least some voice control functionality, which allows the VED (individually or perhaps in combination with one or more other computing devices) to act upon voice commands received via the microphone, thereby allowing a user to control the VED and perhaps other devices, too.

One aspect of the voice control functionality includes playing back a system response via one or more speakers. A system response as used herein includes a voice response or any other type of audible response (e.g., an alarm, a beep, a click, or other notification, response, or confirmatory sound) that a VED plays via one or more speakers associated with the VED in response to a voice command received via one or more microphones associated with the VED.

In some embodiments, a VED equipped with a microphone(s) and a speaker(s) may play a voice response (or other system response) via its speaker(s) in response to a voice command received via its microphone(s).

In other embodiments, a first VED equipped with a microphone(s) may command or otherwise cause a second VED equipped with at least a speaker(s) to play a voice response (or other system response) via the second VED's speaker(s) in response to a voice command received via the first VED's microphone(s).

In further embodiments, a first VED equipped with a microphone and a speaker(s) may command or otherwise cause a second VED equipped with at least a speaker(s) to play a voice response (or other system response) in synchrony with the first VED in response to a voice command received via the first VED's microphone(s).

As described above, some VEDs include one or more speakers, e.g., NMDs equipped with one or more speakers, PBDs equipped with one or more speakers, and VPDs equipped with one or more speakers. In operation, any of these VEDs equipped with one or more speakers can play both audio content (e.g., music, audio tracks associated with video, spoken word content, or other audio content) and a voice response (or other system response) via its one or more speakers. Any of these speaker-equipped VEDs may additionally play other general system responses (e.g., wake up alarms, timer notifications, and/or system notifications such as dings, beeps, clicks, or other notifications) via its one or more speakers, too.

In some cases, a VED plays back audio content and system responses at the same volume. For example, if a user is having a party and raises the volume of a PBD to better fill the room with music, the system response volume for the PBD is also raised. This can be undesirable because a system response may interrupt conversations or make the audio content less enjoyable. Further, if the audio content stops playing, the system response volume may still be set to a higher volume, which may be alarming to users in the room when the PBD (or other VED) outputs a system response in the future.

In some cases, a VED plays back a system response at a static volume that does not change, regardless of the volume of any audio content. In these cases, the volume of the system response may not be appropriate depending on the volume of the audio content. For example, if the user sets the audio playback at a high volume, the user may not hear a system response when it occurs. On the contrary, when there is no audio playback, the system response volume may be too loud or quiet depending on the location of the VED.

In some cases, a VED plays a system response in the form of an alarm that is emitted at a volume level different from a volume level of audio content. This may be useful when a user is using the alarm to wake up, and wants the alarm set at a specific volume. However, the user may need to repeatedly set (or reset) the system response volume throughout the day when using media playback system 700 for different daily events (e.g., setting additional alarms, issuing commands, etc.). If the user forgets to reset the system response volume to an appropriate volume for an alarm, the alarm may jar the user if the volume of the alarm is too loud, or fail to alert the user if the volume of the alarm is too quiet.

It may be desirable in some cases for a VED to dynamically set the volume of the system response based on surrounding circumstances, such as volume of audio playback and/or a sound pressure level ("SPL") measured in an area where the VED is located. For example, in some embodiments, a VED calculates a system response volume in response to determining (or detecting) a requirement to output a system response. In operation, upon determining (or detecting) a requirement to output a system response, the VED measures SPL via one or more microphones associated with the VED, and then sets the system response volume based at least in part on the measured SPL.

In some embodiments, a VED additionally or alternatively sets (or resets) a system response volume in response to conditions other than determining (or detecting) a requirement to output a system response. For example, in some embodiments, a VED may take a new SPL measurement and set (or reset) a system response volume based at least in part on the SPL measurement in response to receiving a new configuration and/or a command or instruction to reconfigure VED device settings, e.g., (i) receiving a new audio volume setting, (ii) receiving a command to group/un-ungroup the VED with one or more other VEDs in a synchrony group, stereo pair, bonded group of VEDs, or consolidated VED (described herein), and/or (iii) receiving other VED configuration settings.

In some embodiments, a VED may calculate an SPL and reset a system response volume at a number of times and in a number of different ways. The new SPL calculation may occur prior to a system response, on a pre-defined periodic basis, or a combination of both. The new SPL calculation may be performed by one or more of a plurality of VEDs in an audio playback configuration. The SPL measurement and/or calculation may be performed by (i) the VED outputting the system response, (ii) another VED or other networked device in the configuration that is not tasked with outputting the system response, and/or (iii) a group of two or more VEDs and/or networked devices.

In operation, calculating the system response volume may also be accomplished in a number of different ways. The system response volume may be determined and set by one or more networked devices in a set of networked devices configured to operate as an media playback system. For example, in a media playback system comprising one NMD and two PBDs, the NMD may take an SPL measurement and set the system response volume, and one or more of the PBDs may play the actual system response at the system response volume set by the NMD. In such media playback systems, any one of the one or more networked devices of the media playback system (individually or in combination with any one or more of the other networked devices of the media playback system) may perform any one or more of (i) measuring the SPL, (ii) setting the system response volume, and/or (iii) playing back the actual system response at the system response volume.

Further embodiments include tangible, non-transitory computer-readable media having stored thereon program instructions that, upon execution by a computing device, cause the computing device to perform the features and functions disclosed and described herein.

Some embodiments include a computing device comprising at least one processor, as well as data storage and program instructions. In operation, the program instructions are stored in the data storage, and upon execution by the at least one processor, cause the computing device (individually or in combination with other components or systems) to perform the features and functions disclosed and described herein.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130. In operation, any of the playback devices (PBDs) 102-124 may be voice-enabled devices (VEDs) as described earlier.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
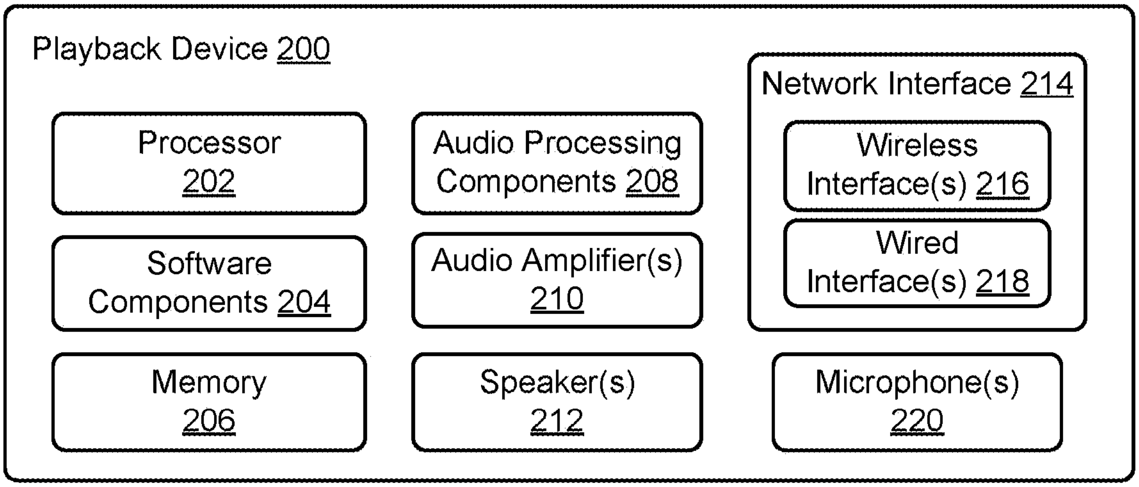
FIG. 2 shows a functional block diagram of an example playback device.

FIG. 2 shows a functional block diagram of an example playback device 200 that may be configured to be one or more of the playback devices 102-124 of the media playback system 100 of FIG. 1. As described above, a playback device (PBD) 200 is one type of voice-enabled device (VED).

The playback device 200 includes one or more processors 202, software components 204, memory 206, audio processing components 208, audio amplifier(s) 210, speaker(s) 212, a network interface 214 including wireless interface(s) 216 and wired interface(s) 218, and microphone(s) 220. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In some examples, the one or more processors 202 include one or more clock-driven computing components configured to process input data according to instructions stored in the memory 206. The memory 206 may be a tangible, non-transitory computer-readable medium configured to store instructions executable by the one or more processors 202. For instance, the memory 206 may be data storage that can be loaded with one or more of the software components 204 executable by the one or more processors 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the one or more processors 202. In one example, audio content may be processed and/or intentionally altered by the audio processing components

208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network, including but not limited to data to/from other VEDs (e.g., commands to perform an SPL measurement, SPL measurement data, commands to set a system response volume, and other data and/or commands to facilitate performance of the features and functions disclosed and described herein). As such, the playback device 200 may be configured to receive audio content over the data network from one or more other playback devices in communication with the playback device 200, network devices within a local area network, or audio content sources over a wide area network such as the Internet. The playback device 200 may transmit metadata to and/or receive metadata from other devices on the network, including but not limited to components of the networked microphone system disclosed and described herein. In one example, the audio content and other signals (e.g., metadata and other signals) transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

The microphone(s) 220 may be arranged to detect sound in the environment of the playback device 200. For instance, the microphone(s) may be mounted on an exterior wall of a housing of the playback device. The microphone(s) may be any type of microphone now known or later developed such as a condenser microphone, electret condenser microphone, or a dynamic microphone. The microphone(s) may be sensitive to a portion of the frequency range of the speaker(s) 220. One or more of the speaker(s) 220 may operate in reverse as the microphone(s) 220. In some aspects, the playback device 200 might not have microphone(s) 220.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices", "bonded group", or "stereo pair") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, Sonos, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the Sonos product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices and/or other VEDs. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone may be combined into a zone group for a dinner party such that playback devices 112 and 114 may render (e.g., play back) audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
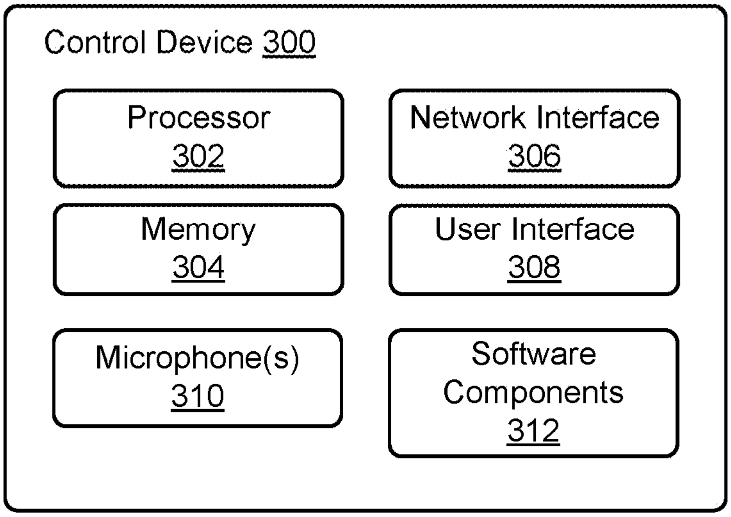
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include one or more processors 302, memory 304, a network interface 306, a user interface 308, microphone(s) 310, and software components 312. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The one or more processors 302 may be configured to perform functions relevant to facilitating user access, control, and configuration of the media playback system 100. The memory 304 may be data storage that can be loaded with one or more of the software components executable by the one or more processors 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 3G, 4G, or 5G mobile communication standards, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Control device 300 may include microphone(s) 310. Microphone(s) 310 may be arranged to detect sound in the environment of the control device 300. Microphone(s) 310 may be any type of microphone now known or later developed such as a condenser microphone, electret condenser microphone, or a dynamic microphone. The microphone(s)

may be sensitive to a portion of a frequency range. Two or more microphones 310 may be arranged to capture location information of an audio source (e.g., voice, audible sound) and/or to assist in filtering background noise.

Figure 4:
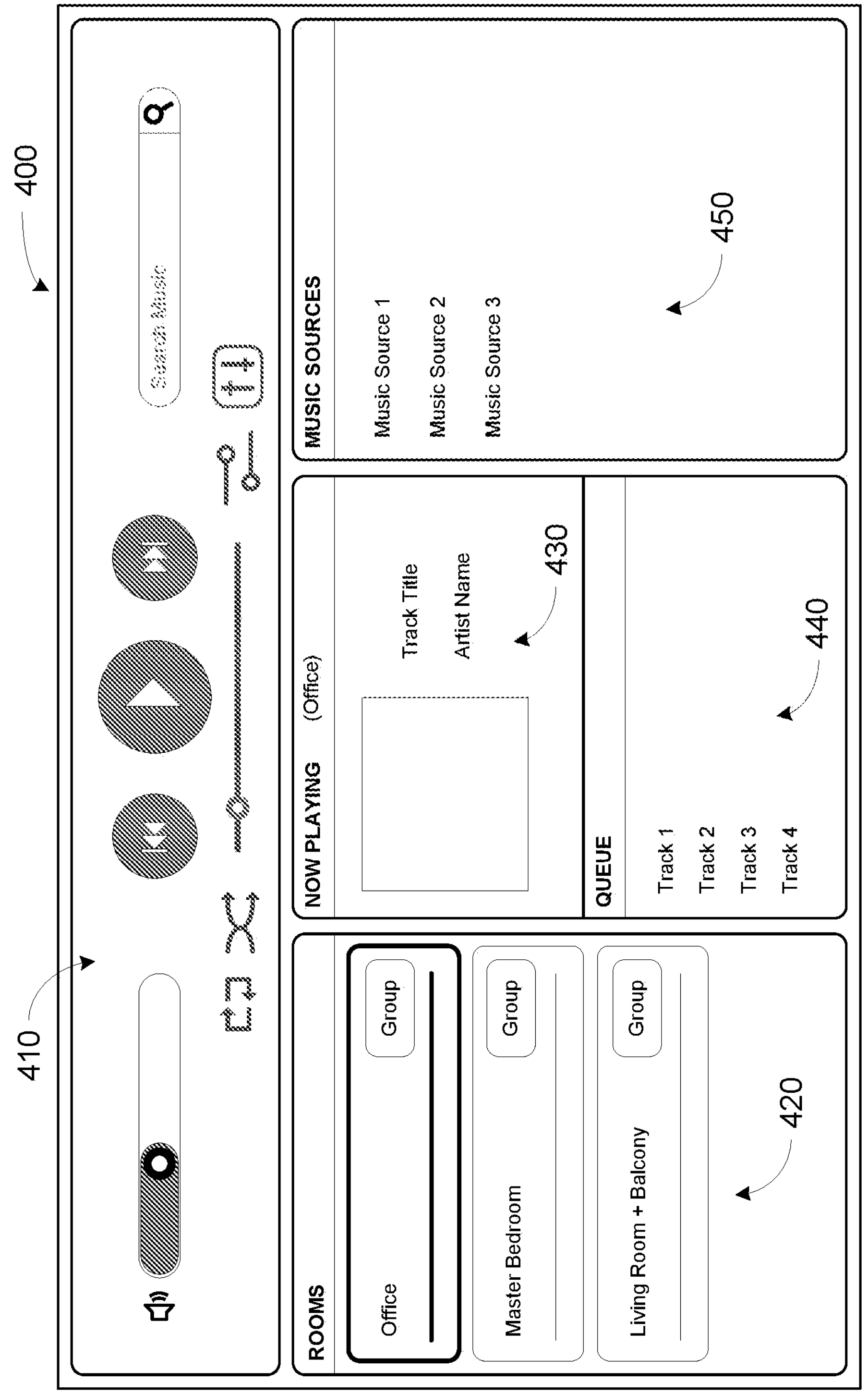
FIG. 4 shows an example controller interface.

The user interface 308 of the control device 300 may be configured to facilitate user access and control of the media playback system 100, by providing a controller interface such as the example controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Plurality of Networked Devices

Figure 5:
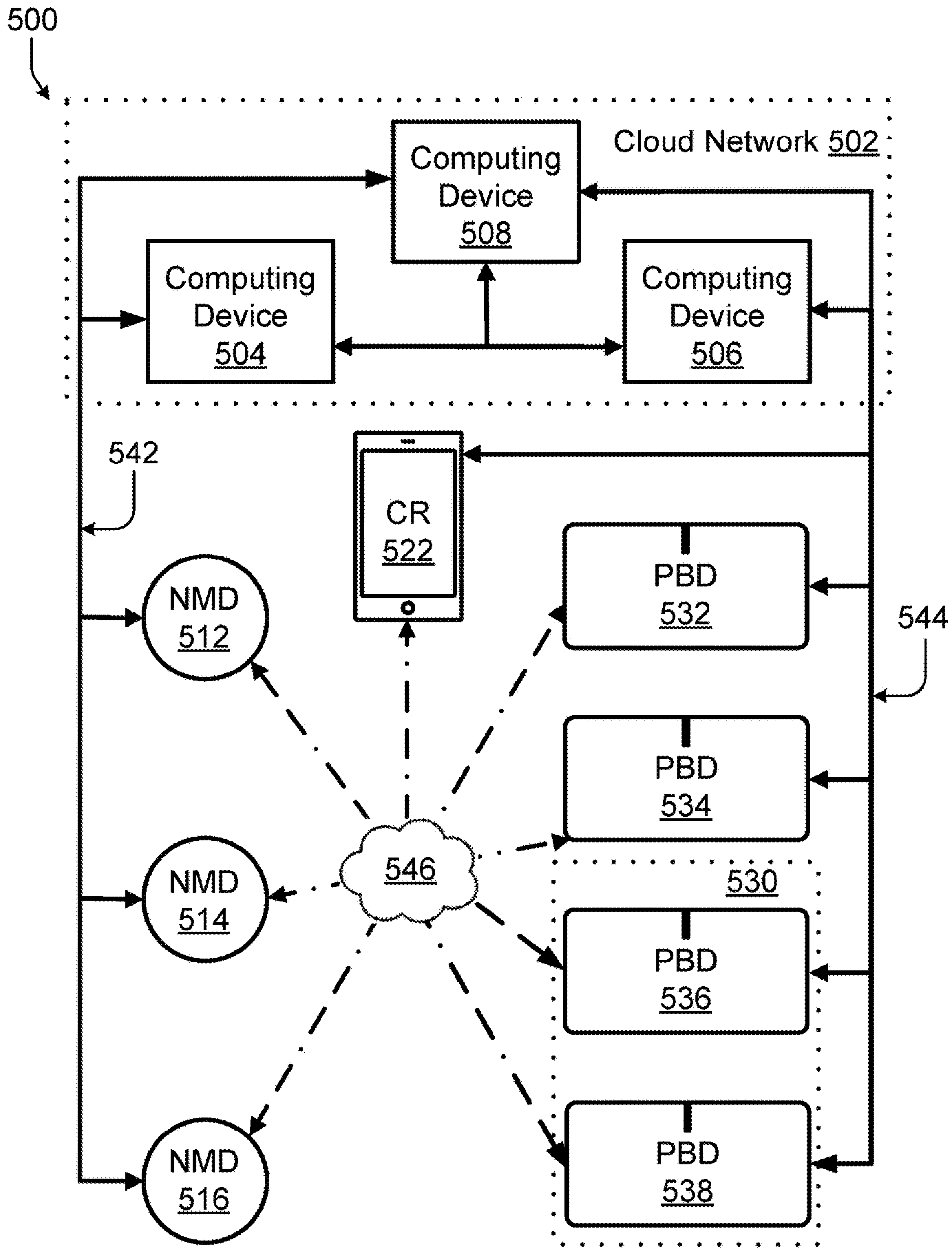
FIG. 5 shows an example plurality of network devices.

FIG. 5 shows an example plurality of networked devices 500 that can be configured to provide an audio playback experience with voice control. One having ordinary skill in the art will appreciate that the devices shown in FIG. 5 are for illustrative purposes only, and variations including different and/or additional (or fewer) devices may be possible. As shown, the plurality of networked devices 500 includes computing devices 504, 506, and 508; network microphone devices (NMDs) 512, 514, and 516; playback devices (PBDs) 532, 534, 536, and 538; and a controller device (CR) 522. As described previously, any one or more (or all) of the NMDs 512-16, PBDs 532-38, and/or CR 522 may be voice-enabled devices (VEDs).

Each of the plurality of networked devices 500 are network-capable devices that can establish communication with one or more other devices in the plurality of devices according to one or more network protocols, such as NFC, Bluetooth™, Ethernet, and IEEE 802.11, among other examples, over one or more types of networks, such as wide area networks (WAN), local area networks (LAN), and personal area networks (PAN), among other possibilities.

As shown, the computing devices 504, 506, and 508 are part of a cloud network 502. The cloud network 502 may include additional computing devices (not shown). In one example, the computing devices 504, 506, and 508 may be different servers. In another example, two or more of the computing devices 504, 506, and 508 may be modules of a single server. Analogously, each of the computing device 504, 506, and 508 may include one or more modules or servers. For ease of illustration purposes herein, each of the computing devices 504, 506, and 508 may be configured to perform particular functions within the cloud network 502. For instance, computing device 508 may be a source of audio content for a streaming music service.

As shown, the computing device 504 may be configured to interface with NMDs 512, 514, and 516 via communication path 542. NMDs 512, 514, and 516 may be components of one or more “Smart Home” systems. In one case, NMDs 512, 514, and 516 may be physically distributed throughout a household, similar to the distribution of devices shown in FIG. 1. In another case, two or more of the NMDs 512, 514, and 516 may be physically positioned within relative close proximity of one another. Communication path 542 may comprise one or more types of networks, such as a WAN including the Internet, LAN, and/or PAN, among other possibilities.

In one example, one or more of the NMDs 512, 514, and 516 are devices configured primarily for audio detection. In another example, one or more of the NMDs 512, 514, and 516 may be components of devices having various primary utilities. For instance, as discussed above in connection to FIGS. 2 and 3, one or more of NMDs 512, 514, and 516 may be (or at least may include or be a component of) the microphone(s) 220 of playback device 200 or the microphone(s) 310 of network device 300. Further, in some cases, one or more of NMDs 512, 514, and 516 may be (or at least may include or be a component of) the playback device 200 or network device 300. In an example, one or more of NMDs 512, 514, and/or 516 may include multiple microphones arranged in a microphone array. In some embodiments, one or more of NMDs 512, 514, and/or 516 may be a microphone on a mobile computing device (e.g., a smartphone, tablet, or other computing device).

As shown, the computing device 506 is configured to interface with CR 522 and PBDs 532, 534, 536, and 538 via communication path 544. In one example, CR 522 may be a network device such as the network device 200 of FIG. 2. Accordingly, CR 522 may be configured to provide the controller interface 400 of FIG. 4. Similarly, PBDs 532, 534, 536, and 538 may be playback devices such as the playback device 300 of FIG. 3. As such, PBDs 532, 534, 536, and 538 may be physically distributed throughout a household as shown in FIG. 1. For illustration purposes, PBDs 536 and 538 are shown as members of a bonded zone 530, while PBDs 532 and 534 are members of their own respective zones. As described above, the PBDs 532, 534, 536, and 538 may be dynamically bonded, grouped, unbonded, and ungrouped. Communication path 544 may comprise one or more types of networks, such as a WAN including the Internet, LAN, and/or PAN, among other possibilities.

In one example, as with NMDs 512, 514, and 516, CR 522 and PBDs 532, 534, 536, and 538 may also be components of one or more "Smart Home" systems. In one case, PBDs 532, 534, 536, and 538 may be distributed throughout the same household as the NMDs 512, 514, and 516. Further, as suggested above, one or more of PBDs 532, 534, 536, and 538 may be one or more of NMDs 512, 514, and 516. For example, any one or more (or perhaps all) of NMDs 512-16, PBDs 532-38, and/or CR 522 may be voice-enabled devices (VEDs).

The NMDs 512, 514, and 516 may be part of a local area network, and the communication path 542 may include an access point that links the local area network of the NMDs 512, 514, and 516 to the computing device 504 over a WAN (communication path not shown). Likewise, each of the NMDs 512, 514, and 516 may communicate with each other via such an access point.

Similarly, CR 522 and PBDs 532, 534, 536, and 538 may be part of a local area network and/or a local playback network as discussed in previous sections, and the communication path 544 may include an access point that links the local area network and/or local playback network of CR 522 and PBDs 532, 534, 536, and 538 to the computing device 506 over a WAN. As such, each of the CR 522 and PBDs 532, 534, 536, and 538 may also communicate with each over such an access point.

In one example, communication paths 542 and 544 may comprise the same access point. In an example, each of the NMDs 512, 514, and 516, CR 522, and PBDs 532, 534, 536, and 538 may access the cloud network 502 via the same access point for a household.

As shown in FIG. 5, each of the NMDs 512, 514, and 516, CR 522, and PBDs 532, 534, 536, and 538 may also directly communicate with one or more of the other devices via communication means 546. Communication means 546 as described herein may involve and/or include one or more forms of communication between the devices, according to one or more network protocols, over one or more types of networks, and/or may involve communication via one or more other network devices. For instance, communication means 546 may include one or more of for example, Bluetooth™ (IEEE 802.15), NFC, Wireless direct, and/or Proprietary wireless, among other possibilities.

In one example, CR 522 may communicate with NMD 512 over Bluetooth™, and communicate with PBD 534 over another local area network. In another example, NMD 514 may communicate with CR 522 over another local area network, and communicate with PBD 536 over Bluetooth™. In a further example, each of the PBDs 532, 534, 536, and 538 may communicate with each other according to a spanning tree protocol over a local playback network, while each communicating with CR 522 over a local area network, different from the local playback network. Other examples are also possible.

In some cases, communication means between the NMDs 512, 514, and 516, CR 522, and PBDs 532, 534, 536, and 538 may be different (or perhaps change) depending on types of communication requirements between the devices, network conditions, and/or latency demands. For instance, communication means 546 may be used when NMD 516 is first introduced to the household with the PBDs 532, 534, 536, and 538. In one case, the NMD 516 may transmit identification information corresponding to the NMD 516 to PBD 538 via NFC, and PBD 538 may in response, transmit local area network information to NMD 516 via NFC (or some other form of communication). However, once NMD 516 has been configured within the household, communication means between NMD 516 and PBD 538 may change. For instance, NMD 516 may subsequently communicate with PBD 538 via communication path 542, the cloud network 502, and communication path 544. In another example, the NMDs and PBDs may never communicate via local communications means 546. In a further example, the NMDs and PBDs may communicate primarily via local communications means 546. Other examples are also possible.

In an illustrative example, NMDs 512, 514, and 516 may be configured to receive voice inputs to control PBDs 532, 534, 536, and 538. The available control commands may include any media playback system controls previously discussed, such as playback volume control, playback transport controls, music source selection, and grouping, among other possibilities. In one instance, NMD 512 may receive a voice input to control one or more of the PBDs 532, 534, 536, and 538. In response to receiving the voice input, NMD 512 may transmit via communication path 542, the voice input to computing device 504 for processing. In one example, the computing device 504 may convert the voice input to an equivalent text command, and parse the text command to identify a command. Computing device 504 may then subsequently transmit the text command to the computing device 506, and computing device 506 in turn may then control one or more of PBDs 532-538 to execute the command. In another example, the computing device 504 may convert the voice input to an equivalent text command, and then subsequently transmit the text command to the computing device 506. The computing device 506 may then parse the text command to identify one or more playback commands, and then computing device 506 may additionally control one or more of PBDs 532-538 to execute the command.

For instance, if the text command is "Play 'Track 1' by 'Artist 1' from 'Streaming Service 1' in 'Zone 1'," The computing device 506 may identify (i) a URL for "Track 1" by "Artist 1" available from "Streaming Service 1," and (ii) at least one playback device in "Zone 1." In this example, the URL for "Track 1" by "Artist 1" from "Streaming Service 1" may be a URL pointing to computing device 508, and "Zone 1" may be the bonded zone 530. As such, upon identifying the URL and one or both of PBDs 536 and 538, the computing device 506 may transmit via communication path 544 to one or both of PBDs 536 and 538, the identified URL for playback. One or both of PBDs 536 and 538 may responsively retrieve audio content from the computing device 508 according to the received URL, and begin playing "Track 1" by "Artist 1" from "Streaming Service 1."

One having ordinary skill in the art will appreciate that the above is just one illustrative example, and that other implementations are also possible. In one case, operations performed by one or more of the plurality of network devices 500, as described above, may be performed by one or more other devices in the plurality of network devices 500. For instance, the conversion from voice input to the text command may be alternatively, partially, or wholly performed by another device or devices, such as CR 522, NMD 512, computing device 506, PBD 536, and/or PBD 538. Analogously, the identification of the URL may be alternatively, partially, or wholly performed by another device or devices, such as NMD 512, computing device 504, PBD 536, and/or PBD 538.

f. Example Network Microphone Device

Figure 6:
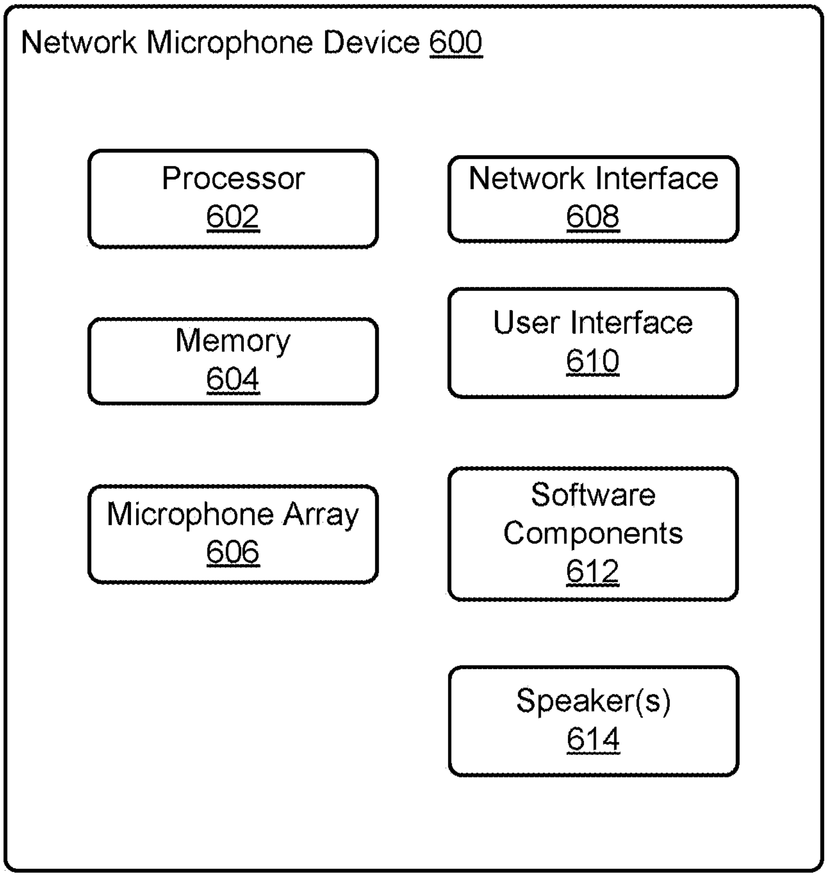
FIG. 6 shows a function block diagram of an example network microphone device.

FIG. 6 shows a function block diagram of an example network microphone device 600 that may be configured to be one or more of NMDs 512, 514, and 516 of FIG. 5, and/or any of the VEDs disclosed and described herein. As shown, the network microphone device 600 includes one or more processors 602, tangible, non-transitory computer-readable memory 604, a microphone array 606 (e.g., one or more microphones), a network interface 608, a user interface 610, software components 612, and speaker(s) 614. One having ordinary skill in the art will appreciate that other network microphone device configurations and arrangements are also possible. For instance, network microphone devices may alternatively exclude the speaker(s) 614 or have a single microphone instead of microphone array 606.

The one or more processors 602 may include one or more processors and/or controllers, which may take the form of a general or special-purpose processor or controller. For instance, the one or more processors 602 may include microprocessors, microcontrollers, application-specific integrated circuits, digital signal processors, and the like. The tangible, non-transitory computer-readable memory 604 may be data storage that can be loaded with one or more of the software components executable by the one or more processors 602 to perform those functions. Accordingly, memory 604 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, and/or an optical-storage device, among other possibilities.

The microphone array 606 may be a plurality of microphones arranged to detect sound in the environment of the network microphone device 600. Microphone array 606 may include any type of microphone now known or later developed such as a condenser microphone, electret condenser microphone, or a dynamic microphone, among other possibilities. In one example, the microphone array may be arranged to detect audio from one or more directions relative to the network microphone device. The microphone array 606 may be sensitive to a portion of a frequency range. In one example, a first subset of the microphone array 606 may be sensitive to a first frequency range, while a second subset of the microphone array may be sensitive to a second frequency range. The microphone array 606 may further be arranged to capture location information of an audio source (e.g., voice, audible sound) and/or to assist in filtering background noise. Notably, in some embodiments the microphone array may consist of only a single microphone, rather than a plurality of microphones.

The network interface 608 may be configured to facilitate wireless and/or wired communication between various network devices, such as, in reference to FIG. 5, CR 522, PBDs 532-538, computing devices 504-508 in cloud network 502, and other network microphone devices, among other possibilities. As such, network interface 608 may take any suitable form for carrying out these functions, examples of which may include an Ethernet interface, a serial bus interface (e.g., FireWire, USB 2.0, etc.), a chipset and antenna adapted to facilitate wireless communication, and/or any other interface that provides for wired and/or wireless communication. In one example, the network interface 608 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on).

The user interface 610 of the network microphone device 600 may be configured to facilitate user interactions with the network microphone device. In one example, the user interface 610 may include one or more of physical buttons, graphical interfaces provided on touch sensitive screen(s) and/or surface(s), among other possibilities, for a user to directly provide input to the network microphone device 600. The user interface 610 may further include one or more of lights and the speaker(s) 614 to provide visual and/or audio feedback to a user. In one example, the network microphone device 600 may further be configured to playback audio content via the speaker(s) 614.

III. Example Systems and Methods

It may be desirable in some instances for a voice-enabled device (VED) to dynamically calculate and set a system response volume. In some circumstances, audio playback systems might set a system response volume based on the environment generally (e.g., on initialization). This method might not account for a subsequent change in sound of the room, resulting in a system response that is too loud or too quiet for the environment at the point in time when the system issues a system response. To address this potential problem, in some examples, the VED may dynamically calculate and set the system response volume at the time of playing the system response (or just prior to playing the system response). This may be beneficial in circumstances where the sound environment of a room is volatile. For instance, a user may play audio content through a VED at a loud volume while muting the audio content sporadically to receive phone calls. The VED may assess the environment to calculate and set a system response volume while outputting the system response (or right before outputting the system response). This allows the system to output a system response at an appropriate system response volume for the environment.

It may be further desirable for one or more voice-enabled devices (VEDs) in a system of multiple networked devices to calculate and set a system response volume for the system of multiple networked devices. The one or more VEDs in the system of multiple networked devices may calculate and set a system response volume for the system of multiple networked devices (i) locally, via a local-area-network (LAN), and/or (ii) remotely, via a cloud server. For example, one of the one or more VEDs in a system may calculate and set the system response volume, then send the system response volume to the other VEDs in the system via a LAN. In another example, one of the one or more VEDs in the system may calculate and set the system response volume, then send the system response to a cloud server. In this example, the other VEDs in the system may retrieve the system response volume from the cloud server and set the system response volume accordingly. In another example embodiment, one or more VEDs may send a sample of the ambient sound (measured in the room where the system of multiple networked devices is located) to a cloud computing system, and in turn, the cloud computing system may set a system response volume for the system of multiple networked devices. In such example embodiments, the cloud computing system may set the system response volume for each VED in the system of multiple networked devices to the same volume level, or the cloud computing system may set the system response volume for individual VEDs in the system of multiple networked devices to two or more different volume levels.

As described previously, a voice enabled device (VED) may be a playback device (PBD), a networked microphone device (NMD), a video playback device (VPD), or any other networked device equipped with one or more microphones and/or speakers. In operation, VEDs equipped with one or more speakers can play both audio content (e.g., music, audio tracks associated with video, spoken word content, or other audio content) and a voice response (or other system response) via the one or more speakers. A VED may additionally play other general system responses (e.g., wake up alarms, timer notifications, and/or system notifications such as dings, beeps, clicks, or other notifications) via the one or more speakers, too.

As described earlier, some conventional networked devices set their system response volume (i) to be the same as audio content volume, (ii) at a static volume, and/or (iii) based on a manual input setting from the user.

In many circumstances, however, a VED's or other networked device's system response volume is not an appropriate volume for the room, situation, or user. For example, if the VED or other networked device is located in a large room, the system response volume may not be loud enough to alert a user standing across the room from the networked device. In another example, if the user is hard of hearing, the system response volume may not be loud enough to alert the user. In yet another example, if audio content is not playing in the room, the system response volume may be too loud and alarm the user.

Therefore, it may be desirable for a VED or other networked device to set a system response volume based on factors including, but not limited to, (i) the size of the room, (ii) various sound pressure level ("SPL") measurements, (iii) the audio playback volume, (iv) the loudness of the audio playback content, (v) the number of networked devices in a system, and (vi) the configuration of networked devices in a system.

Figure 7:
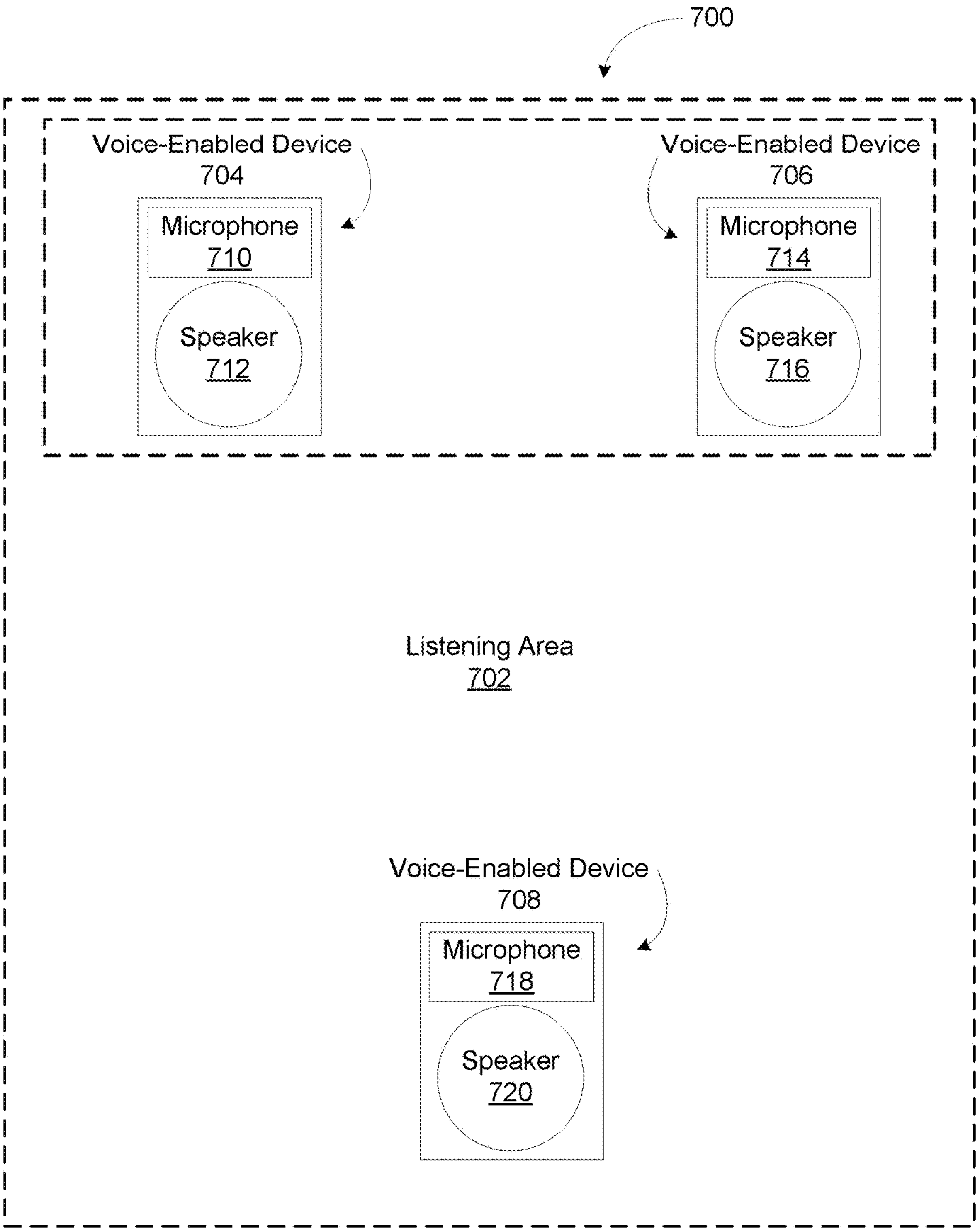
FIG. 7 shows an example media playback system configuration in which certain embodiments may be practiced.

FIG. 7 shows a media playback system 700, according to example embodiments. Media playback system 700 includes VEDs 704, 706, and 708. VED 704 comprises microphone 710 and speaker 712. VED 706 comprises microphone 714 and speaker 716. And VED 708 comprises microphone 718 and speaker 720. In operation, VEDs 704, 706, and 708 are configured to play audio content and output system responses in listening area 702.

Each of VEDs 704, 706, and 708 may be any of a networked microphone device (NMD), audio playback device (PBD), video playback device (VPD), or any other networked device comprising one or more microphones and one or more speakers. VEDs 704, 706, and 708 may operate independently of one another, be grouped to operate in a stereo pair, and/or be grouped to play music or other audio content in synchrony with one another.

In operation, VEDs 704, 706, and 708 are configured to receive voice commands from a user via their microphones, and output audio content and system responses via their speakers. In some alternative embodiments (not shown), one or more of the VEDs 704, 706, and 708 may include both a microphone(s) and a speaker(s), one or more of the one or more VEDs 704, 706, and 708 may include a microphone(s) but not a speaker(s), and one or more of the VEDs 704, 706, and 708 may include a speaker(s) but not a microphone(s).

In some embodiments, VEDs 704, 706, and 708 may be configured to operate and interact with one another in a similar manner as NMDs 512, 514, and 516 and/or PBDs 532, 534, 536, and 538 operate and interact with one another, as described with respect to FIG. 5.

a. Example System Response Volume Calculation

In some embodiments, each or all of VEDs 704, 706, and 708 may calculate and set a system response volume (SRV) in response to a determination that a requirement exists to output a system response. Specifically, VEDs 704, 706, and/or 708 may (i) calculate and set its own SRV independently of one another, and/or (ii) calculate and set an SRV for all of VEDs 704, 706, and 708. Alternatively, one of the VEDs 704, 706, or 708 may be designated to provide system responses, and the designated VED (or perhaps a different VED or another computing system) may calculate and set the SRV for the designated VED.

In one example, VED 704 may determine that a requirement exists to output a system response and then calculate and/or set the system response volume for media playback system 700. VED 704 may calculate a desired system response volume (i) prior to an output of a system response, (ii) responsive to a new SPL computation, (iii) responsive to a new system configuration, (iv) responsive to a new audio volume setting, and/or (v) responsive to a manual configuration of the SRV.

In the embodiments described herein, VED 704 is used as the networked device determining whether a requirement exists to output a system response and calculating a new system response volume. In operation, any of VEDs 704, 706, and 708 (individually or in combination with one or more other connected networked devices) may (i) determine that a requirement exists to output a system response and (ii) calculate and/or set a system response volume for an individual VED and/or for the entire audio playback system 700. VED 704 is simply used as an example device for describing the functions of determining whether the requirement exists and calculating a new system response volume in response to the determination. Moreover, in scenarios when two or more of the VEDs 704, 706, and 708 cooperate, interoperate, or otherwise work together to determine whether a requirement exists to output a system response and calculate and/or set a new system response volume, VEDs 704, 706, and 708 can be configured to communicate with one another, via wireless and/or wired networking functionality, any one or more of (i) a determination that a requirement exists to output a system response, (ii) data to make a determination as to whether a requirement exists to output a system response, (iii) a calculated system response volume setting, (iv) data to calculate a system response volume, and/or (v) commands to set a system response volume.

In some embodiments, VED 704 determines that a requirement exists to output a system response and then calculates a system response volume prior to outputting the system response. In some embodiments, after determining that a requirement exists to output a system response, VED 704 uses microphone 710 to record sound in the area around VED 704. VED 704 then processes the recorded sound to determine an SPL of the sound in the area around VED 704.

The requirement to output a system response may include a requirement for one or more of VEDs 704, 706, and/or 708 to (i) activate an alarm, (ii) issue a notification, and/or (iii) respond to a voice command received from a user.

For example, in some embodiments, if a user speaks a voice command in the area of VED 704, VED 704 (*i*) determines that a requirement exists to output a system response (i.e., a response to the voice command), and then (ii) calculates an appropriate system response volume before outputting its response. In this example, if the user speaks a command in a quiet room that the requires a voice response (or other system response) from media playback system 700, VED 704 determines that a requirement exists to output a system response, calculates the SPL in the room, and then sets the system response volume based on the SPL calculation. Because the room is quiet, setting the system response volume based on the SPL calculation may include reducing the system response volume from its previous volume level.

In operation, the SPL calculation may be based on sound measurements obtained from any one or more of microphones 710, 714, and/or 718, of VEDs 704, 706, and 708, respectively. VEDs 704, 706, and 708 are configured to (i) receive various sound measurements and/or calculations or SPL calculations from the other VEDs in the configuration, and (ii) send system response volume setting to the other VEDs in the configuration. For example, VED 704 may receive various sound measurements from microphone 714 of VED 706 and microphone 718 of VED 708. VED 704 may use these measurements to calculate the SPL of listening area 702 and set an appropriate system response volume based on the calculated SPL. VED 704 may then send the appropriate system response volume to VEDs 706 and 708 via a network interface (e.g., over the LAN and/or via a cloud server) for implementation by VEDs 706 and 708. In another example, VEDs 704, 706, and/or 708 may all calculate a SPL independently of one another. In this example, VED 704 may receive the SPL calculations from VEDs 706 and 708 and use the SPL calculations to set a system response volume. VED 704 may then send the system response volume to VEDs 706 and 708 via a network interface for implementation by VEDs 706 and 708.

In another example, if the user speaks a command in a noisy room that requires a voice response (or other system response) from media playback system 700, VED 704 determines that a requirement exists to output a system response, calculates the SPL in the room, and then sets the system response volume based on the SPL calculation. As described above, the SPL calculation may be based on sound measurements obtained from any one or more of microphones 710, 714, and/or 718, of VEDs 704, 706, and 708, respectively. Because the room is loud, setting the system response volume based on the SPL calculation may include increasing the system response volume from its previous volume level.

In some embodiments, the amount VED 704 raises or lowers the system response volume in response to determining that a requirement exists to output a system response may depend on hearing characteristics of the user. The hearing characteristics may be based on (i) one or more user account settings for or (ii) a manual input from the user. The user account settings may contain settings related to a user's hearing ability (i.e., normal hearing or hearing impaired (and perhaps a degree of hearing impairment)). Thus, for hearing impaired users, VED 704 in some embodiments may increase a system volume more in a loud environment and/or decrease a system volume less in a quiet environment, as compared to the amount of increase and/or decrease for a non-hearing-impaired user. For example, for a hearing impaired user, the VED 704 may set the system response volume to a level that is +3 decibels ("dBs") higher than a volume level the VED 704 would have set the system response volume to for a non-hearing-impaired user.

In some embodiments, setting the system response volume based on the SPL calculation, and then outputting the system response at the set system response volume includes "un-muting" one or more VEDs. For example, if all VEDs 704, 706, and 708 are muted when VED 704 determines that a requirement exists to output a voice response (or other system response), then setting the system response volume includes (i) un-muting one or more of VED 704, 706, and 708, and setting the system response volume, and (ii) outputting the voice response (or other system response) at the set system response volume. Some embodiments may additionally include re-muting the previously un-muted VED. Still further embodiments, may distinguish between muting playback of audio content from playing back a voice response, so that the VED can playback a voice response from one or more speakers even though audio playback is muted.

In some circumstances, the system response volume is set based on the audio playback volume of VED 704 when VED 704 is playing media content. This may cause a problem if, after the user mutes the audio playback volume of VED 704, VED 704 outputs a system response, because the system response volume is still based on the audio playback volume of VED 704 when VED 704 was playing media content. To overcome this problem, some embodiments involve VED 704, when VED 704 is in a muted state, limiting the system response volume to a predetermined threshold value. The threshold value may be a value ranging from 1-10 (other ranges could be used, too), depending on the placement and configuration of media playback system 700. For example, a user may be listening to media content via VED 704 at an audio playback volume of 8. If the user mutes the audio playback volume of VED 704, VED may limit the system response volume to an appropriate threshold value (i.e., some value less than 8). Then, if VED 704 outputs a system response, the system response volume will be appropriate and less likely to startle the user.

In some embodiments, the system response volume is set based on the loudness of the audio playback content when VED 704 is playing media content. This may be beneficial because it allows VED 704 to set the system response volume relative to the volume of the audio content played back by VED 704. For example, a user may be playing media content through VED 704 that features sporadic bursts of sound, followed by longer lulls. VED 704 may monitor the loudness of the audio playback content via microphone 710 to obtain an up-to-date loudness measurement at the time VED 704 outputs a system response. VED 704 then sets an appropriate system response volume based on the loudness of the audio playback content. For additional discussion related to setting an output volume based on the volume of audio content, see Pat. App. No. 62/298,439 paragraphs 100-103, the contents of which are incorporated by reference herein.

In some embodiments, VED 704 may set the system response volume based on the loudness of the audio playback content in addition to an instantaneous SPL measurement prior to outputting a system response. For example, VED 704 may monitor the loudness of the audio playback content via microphone 710 and, after determining a requirement exists to output a system response, VED 704 may obtain an instantaneous SPL measurement. VED 704 may then set the system response volume at an appropriate value based on the loudness of the audio playback content and the instantaneous SPL measurement. This may be beneficial because it allows VED 704 to account for the loudness of the audio played back by VED 704 in addition to other sources of sound and/or noise in listening area 702.

Alternatively, in some embodiments, rather than calculating an SPL just before outputting a system response, or one or more VEDs in media playback system 700 may instead be configured to periodically (or perhaps semi-periodically or some other scheduled basis) calculate an SPL in the listening area 702, and in response to calculating the new SPL in the listening area 702, setting a system response volume based at least in part on the calculated SPL. In some embodiments, one or more of the VEDs may be configured to both (i) calculate an SPL periodically, semi-periodically, or on some other scheduled basis, and then set the system response volume based at least in part on the calculated SPL and (ii) calculate an SPL in response to determining that a VED needs to output a voice response (or some other system response), and then set the system response volume based at least in part on the calculated SPL.

In some scenarios where VEDs 704, 706, and/or 708 are playing loud and/or sporadic audio content via their respective speakers, an instantaneous SPL measurement obtained by the one or more of VEDs 704, 706, and/or 708 to assess the SPL may not accurately reflect the average SPL of listening area 702. For example, if VED 704 takes an SPL measurement during a period of a song that is uncharacteristically loud, the SPL measurement obtained during that loud moment may cause VED 704 to set a system response volume that is too loud for listening area 702. In some embodiments, VEDs 704, 706, and/or 708 may counteract this problem by (i) lowering the audio playback volume of the VED or VEDs playing the audio content while taking the SPL measurement, and/or (ii) taking an SPL measurement during a lull in the audio playback or during a song transition. This may allow VEDs 704, 706, and/or 708 to better assess other sound sources in listening area 702 that might otherwise be drowned out by the audio playback volume.

However, in some embodiments, VEDs 704, 706, and/or 708 may use the unaltered (e.g., not lowered) audio playback volume when setting a system response volume to provide a system response volume in accordance to the audio playback volume.

In other scenarios, all of VEDs 704, 706, and 708 may be playing audio content, again complicating the setting of the system response volume based on an SPL measurement. One or more of VEDs 704, 706, and/or 708 may counteract this problem by lowering the audio playback volume of one or more of VEDs 704, 706, and/or 708 to a suitable volume for taking an SPL measurement. The specific VEDs chosen to have their volume lowered may depend on the configuration of the VEDs 704, 706, and/or 708 in media playback system 700.

For example, VEDs 704, 706, and 708 may be playing audio content in synchrony with each another within listening area 702 as depicted in FIG. 7. In this example, if VED 704 needs to perform an SPL measurement, VED 704 may lower the audio playback volume of VED 706 due to the proximity of VED 704 to VED 706. It might not be necessary for VED 704 to lower the audio playback volume of VED 708 since it is not located as close to VED 704 as VED 706, and thus the audio playback volume of VED 708 might not affect an SPL measurement performed by VED 704 to the same extent as the audio playback volume of VED 706.

However, in some scenarios, it may be advantageous for VEDs 704, 706, and/or 708 to take an SPL measurement while one or more of VEDs 704, 706, and 708 are playing audio content. For example, if the audio playback volume of VED 704 would not impede an SPL measurement, a VED may take an SPL measurement without altering the audio playback volume of itself and/or other VEDs. In another example, if VED 704 is playing audio content that does not include many alternating loud and soft passages, VED 704 may be able to assess the SPL in area 702 more easily by not lowering the volume before taking the SPL measurement than if it lowered the audio playback volume prior to taking the SPL measurement because the SPL measurement would include the audio content playing at full volume.

In some embodiments, VED 704 calculates a new system response volume based on the signal-to-noise ratio of the volume of a user's voice command and a measurement of ambient sound in listening area 702. In these embodiments, VED 704 measures the ambient sound in listening area 702 prior to outputting a system response. VED 704 then measures the volume of a user's voice command (e.g., a command requesting VED 704 to perform an action). In response to taking these measurements, VED 704 calculates the signal-to-noise ratio of the volume of the user's voice to the measurement of ambient sound and uses the ratio to set an appropriate system response volume. In one example, if the volume of the user's voice is high compared to the ambient noise in listening area 702, VED 704 may set the system response volume to a lower value because the ambient noise will have little effect on the system response. In another example, if the volume of the user's voice is low compared to the ambient noise, VED 704 may set the system response volume to a higher value to compensate for the high level of ambient noise. In yet another example, if the volume of the user's voice is substantially the same volume as the ambient noise, VED may set the system response volume to a value higher than the ambient noise to ensure the user can discern the response from the ambient noise.

Additionally, VED 704 may calculate a new system response volume based on the signal-to-noise ratio of the user's voice command to the ambient sound in listening area 702 in addition to the distance from which the user issues the voice command. The location of the user may cause VED 704 to raise or lower the system response volume. In one example, if the user issues a voice command a short distance from VED 704 and the volume of the user's voice is low compared to the ambient noise, VED 704 may set a system response volume that is higher than the ambient noise, but not as high as it would if the user were located at a distance further from VED 704. In another example, if the user issues a voice command at a distance far from VED 704 and the volume of the user's voice is high compared to the ambient noise, VED 704 may set a system response volume that is lower than the user's voice, but not as low as it would if the user issued the voice command at a distance closer to VED 704.

In some circumstances, the ambient noise level may change after the user issues a voice command but before VED 704 outputs a system response. To overcome this potential problem, in some embodiments, VED 704 may modify the system response calculated using the signal-to-noise ratio of the user's voice command to the ambient sound in listening area 702 with an instantaneous SPL measurement. For example, VED 704 may calculate a new system response based on the previously described signal-to-noise ratio of the user's voice command to the ambient sound in listening area 702. Then, just prior to outputting a system response, VED 704 may obtain an instantaneous SPL measurement. If the instantaneous SPL measurement indicates the ambient noise has changed since calculating the system response volume, VED 704 may adjust the system response volume based on the instantaneous SPL measurement.

In some embodiments, VED 704 calculates a new system response volume in response to a new system configuration. A new system configuration may occur when a user (i) adds and/or removes a VED or other networked device to/from media playback system 700, and/or (ii) runs a diagnostic or calibration in response to repositioning one or more VEDs or other networked devices within listening area 702.

For example, if media playback system 700 only contained VED 704 and 706, and a user added VED 708 to the media playback system 700 configuration, then in some embodiments, VED 704 calculates a new system response volume in response to the change in configuration (i.e., adding VED 708 to the media playback system 700).

In another example, the user may perform a diagnostic and/or calibration procedure for audio playback system 700, such as tuning one or more of VEDs 704, 706, and/or 708 according to the Sonos Trueplay™ calibration procedure or other automated calibration procedure. In some embodiments, one or more of VED 704, 706, and/or 708 performs a new SPL calculation and/or sets a new system response volume in response to completing the diagnostic and/or calibration procedure, or at least after completing the diagnostic and/or calibration procedure.

In some embodiments, VED 704 calculates a new system response in response to a new system configuration and just before outputting a system response. This may be advantageous as it allows VED 704 to calculate an up-to-date system response volume. For example, if media playback system 700 only contained VED 704 and 706, and a user added VED 708 to the media playback system 700 configuration, VED 704 calculates a new system response volume in response to the change in configuration (i.e., adding VED 708 to the media playback system 700). VED 704 may subsequently determine that a requirement exists to output a system response, and in response to the determination, calculate a new system response volume.

In some embodiments, VED 704 calculates a new system response volume in response to receiving new audio playback volume setting. A new audio volume setting may include when a user (i) raises, (ii) lowers, or (iii) mutes the volume. For example, when a user raises the audio volume, VED 704 calculates and sets a higher system response volume based on the amount the user raised the volume. Similarly, when a user lowers the audio playback volume, VED 704 calculates and sets a lower system response volume based on the amount the user lowered the audio playback volume. In some embodiments, VED 704 may raise and/or lower the system response volume based on the amount that the audio playback volume was raised and/or lowered, without conducting a new SPL measurement. In other embodiments, raising and/or lowering the audio playback volume may trigger or otherwise cause VED 704 to perform a new SPL measurement, and then set the system response volume based at least in part on the new SPL measurement. Additionally, when a user mutes the audio playback volume, VED 704 calculates and sets a system response volume based on a default system response volume. In some embodiments, the default system response volume may be based on a new or previous SPL calculation.

In some embodiments, VED 704 calculates a new system response volume in response a user specifically adjusting the system response volume for VED 704. In operation, a user may adjust the system response volume via (i) a physical mechanism located on VED 704 (e.g., a knob, button, slider, or other control) and/or (ii) a wirelessly connected controller (e.g., via RF, IR, or other wireless method) configured to send a control/instruction signal to VED 704 that causes VED 704 set the system response volume in response to a system response volume control setting command received from the user.

For example, a user may desire a higher system response volume because the user is interested in hearing a specific notification from VED 704. One scenario may include a user raising the system response volume in order to hear an alarm indicating that the user should complete an important action (i.e., taking medication, turning off the stove, etc.).

In another example, a user may desire a lower system response volume due to a guest having sensitive hearing or in response to a medical condition. One scenario may include a user suffering from a migraine headache. In this scenario, it is advantageous to lower the system response volume to avoid aggravating the user's migraine symptoms.

In some embodiments, VED 704 sets a new system response volume based at least in part on a previously-determined system response volume in response to a triggering event. The trigger event may include a user (i) changing the audio playback volume of one or more of VEDs 704, 706, and/or 708, (ii) configuring one or more of VEDs 704, 706, and/or 708 to operate as a standalone audio playback device or to operate in a group with one or more of the other VEDs, (iii) detecting motion within listening area 702 (or perhaps some other area), (iv) detecting a change in light within listening area 702 (or perhaps some other area), and/or (v) a time of day or a configured timeframe.

For example, if VED 704 has previously determined a system response volume that is suitable for nighttime or early morning, VED 704 may set a system response volume according to that previously-determined system response volume upon determining that it is nighttime or early morning (based on a system clock).

In another example, if VED 704 has previously determined a system response volume that is suitable for when the user has turned out his or her bedroom lights for the evening, then VED 704 may set a system response volume according to that previously-determined system response volume upon determining both (i) it is nighttime (based on a system clock) and (ii) the lights are off in listening area 702 (based on a light sensor, a message from a light sensor, and/or a message from a lighting control system).

In yet another example, if VED 704 has previously determined a system response volume that is suitable for a certain configuration of VEDs (e.g., a stereo pair of VED 704 and 706), then VED 704 may set a system response volume according to that previously-determined system response volume upon determining that VED 704 and VED 706 have been configured in a stereo pair, or perhaps as a step of configuring VED 704 and VED 706 to operate as a stereo pair.

In yet another example, if VED 704 has previously-determined a system response volume that is suitable in the afternoon when children are home from school, then VED 704 may set a system response volume according to that previously-determined system response volume upon determining (i) it is between 3:00 pm and 6:00 pm and (ii) there is motion in the listening area 702, which suggests the presence of children (based on a motion sensor or a message from a motion sensor).

In some embodiments, two or more of VEDs 704, 706, and 708 are configured to output a system response at a system response volume. In these embodiments, the system response volume may be based at least in part on the number of networked devices that will output a system response. In operation, the system response volume for each VED configured to output the system response can be set at a level so that the aggregate volume of the system response played by the multiple VEDs is at a desired system response volume. For example, assuming a desired system response volume is X dB, then then (i) for a system configured to output a system response via a single VED, that single VED's system response volume is set to X dB, and (ii) for a system configured to output a system response via two VEDs, each VED's system response volume might be set to X−3 dB, or perhaps some other offset factor to account for the fact that multiple VEDs will output a system response.

Alternatively or additionally, in some embodiments, the system response volume may also be based on at least in part on the configuration of media playback system 700. In these embodiments, VEDs 704, 706, and/or 708 may be operating as different types of playback devices (e.g., speaker or subwoofer) or in synchrony with one another (e.g., a bonded stereo pair). For example, VED 704 and 706 may be operating as a bonded stereo pair, while VED 708 is operating as a subwoofer. In this configuration, VEDs 704 and 706 may set their system response volumes lower than VED 708 to account for the bonded stereo pair having multiple speakers 710 and 714 outputting a system response. The amount the VEDs 704 and 706 lower their system response volumes may correspond to a reference table containing equal-loudness system response volume modifications for different configurations of media playback system 700 (e.g., lower the system response volume −2 dB for a stereo pair configuration or −4 dB for a 5.1 home theater configuration).

In some embodiments, each (or any) of VEDs 704, 706, and 708 determines whether a requirement exists to output a system response and, in response to determining that a requirement exists to output a system response, determines a new system response volume based on one or more factors including but not limited to (i) the number of networked devices connected to media playback system 700, (ii) an SPL measurement from one or more (or all) of the VEDs of the media playback system 700, and/or (iii) the types of VEDs of the media playback system 700.

In some embodiments, each of VEDs 704, 706, and 708 determines whether a requirement exists to output a system response and, in response to that determination, determines and/or sets a new system response volume for one or more of the VEDs 704, 706, and/or 708 (individually or as a group) based at least in part on the number of VEDs in the media playback system 700. In these embodiments, each of VEDs 704, 706 and 708 calculates a separate system response volume and then, in response to determining that more than one networked device is connected, each VED modifies its calculated system response volume to account for the other VEDs in the media playback system 700. Because each VED modifies (e.g., reduces) its own system response volume to account for the other VEDs in the media playback system 700, the set of VEDs in the media playback system 700 avoids playing back a system response at a volume that is higher than desired. For example, if VED 704 (individually or in combination with VEDs 706, VED 708, and/or perhaps other computing devices (not shown)) determines that the system response volume for the set of VEDs 704, 706, and 708 of media playback system should be 5 (e.g., on a scale of 1-10), if every VED set its system response volume to 5, then the effective volume for a system response played by all of the VEDs 704, 706, and 708 would be greater than 5. But if each VED reduces its system response volume from 5 to 3.5, for example, based on the media playback system 700 having two other VEDs playing a system response, then the effective volume for a system response played by all of the VEDs 704, 706, and 705 would be about 5, assuming each VED has set its system response volume to 3.5, for example.

Additionally or alternatively, in some embodiments, each of VEDs 704, 706, and 708 determines whether a requirement exists to output a system response and, in response to that determination, determines and/or sets a new system response volume for one or more of the VEDs 704, 706, and/or 708 (individually or as a group) based at least in part on one or more SPL measurements from one or more of VEDs 704, 706, and/or 708, or perhaps a collective SPL measurement from the set of VEDs 704, 706, and 708. For example, each of VEDs 704, 706 and 708 may make a separate SPL measurement. A group coordinator (i.e., one of VEDs 704, 706, and 708) analyzes the individual SPL measurements and determines a collective SPL measurement for the listening area 702. The group coordinator (e.g., VED 704) then determines a new system response volume based on the collective SPL measurement, configures itself with the determined system response volume based on the collective SPL measurement, and either (i) configures the other VEDs (e.g., VEDs 706 and 708) for the determined system response volume based on the collective SPL measurement or (ii) transmits the determined system response volume to the other VEDs (e.g., VEDs 706 and 708) so that the other VEDs can configure themselves for the determined system response volume.

Additionally or alternatively, in some embodiments, each of VEDs 704, 706, and 708 determines whether a requirement exists to output a system response and, in response to that determination, determines and/or sets a new system response volume based at least in part on the type(s) of VEDs of the media playback system 700. In operation, some VEDs may have more or fewer speakers than other VEDs and/or differently-configured speakers. For example, VEDs 704 and 706 may have 2-4 small-to-mid-sized speakers (e.g., about 2-8 inches in diameter) configured to output a full range of sound, whereas VED 708 may have 1 or 2 large speakers (e.g., 8-12 inches in diameter) configured to output lower frequency sounds. In this example configuration, if the system response volume setting for VEDs 704 and 706 may be different than the system response volume setting for VED 708 to account for the difference in speaker types and configurations between the different VEDs.

Additionally or alternatively, in some embodiments, VEDs 704, 706, and/or 708 may calculate different system response volumes. This might occur if each VED is located in a separate room or in different areas of the same room that have different SPL measurements. One example might be when the user is having a conversation in close proximity to one or more of VEDs 704, 706, and 708. In these embodiments, a group coordinator (i.e., one of VEDs 704, 706, or 708 that is tasked with compiling system response volume calculations) may communicate with the other VEDs in media playback system 700, receive their respective system volume determinations, calculate an average or weighted master system response volume, and instructs the other networked devices to set their system response volumes to the master system response volume, or perhaps to individual system response volume settings so that, when the set of VEDs plays a system response, the effective system response volume for the set of VEDs will be at the determined master system response volume. For example, if the group coordinator (e.g., VED 704) determines that the master system response volume should be 5 (e.g., on a scale of 1-10), then the group coordinator may set the system response volume of itself to 4, set the system response volume of VED 706 to 4, and set the system response volume of VED 708 to 2, so that when the set of VEDs 704, 706, and 708 plays a system response, the set of VEDs will play that system response at an effective master system response volume of 5, for example.

In some circumstances, when one of VEDs 704, 706, and 708 output the system response while all of VEDs 702, 704, and 706 are playing media content, the system response volume may be too quiet in listening area 702. For example, in the context of decibel output, 10 speakers each playing media content at 50 dB is equivalent to one speaker playing media content at 60 dB. This additive effect may be even more pronounced if VEDs 704, 706, and 708 are in close proximity to one another. For instance, if the group coordinator (e.g., VED 704) sets the audio playback volume to 5 for each VED, the effective audio playback volume (the effective volume when all of VEDs 704, 706, and 708 are playing media content) may be 7 or 8 depending on the configuration of media playback system 700. To overcome this problem, the group coordinator, after determining a system response volume, modifies the system response volume to take into account the number of VEDs in the configuration of media playback system 700. For example, media playback system 700 may have a configuration including VEDs 704, 706, and 708 arranged as shown in FIG. 7, with VED 704 assigned as the group coordinator. In this example, VED 704 may determine that there are three VEDs in the configuration (VEDs 704, 706, and 708), and modify the system response volume to an appropriate value for a configuration with three VEDs.

In operation, VED 704 may modify the system response volume using a formula such as: $L_m = L_u + 10 \log_{10} N$ In the above formula, $L_m$ represents a modified system response volume, $L_u$ represents an unmodified system response volume (i.e., the system response volume determined by the group coordinator), and N represents the number of VEDs present in the configuration. After the group coordinator (VED 704 in this example) calculates the modified system response volume, the group coordinator sets the system response volume according to the modified system response volume.

In some circumstances, when the group coordinator determines and sets a system response volume for VEDs 704, 706, and 708 in listening area 702, the system response volume may be too loud or too quiet for the user in listening area 702. To overcome this potential problem, some embodiments may include the group coordinator limiting the system response volume of VEDs 704, 706, and 708 based on predefined thresholds. These thresholds may represent the highest and/or lowest system response volumes acceptable to a user. For example, based on the characteristics of listening area 702, the predefined thresholds may be system response volumes of 2 and 8 for the low threshold and high threshold, respectively. The user may set the predefined thresholds, or one or more of VEDs 704, 706, and 708 may automatically set the predefined thresholds based on listening area 702. In this example, if the group coordinator (individually or in combination with one or more other devices) determines the system response volume should be 9, the group coordinator may set the system response volume to 8 to avoid the system response being too loud. Likewise, if the group coordinator determines the system response volume should be 1, group coordinator may set the system response volume to 2 to avoid the system response being too quiet.

Additionally or alternatively, in some embodiments, the group coordinator limits the system response volume based on the audio playback volume of media playback system 700. This may be advantageous because it avoids the system response from being too quiet or too loud when media playback system 700 is playing audio content. For example, if the group coordinator determines a system response volume of 3, but the audio playback volume of media playback system 700 is 6, the group coordinator may set the system response volume to 6 (e.g., the audio playback volume) to avoid the system response being too quiet and/or drowned out by the audio content. This feature is useful in scenarios where the media playback system is configured to "duck" (or temporarily reduce) the audio playback volume when one or more VEDs play back a system response. In another example, if the group coordinator determines a system response volume of 7, but the audio playback volume of media playback system 700 is 3, the group coordinator may set the system response volume to a predetermined maximum of 5 to avoid the system response being too loud compared to the audio playback.

In any of the above-described examples, one or more VEDs can send information to any other one or more VEDs, including but not limited to information for the purpose of determining and/or setting a system response volume. For example, a first VED can send to a second VED (and perhaps additional VEDs) any one or more of (i) its current audio playback volume level, (ii) its current system volume level, (iii) an SPL measurement, (iv) measurement data on which to base an SPL measurement, (v) configuration state information (e.g., standalone, stereo pair, synchrony group, bonded player, home theater, and so on), and/or (vi) any other information that might be used in connection with determining a system response volume. And in response to receiving any of that information from the first VED, the second VED can use that information to (i) determine and set its own system response volume and/or (ii) determine and/or set a system response volume for one or more additional VEDs.

In some of the above-described examples, one or more VEDs can additionally or alternatively send information to a cloud computing system to determine and/or set a system response volume for one or more (or all) VEDs in a particularly system. For example, a first VED can send to the cloud computing system any one or more of (i) its current audio playback volume level, (ii) its current system volume level, (iii) an SPL measurement, (iv) measurement data on which to base an SPL measurement, (v) configuration state information (e.g., standalone, stereo pair, synchrony group, bonded player, home theater, and so on), and/or (vi) any other information that might be used in connection with determining a system response volume. And in response to receiving any of that information from the first VED, the cloud computing system can use that information to determine and/or set a system response volume for the first VED and/or additional VEDs in a particular media playback system.

b. Example Audio Playback Volume Calculation

In some embodiments, when content is playing from media playback system 700 prior to a system response, VEDs 704, 706, and/or 708 lower the audio playback volume a predetermined amount (e.g., 35% or −3 dB at each VED) just before playing a system response so that a user can better hear the system response over the audio content. For example, if VEDs 704, 706, and/or 708 determine a requirement exists to output a system response while playing content, VEDs 704, 706, and/or 708 may lower their respective audio playback volume by 35% to allow a user to better hear the system response.

One challenge for media playback systems with multiple VEDs is that if media content is playing from all of the VEDs, lowering the audio playback volume of each VED by only 35% or −3 dB may not cause the effective audio playback volume to fall below the calculated system response volume. The effective audio playback volume is the aggregated audio playback volume of all VEDs in media playback system 700. As explained above, in the context of decibel output, 10 speakers each playing a system response at 50 dB is equivalent to one speaker playing a system response at 60 dB. For example, in the context of a volume setting on a 1-10 scale (other scales are possible, too), if VEDs 704, 706, and 708 are playing media content at an audio playback volume of 4, the effective audio playback volume of media playback system 700 may be 5 or 6.

To overcome this problem, in some embodiments, VEDs 704, 706, and/or 708 modify (e.g., lower) the audio playback volume (sometimes referred to as "ducking") when outputting a system response. The amount VEDs 704, 706 and/or 708 modify the audio playback volume is based on the number of VEDs present in media playback system 700. For example, media playback system 700 may have a configuration including VEDs 704, 706, and 708 arranged as shown in FIG. 7, with VED 704 assigned as the group coordinator. In this example, VED 704 may determine (or otherwise know) that there are three VEDs in the configuration (VEDs 704, 706, and 708), and modify the audio playback volume of each VED to an appropriate value for a configuration with three VEDs.

In operation, VED 704 may modify the audio playback volume using a formula such as:

$$L_m = L_u - 10\log_{10}N$$

In the above formula, $L_m$ represents a modified audio playback volume, $L_u$ represents an unmodified audio playback volume (i.e., the audio playback volume of each of VEDs 704, 706, and 708), and N represents the number of VEDs present in the configuration. After the group coordinator (VED 704 in this example) calculates the modified audio playback volume, the group coordinator sets the audio playback volume according to the modified audio playback volume.

Additionally or alternatively, in some embodiments, VEDs 704, 706, and/or 708 modify the audio playback volume based on the configuration of media playback system 700. In these embodiments, VEDs 704, 706, and/or 708 have access to a reference table containing equal-loudness audio playback volume modifications for different configurations of media playback system 700 (i.e., modification of −3 dB for a stereo pair configuration). The reference table may be added to or updated via a network interface on a periodic or semi-periodic basis. VEDs 704, 706, and/or 708 may have the reference table in its memory, or may access the reference table through a network interface (e.g., cloud-based server, LAN, etc.). For example, media playback system 700 may have VEDs 704 and 706 operating as a stereo pair. In this configuration, before outputting a system response, VEDs 704 and/or 706 may access the reference table and modify the audio playback volume by −2 to −4 dB (or some other table defined in the table). In another example, media playback system 700 may have VEDs 704 and 706 operating as a stereo pair, and have VED 708 operating as a subwoofer. In this configuration, before outputting a system response, VEDs 704, 706, and/or 708 may access the reference table and modify the audio playback volume by −3 to −5 dB (or some other value defined in the table).

Additionally or alternatively, in some embodiments, VEDs 704, 706, and/or 708 modify the audio playback volume based on a playback mode of media playback system 700 (e.g., ambient audio mode, full audio mode, and/or home theater mode). In these embodiments, VEDs 704, 706, and/or 708 have access to a reference table containing additional equal-loudness audio playback volume modifications for different playback modes of media playback system 700. For example, media playback system 700 may have VEDs 704, 706, 708, and two additional VEDs (not shown) in a five speaker configuration, operating in home theater mode. In this configuration and playback mode, before outputting a system response, one or more of the VEDs may access the reference table and modify the audio playback volume for one or more VEDs by −6 to −8 dB based on volume adjustment values in the table. In another example, media playback system 700 may have VEDs 704, 706, 708, and three additional VEDs (not shown) in a five speaker and one subwoofer configuration, operating in full audio mode. In this configuration, before outputting a system response, one or more of the VEDs may access the reference table and modify the audio playback volume of one or more VEDs by −7 to −9 dB, based on the adjustment values in the table.

In some embodiments, VEDs 704, 706, and/or 708 modify the audio playback volume based on the loudness of the audio playback content when VED 704 is playing media content. This may be beneficial as it allows VED 704 to lower the audio playback volume during a system response to an appropriate volume relative to the volume of the audio content played back by VED 704. For example, a user may be playing media content through VED 704 that features sporadic bursts of sound, followed by longer lulls. VED 704 may monitor the loudness of the audio playback content via microphone 710 to obtain an up-to-date loudness measurement at the time VED 704 outputs a system response. VED 704 then, while outputting a system response, lowers the audio playback volume an appropriate amount based on the loudness of the audio playback content.

c. Example Method

Figure 8:
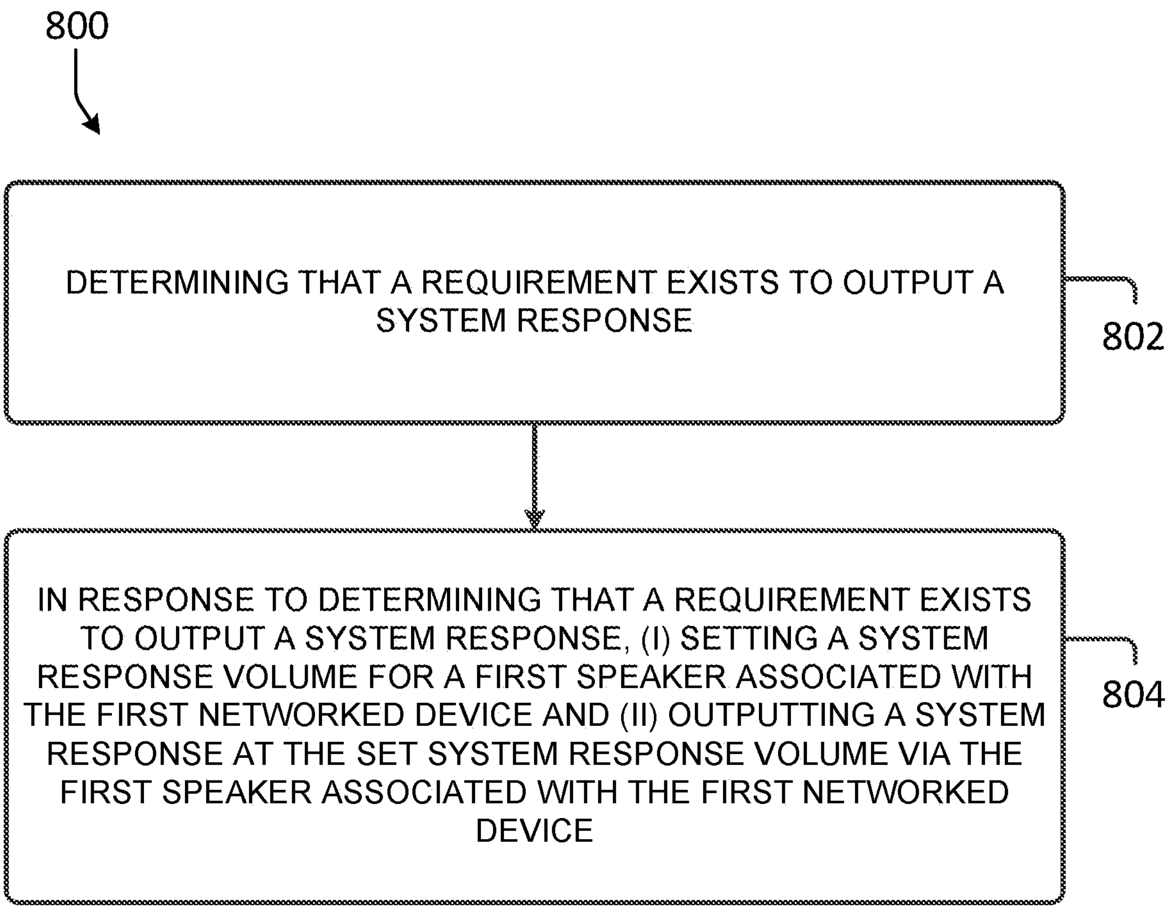
FIG. 8 shows an example method according to some embodiments.

Method 800 in FIG. 8 shows an embodiment of a method that can be implemented within an operating environment including or involving, for example, the media playback system 100 of FIG. 1, one or more playback devices 200 of FIG. 2, one or more control devices 300 of FIG. 3, the user interface of FIG. 4, the configuration shown in FIG. 5, the NMD shown in FIG. 6, and/or the media playback system 700 in FIG. 7. Method 800 may include one or more operations, functions, or actions as illustrated by one or more of blocks 802 and 804. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 800 and other processes and methods disclosed herein, the flowchart shows functionality and operation of one possible implementation of some embodiments. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable medium, for example, such as tangible, non-transitory computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 800 and other processes and methods disclosed herein, each block in FIG. 8 may represent circuitry that is wired to perform the specific logical functions in the process.

Method 800 begins at block 802, which includes a first networked device (or alternatively a computing device configured to control the first networked device), determining that a requirement exists to output a system response. In some embodiments, determining that a requirement exists to output a system response includes receiving a voice input via a first microphone associated with the first networked device. In some embodiments, determining that a requirement exists to output a system response comprises activating a system alert or notification.

Next, method 800 advances to block 802, which includes, in response to determining that a requirement exists to output a system response, (i) setting a system response volume for a first speaker associated with the first networked device and (ii) outputting a system response at the set system response volume via the first speaker associated with the first networked device.

In some embodiments, the first networked device includes the first speaker and the first microphone. In some embodiments, the first networked device includes the first microphone and a second networked device comprises the first speaker.

In some embodiments, the first networked device includes the first speaker and a second networked device includes a second speaker. And in some embodiments, outputting the system response at the set system response volume via the first speaker associated with the first networked device includes outputting the system response at the set system response volume via the first speaker associated with the first networked device in synchrony with the second networked device outputting the system response at the set system response volume via the second speaker.

In some embodiments, setting the system response volume for the first speaker associated with the first networked device includes (i) obtaining a sound pressure level (SPL) measurement via one or more microphones associated with the first networked device (e.g., the first microphone) and (ii) setting the system response volume based at least in part on the SPL measurement.

In some embodiments, the SPL measurement is based on one or more of (i) an SPL measurement at an output of the first speaker, (ii) an SPL measurement at an output of a second speaker, (iii) an SPL measurement at a designated listening location in a room, (iv) an SPL measurement based on multiple SPL measurements from multiple microphones, (v) an SPL measurement of sound within a predefined frequency band. In some embodiments, the SPL measurement is a first type of SPL measurement when the first speaker is playing a first type of media content (e.g., playing music), and wherein the SPL measurement is a second type of SPL measurement when the first speaker is playing a second type of media content (e.g., playing audio associated with a television program or movie).

In some embodiments, setting the system response volume based on the obtained sound pressure level measurement includes setting the system response volume to between about 1 dB to about 6 dB higher than instantaneous and/or prior sound measurements (e.g., an SPL measurement and/or a measurement derived from an SPL measurement).

In some embodiments, setting the system response volume for the first speaker associated with the first networked device includes (i) accessing a previously-determined system response volume, and (ii) setting the system response volume to the previously-determined system response volume.

In some embodiments, the previously-determined system response volume was determined via steps including (i) detecting a trigger event, and (ii) in response to detecting the trigger event, determining the system response volume. In some embodiments, the trigger event includes, during media playback via the first speaker, changing a volume of the media playback. And in some embodiments, determining the system response volume for the first speaker associated with the first networked device includes (i) obtaining an SPL measurement via one or more microphones associated with the first networked device, and (ii) setting the system response volume based on the SPL measurement.

In some embodiments, changing a volume of the media playback includes at least one of (i) increasing the volume of the media playback, (ii) decreasing the volume of the media playback, (iii) muting the media playback, and (iv) unmuting the media playback.

In some embodiments, the trigger event comprises a reconfiguration of the first networked device. In some embodiments, the reconfiguration includes one of (i) configuring the first networked device from playing back media content as a standalone playback device to playing back media in synchrony with at least a second networked device and (ii) configuring the first networked device from playing back media in synchrony with at least a second networked device to playing back media as a standalone playback device.

In some embodiments, the trigger event includes expiration of a timeframe, and determining the system response volume for the first speaker associated with the first networked device comprises: (i) obtaining an SPL measurement via one or more microphones associated with the first networked device; and (ii) setting the system response volume based on the SPL measurement.

In some embodiments, the trigger event includes at least one of (i) detection of motion in an area of the first networked device by a motion detector associated with the first networked device and (ii) detecting a change in light in an area of the first networked device by a light detector associated with the first networked device.

In some embodiments, the system response volume is different than a volume of media playback by the first speaker associated with the first networked device.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware.

Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A system comprising:
at least one processor;
at least one non-transitory computer-readable medium; and
program instructions stored on the at least one non-transitory computer-readable medium that are executable by the at least one processor such that the system is configured to:
cause a first speaker of a first network device to play back audio content in synchrony with playback of audio content by a second speaker of a second network device that is configured for synchronous playback of audio content with the first network device;
receive, via a first microphone associated with the first network device, a voice input;
determine, based on the received voice input, that a requirement exists to output a system response via the first speaker;
in response to determining that a requirement exists to output a system response:
based on (i) an audio playback volume for one or both of the first and second network devices and (ii) the configuration of the second network device for synchronous playback of audio content with the first network device, set a system response volume for the first speaker; and
cause the first speaker to output a system response at the set system response volume while the first speaker and the second speaker play back the audio content.

2. The system of claim 1, wherein the program instructions stored on the at least one non-transitory computer-readable medium that are executable by the at least one processor such that the system is configured to set the system response volume for the first speaker comprise program instructions stored on the at least one non-transitory computer-readable medium that are executable by the at least one processor such that the system is configured to:
obtain a sound pressure level (SPL) measurement via one or more microphones associated with the first network device, wherein the SPL measurement is indicative of a sound level of an environment including ambient noise; and
set the system response volume based on the SPL measurement.

3. The system of claim 2, wherein the SPL measurement is based on one or more of (i) an SPL measurement at an output of the first speaker, (ii) an SPL measurement at an output of a different speaker associated with the first network device, (iii) an SPL measurement at a designated listening location in the environment, (iv) an SPL measurement based on multiple SPL measurements from multiple microphones, (v) an SPL measurement of sound within a predefined frequency band, or (vi) combinations thereof.

4. The system of claim 2, further comprising program instructions stored on the at least one non-transitory computer-readable medium that are executable by the at least one processor such that the system is configured to:
determine a signal-to-noise ratio of the received voice input to the SPL measurement, and
wherein the program instructions stored on the at least one non-transitory computer-readable medium that are executable by the at least one processor such that the system is configured to set the system response volume based on the SPL measurement comprise program instructions stored on the at least one non-transitory computer-readable medium that are executable by the at least one processor such that the system is configured to set the system response volume based on the determined signal-to-noise ratio.

5. The system of claim 2, wherein the SPL measurement is a first type of SPL measurement when the first speaker is playing a first type of media content, and
wherein the SPL measurement is a second type of SPL measurement when the first speaker is playing a second type of media content.

6. The system of claim 5, wherein the first type of media content comprises music.

7. The system of claim 6, wherein the second type of media content comprises audio associated with at least one of a television program and a movie.

8. The system of claim 1, wherein the program instructions stored on the at least one non-transitory computer-readable medium that are executable by the at least one processor such that the system is configured to determine, based on the received voice input, that a requirement exists to output a system response via the first speaker comprise program instructions stored on the at least one non-transitory computer-readable medium that are executable by the at least one processor such that the system is configured to:
activating a system alert or notification.

9. The system of claim 1, further comprising program instructions stored on the at least one non-transitory computer-readable medium that are executable by the at least one processor such that the system is configured to:

determine that the first and second network devices comprise a stereo pair configuration; and in response to determining that the first and second network devices comprise a stereo pair configuration, increase the system response volume by a predetermined number of decibels (dB).

10. The system of claim 1, wherein the program instructions stored on the at least one non-transitory computer-readable medium that are executable by the at least one processor such that the system is configured to cause the first speaker to output a system response at the set system response volume while the first speaker and the second speaker play back the audio content comprises:

causing the first speaker to output the system response at the set system response volume in synchrony with a third networked device that is outputting the system response at the set system response volume via a third speaker associated with the third networked device.

11. The system of claim 10, further comprising program instructions stored on the at least one non-transitory computer-readable medium that are executable by the at least one processor such that the system is configured to:

determine that the first, second, and third network devices comprise a home theater configuration; and increase the system response volume by a predetermined number of decibels (dB).

12. The system of claim 11, wherein the third network device comprises a subwoofer.

13. A non-transitory computer-readable medium, wherein the non-transitory computer-readable medium is provisioned with program instructions that, when executed by at least one processor, cause a system to:

cause a first speaker of a first network device to play back audio content in synchrony with playback of audio content by a second speaker of a second network device that is configured for synchronous playback of audio content with the first network device;

receive, via a first microphone associated with the first network device, a voice input;

determine, based on the received voice input, that a requirement exists to output a system response via the first speaker;

in response to determining that a requirement exists to output a system response:

based on (i) an audio playback volume for one or both of the first and second network devices and (ii) the configuration of the second network device for synchronous playback of audio content with the first network device, set a system response volume for the first speaker; and cause the first speaker to output a system response at the set system response volume while the first speaker and the second speaker play back the audio content.

14. The non-transitory computer-readable medium of claim 13, wherein the program instructions that, when executed by the at least one processor, cause the system to set the system response volume for the first speaker comprise program instructions that, when executed by the at least one processor, cause the system to:

obtain a sound pressure level (SPL) measurement via one or more microphones associated with the first network device, wherein the SPL measurement is indicative of a sound level of an environment including ambient noise; and set the system response volume based on the SPL measurement.

15. The non-transitory computer-readable medium of claim 14, wherein the SPL measurement is based on one or more of (i) an SPL measurement at an output of the first speaker, (ii) an SPL measurement at an output of a different speaker associated with the first network device, (iii) an SPL measurement at a designated listening location in the environment, (iv) an SPL measurement based on multiple SPL measurements from multiple microphones, (v) an SPL measurement of sound within a predefined frequency band, or (vi) combinations thereof.

16. The non-transitory computer-readable medium of claim 14, wherein the non-transitory computer-readable medium is also provisioned with program instructions that, when executed by the at least one processor, cause the system to:

determine a signal-to-noise ratio of the received voice input to the SPL measurement, and wherein the program instructions that, when executed by at least one processor, cause the system to set the system response volume based on the SPL measurement comprise program instructions that, when executed by the at least one processor, cause the system to set the system response volume based on the determined signal-to-noise ratio.

17. A method implemented by a system, the method comprising:

causing a first speaker of a first network device to play back audio content in synchrony with playback of audio content by a second speaker of a second network device that is configured for synchronous playback of audio content with the first network device;

receiving, via a first microphone associated with the first network device, a voice input;

determining, based on the received voice input, that a requirement exists to output a system response via the first speaker;

in response to determining that a requirement exists to output a system response:

based on (i) an audio playback volume for one or both of the first and second network devices and (ii) the configuration of the second network device for synchronous playback of audio content with the first network device, setting a system response volume for the first speaker; and causing the first speaker to output a system response at the set system response volume while the first speaker and the second speaker play back the audio content.

18. The method of claim 17, wherein setting the system response volume for the first speaker comprises:

obtaining a sound pressure level (SPL) measurement via one or more microphones associated with the first network device, wherein the SPL measurement is indicative of a sound level of an environment including ambient noise; and setting the system response volume based on the SPL measurement.

19. The method of claim 18, wherein the SPL measurement is a first type of SPL measurement when the first speaker is playing a first type of media content, and wherein the SPL measurement is a second type of SPL measurement when the first speaker is playing a second type of media content.

20. The method of claim 19, wherein the first type of media content comprises music, and wherein the second type of media content comprises audio associated with at least one of a television program and a movie.

* * * * *